(12) United States Patent
Katz et al.

(10) Patent No.: US 10,543,652 B2
(45) Date of Patent: Jan. 28, 2020

(54) PRESS

(71) Applicant: Juicero, Inc., San Francisco, CA (US)

(72) Inventors: Paul Katz, San Marino, CA (US);
Andrew Murphy, San Francisco, CA (US); Ed Wood, San Francisco, CA (US)

(73) Assignee: Fresh Press LLC, San Francisco, CA (US)

( * ) Notice: Subject to any disclaimer, the term of this patent is extended or adjusted under 35 U.S.C. 154(b) by 0 days.

(21) Appl. No.: 15/486,577

(22) Filed: Apr. 13, 2017

(65) Prior Publication Data

US 2018/0297313 A1 Oct. 18, 2018

Related U.S. Application Data

(63) Continuation of application No. 15/447,318, filed on Mar. 2, 2017, now abandoned.

(60) Provisional application No. 62/303,080, filed on Mar. 3, 2016.

(51) Int. Cl.
| | |
|---|---|
| *B30B 9/04* | (2006.01) |
| *B30B 9/06* | (2006.01) |
| *B30B 1/00* | (2006.01) |
| *B30B 9/26* | (2006.01) |
| *A47J 19/00* | (2006.01) |
| *A47J 19/02* | (2006.01) |
| *A47J 19/06* | (2006.01) |

(52) U.S. Cl.
CPC ............ *B30B 9/04* (2013.01); *A47J 19/02* (2013.01); *A47J 19/06* (2013.01); *B30B 1/006* (2013.01); *B30B 9/06* (2013.01); *B30B 9/262* (2013.01)

(58) Field of Classification Search
CPC .... B30B 9/04; B30B 9/06; B30B 9/20; B30B 9/262; B30B 7/04; B30B 1/006; A47J 19/02; A47J 19/06; B65D 77/04; B65D 85/34; B65D 79/02; B65D 35/28; A23N 1/00; A23N 1/02; A23L 2/04; A23V 2002/00; B01D 35/28; B67B 7/28
See application file for complete search history.

(56) References Cited

U.S. PATENT DOCUMENTS

| | | |
|---|---|---|
| 34,241 A | 1/1862 | Codding |
| 260,542 A | 7/1882 | Dannecker |
| 603,323 A | 5/1898 | Eckart |
| 626,646 A | 6/1899 | Baggett |
| 729,807 A | 6/1903 | Stoveken |
| 1,065,335 A | 6/1913 | Barton et al. |
| 1,130,701 A | 3/1915 | Berrigan |
| 1,130,878 A | 3/1915 | Berrigan |
| 1,354,517 A | 10/1920 | Sollazzo |

(Continued)

FOREIGN PATENT DOCUMENTS

| | | |
|---|---|---|
| CH | 605293 AS | 9/1978 |
| CN | 100484443 C | 5/2009 |

(Continued)

*Primary Examiner* — Jimmy T Nguyen
(74) *Attorney, Agent, or Firm* — David R. Stevens; Stevens Law Group

(57) ABSTRACT

Embodiments related to press machines, including presses to extract juice from food matter contained within a cartridge. The cartridge is compressible by the press and juice can be expelled through a cartridge outlet extendible though the press region.

20 Claims, 44 Drawing Sheets

(56) References Cited

U.S. PATENT DOCUMENTS

| | | | |
|---|---|---|---|
| 1,410,301 A | 3/1922 | Hauf | |
| 1,676,102 A | 7/1928 | Lynam | |
| 2,022,679 A | 12/1935 | Leo | |
| 2,068,013 A | 1/1937 | Fridlender et al. | |
| 2,235,028 A | 3/1941 | Leo et al. | |
| 2,346,375 A | 4/1944 | Harris | |
| 2,420,680 A | 5/1947 | Pipkin | |
| 2,612,100 A | 9/1952 | Bates et al. | |
| 2,688,914 A | 9/1954 | Eckler | |
| 2,789,496 A | 4/1957 | Turner | |
| 2,826,138 A | 3/1958 | Pexton | |
| 2,846,863 A | 8/1958 | Sibbald | |
| 3,159,096 A | 12/1964 | Tocker | |
| 3,207,610 A | 9/1965 | Belkin | |
| 3,289,844 A | 12/1966 | Emele | |
| 3,334,790 A | 8/1967 | Eaton | |
| 3,507,739 A * | 4/1970 | Jacobs | B32B 15/08 100/295 |
| 3,557,788 A | 1/1971 | Swartz | |
| 3,995,544 A | 12/1976 | Farley | |
| 4,096,309 A | 6/1978 | Stillman | |
| 4,151,795 A | 5/1979 | Huaser | |
| 4,211,156 A | 7/1980 | Zimmermann | |
| 4,214,519 A | 7/1980 | Stollenwerk et al. | |
| 4,219,425 A | 8/1980 | Yoshida | |
| 4,220,259 A | 9/1980 | Lagneaux | |
| 4,306,492 A | 12/1981 | Zimmermann | |
| 4,350,089 A | 9/1982 | Braun | |
| 4,420,404 A | 12/1983 | Coate et al. | |
| 4,421,021 A | 12/1983 | Holbrook | |
| 4,448,686 A | 5/1984 | Friedman | |
| 4,516,490 A | 5/1985 | Hartmann | |
| 4,520,948 A * | 6/1985 | Hampel | B65D 77/067 137/844 |
| 4,539,793 A | 9/1985 | Malek | |
| 4,592,492 A | 6/1986 | Tidmore | |
| 4,680,808 A | 7/1987 | Paleschuck | |
| 4,759,472 A | 7/1988 | Strenger | |
| 4,788,910 A * | 12/1988 | Tichy | B30B 9/105 100/118 |
| 4,808,346 A | 2/1989 | Strenger | |
| 4,873,100 A | 10/1989 | Dirksing et al. | |
| 4,884,755 A | 12/1989 | Hedrington | |
| 4,892,665 A | 1/1990 | Wettlaufer | |
| 4,899,911 A | 2/1990 | Rohde et al. | |
| 4,900,436 A | 2/1990 | Iwatani | |
| 4,915,261 A | 4/1990 | Strenger | |
| 4,986,912 A | 1/1991 | Fisch | |
| 5,018,646 A | 5/1991 | Billman et al. | |
| 5,031,524 A | 7/1991 | Wettlaufer | |
| 5,045,186 A | 9/1991 | Takashima | |
| 5,075,122 A | 12/1991 | Barron et al. | |
| 5,207,152 A | 5/1993 | Wettlaufer | |
| 5,267,509 A | 12/1993 | Wettlaufer | |
| 5,277,810 A | 1/1994 | Shepard | |
| 5,312,754 A | 5/1994 | Bryan-Brown | |
| 5,355,785 A | 10/1994 | Pera et al. | |
| 5,373,966 A | 12/1994 | O'Reilly et al. | |
| 5,429,273 A | 7/1995 | King et al. | |
| 5,445,068 A | 8/1995 | Michelson | |
| 5,451,415 A | 9/1995 | Pera et al. | |
| 5,456,824 A * | 10/1995 | Misumi | A61M 1/029 210/109 |
| 5,479,851 A | 1/1996 | McClean et al. | |
| 5,537,918 A | 7/1996 | Patel et al. | |
| 5,613,434 A | 3/1997 | Hartmann | |
| 5,680,997 A | 10/1997 | Hedrington | |
| 5,806,717 A * | 9/1998 | De Rosenzeig-Page | A47K 5/1215 222/105 |
| 5,842,603 A | 12/1998 | Schroeder | |
| 5,857,592 A * | 1/1999 | Hyldgaard | B65D 75/5866 222/103 |
| 5,927,187 A | 7/1999 | Bosch | |
| 5,996,485 A | 12/1999 | Suter et al. | |
| 6,050,180 A | 4/2000 | Moline | |
| 6,123,018 A | 9/2000 | Wettlaufer et al. | |
| 6,159,527 A | 12/2000 | Wettlaufer | |
| 6,196,122 B1 | 3/2001 | Lai | |
| 6,196,420 B1 * | 3/2001 | Gutierrez | B67D 1/0001 222/101 |
| 6,273,297 B1 * | 8/2001 | Schalow | B67D 7/0216 222/103 |
| 6,313,194 B1 | 11/2001 | Yagi et al. | |
| 6,371,013 B1 | 4/2002 | Chen | |
| 6,395,317 B1 | 5/2002 | Singh et al. | |
| 6,441,340 B1 | 8/2002 | Varriano-Marston | |
| 6,457,403 B1 | 10/2002 | Wettlaufer et al. | |
| 6,461,702 B2 | 10/2002 | Gong | |
| 6,479,092 B1 | 11/2002 | Wettlaufer | |
| 6,530,312 B1 | 3/2003 | Jakab | |
| 6,548,132 B1 | 4/2003 | Clarke et al. | |
| 6,691,894 B2 | 2/2004 | Chrisman et al. | |
| 6,730,874 B2 | 5/2004 | Varriano-Marston | |
| 7,032,818 B2 | 4/2006 | Thomas et al. | |
| 7,045,339 B2 | 5/2006 | Sorenson, Jr. et al. | |
| 7,083,818 B2 | 8/2006 | Pratte | |
| 7,104,186 B2 * | 9/2006 | Persoons | A23L 3/001 100/295 |
| 7,152,520 B2 | 12/2006 | Kerner | |
| 7,216,951 B2 | 5/2007 | Garrana et al. | |
| 7,318,374 B2 | 1/2008 | Guerrero | |
| 7,329,452 B2 | 2/2008 | Clarke et al. | |
| 7,395,753 B2 | 7/2008 | Dorion | |
| 7,461,587 B2 | 12/2008 | Guerrero | |
| 7,601,374 B2 | 10/2009 | Clarke | |
| 7,604,826 B2 | 10/2009 | Denisart et al. | |
| D610,903 S | 3/2010 | Shapiro et al. | |
| 7,722,907 B2 | 5/2010 | Roberts et al. | |
| 7,748,561 B2 | 7/2010 | Varriano-Marston et al. | |
| D635,816 S | 4/2011 | France et al. | |
| D635,817 S | 4/2011 | France et al. | |
| D636,218 S | 4/2011 | France et al. | |
| D638,701 S | 5/2011 | Shapiro et al. | |
| D639,186 S | 6/2011 | Shapiro et al. | |
| D639,656 S | 6/2011 | Shapiro et al. | |
| 8,062,682 B2 | 11/2011 | Mandralis et al. | |
| 8,064,928 B2 | 11/2011 | Venkatachalam | |
| 8,092,848 B2 | 1/2012 | Clarke | |
| D653,495 S | 2/2012 | France et al. | |
| 8,226,999 B2 | 7/2012 | Roberts et al. | |
| 8,237,084 B2 | 8/2012 | Varriano-Marston et al. | |
| 8,302,528 B2 | 11/2012 | Pawlick et al. | |
| 8,549,996 B2 | 10/2013 | Pryor et al. | |
| 8,574,650 B2 | 11/2013 | Turover et al. | |
| 8,678,236 B2 * | 3/2014 | Burke | B67D 7/0216 222/101 |
| 8,747,193 B2 | 6/2014 | Bolte et al. | |
| 8,828,463 B2 | 9/2014 | Clark | |
| 8,985,395 B2 | 3/2015 | Tansey | |
| 9,138,096 B2 | 9/2015 | Yoakim | |
| 9,493,298 B2 | 11/2016 | Evans et al. | |
| 2002/0007155 A1 | 1/2002 | Freund et al. | |
| 2002/0020302 A1 | 2/2002 | Heczko | |
| 2005/0051478 A1 | 3/2005 | Karanikos et al. | |
| 2005/0188854 A1 | 9/2005 | Green et al. | |
| 2005/0268573 A1 | 12/2005 | Yan | |
| 2006/0156878 A1 | 7/2006 | Faires et al. | |
| 2007/0110852 A1 | 5/2007 | Gouverneur | |
| 2007/0199453 A1 | 8/2007 | Rasmussen et al. | |
| 2008/0028943 A1 | 2/2008 | Lee | |
| 2008/0127994 A1 | 6/2008 | Rippl et al. | |
| 2008/0314261 A1 | 12/2008 | Hensel | |
| 2009/0007793 A1 | 1/2009 | Glucksman et al. | |
| 2009/0022858 A1 | 1/2009 | Pawlick | |
| 2009/0152296 A1 | 6/2009 | May | |
| 2009/0272274 A1 | 11/2009 | De Graaff et al. | |
| 2009/0320693 A1 | 12/2009 | Ozanne | |
| 2010/0003371 A1 | 1/2010 | Ozanne et al. | |
| 2010/0005973 A1 | 1/2010 | Dogolioni | |
| 2010/0050886 A1 | 3/2010 | Obersteiner et al. | |
| 2011/0036244 A1 | 2/2011 | Chatterjee et al. | |
| 2011/0076361 A1 | 3/2011 | Peterson et al. | |

(56) References Cited

U.S. PATENT DOCUMENTS

| | | | |
|---|---|---|---|
| 2011/0110180 A1 | 5/2011 | Snider et al. | |
| 2011/0159157 A1 | 6/2011 | De Rocco et al. | |
| 2011/0274801 A1 | 11/2011 | Haber | |
| 2011/0297013 A1 | 12/2011 | Sciamma | |
| 2012/0021108 A1 | 1/2012 | Baumann et al. | |
| 2012/0103197 A1 | 5/2012 | Chase et al. | |
| 2012/0307013 A1 | 12/2012 | Hjalmarsson et al. | |
| 2012/0321756 A1 | 12/2012 | Estabrook et al. | |
| 2013/0008322 A1 | 1/2013 | Lee | |
| 2013/0105512 A1* | 5/2013 | McGill | A23G 9/045 |
| | | | 222/39 |
| 2013/0126370 A1 | 5/2013 | Diliberto et al. | |
| 2013/0199949 A1 | 8/2013 | Lefkovitz et al. | |
| 2013/0209628 A1 | 8/2013 | Turover et al. | |
| 2013/0216663 A1 | 8/2013 | Dogan et al. | |
| 2013/0221030 A1 | 8/2013 | Middleton | |
| 2013/0303064 A1 | 11/2013 | Rusko et al. | |
| 2013/0334352 A1 | 12/2013 | Beber et al. | |
| 2014/0178545 A1 | 6/2014 | Fach | |
| 2014/0314918 A1 | 10/2014 | Wettlaufer et al. | |
| 2014/0377416 A1 | 12/2014 | Clarke | |
| 2015/0183627 A1 | 7/2015 | Tansey | |
| 2015/0359256 A1 | 12/2015 | Wettlaufer et al. | |
| 2015/0374025 A1 | 12/2015 | Evans et al. | |
| 2016/0000135 A1 | 1/2016 | Evans et al. | |
| 2016/0242455 A1 | 8/2016 | Evans et al. | |
| 2016/0242456 A1 | 8/2016 | Evans et al. | |
| 2016/0244249 A1 | 8/2016 | Evans et al. | |

FOREIGN PATENT DOCUMENTS

| | | |
|---|---|---|
| CN | 201341424 Y | 11/2009 |
| CN | 102774028 A | 11/2012 |
| DE | 2801200 A1 | 7/1979 |
| DE | 3132358 A1 | 4/1983 |
| DE | 3413309 A1 | 10/1985 |
| DE | 3432774 A1 | 3/1986 |
| DE | 202005021174 U1 | 6/2007 |
| EP | 0060420 A1 | 9/1982 |
| EP | 0 122 968 A2 | 10/1984 |
| EP | 0242556 A1 | 10/1987 |
| EP | 0668148 A1 | 8/1995 |
| EP | 0824064 A1 | 2/1998 |
| EP | 1472156 A2 | 11/2004 |
| EP | 1632338 A2 | 3/2006 |
| EP | 1684619 A1 | 8/2006 |
| EP | 1784344 A2 | 5/2007 |
| EP | 1785369 A1 | 5/2007 |
| EP | 2062831 A2 | 5/2009 |
| EP | 2397286 A2 | 12/2011 |
| ES | 2302624 A1 | 7/2008 |
| FR | 2722731 A1 | 1/1996 |
| FR | 2767530 A1 | 2/1999 |
| FR | 2950357 A1 | 3/2011 |
| GB | 1 242 292 A | 8/1971 |
| GB | 2 376 648 A | 12/2002 |
| GB | 2401810 A | 11/2004 |
| JP | S60-2155 A | 1/1985 |
| JP | S60-24168 A | 2/1985 |
| JP | S62-254856 A | 11/1987 |
| JP | H07313336 A | 12/1995 |
| JP | H10180144 A | 7/1998 |
| WO | WO 1983/01268 A1 | 4/1983 |
| WO | WO 1994/012040 A1 | 6/1994 |
| WO | WO 2003/059778 A2 | 7/2003 |
| WO | WO 2005/051146 A1 | 6/2005 |
| WO | WO 2006/021405 A2 | 3/2006 |
| WO | WO 2006/111807 A1 | 10/2006 |
| WO | WO 2013/128004 A1 | 9/2013 |
| WO | WO 2013/132068 A1 | 9/2013 |
| WO | WO 2014/060724 A1 | 4/2014 |
| WO | WO 2014/182423 A1 | 11/2014 |

\* cited by examiner

PRESS

RELATED APPLICATIONS

This Application is a continuation under 35 U.S.C. § 120 of U.S. application Ser. No. 15/447,318, filed on Mar. 2, 2017, which claims the benefit under 35 U.S.C. § 119(e) to U.S. Provisional Application Ser. No. 62/303,080, filed on Mar. 3, 2016.

FIELD

Disclosed embodiments are related to press machine.

DISCUSSION OF THE RELATED ART

Devices for extracting fresh juice from food matter such as fruits and vegetables have been developed over the years for both home and commercial markets. Typical commercial juicers tend to be large, expensive, and are unsuitable for home or small retail environments. Systems more suitable for home and small retail environments have utilized several different methods for extracting juice from the food matter as described below. Such systems typically require food matter to be prepared for juicing, for example, by a user cutting the food matter into appropriately sized pieces. Furthermore, typical juicers may require different components or configurations to extract juice from different types of food matter, and are thus not well suited for preparing custom juice blends.

In centrifugal-type juicers, food matter is fed through a chute, or other entrance, where a set of mechanical blades rotating at a high speed cut and/or grind the food matter to a pulp. Centripetal force is then applied by rapidly rotating the food matter to separate juice from the pulp through a filter. A second type of home and retail juicer is a masticating juicer which uses an auger to crush the food matter into a pulp. The resulting pulp is further compressed by the auger to extract juice through an associated filter. Another type of juicer is a hydraulic press juicer which typically uses a hydraulic press to compress food matter between one or more surfaces that are in direct contact with the food matter to extract the juice.

SUMMARY

In one embodiment, a press includes a housing having an upper portion having a lower region and a dispensing outlet disposed at the lower region of the upper portion of the housing. A dispensing area is defined in a face of the housing and below the dispensing outlet. A pair of opposing platens is disposed within the upper portion of the housing. The upper portion of the housing and the pair of opposing platens define a pressing chamber that is constructed and arranged to receive a cartridge. One of the pair of opposing platens is a stationary platen that is stationary relative to the housing when the press is pressing the cartridge and the other of the opposing platens is a movable platen that is moveable relative to the stationary platen and the housing when the press is pressing the cartridge. The dispensing outlet is constructed and arranged to receive a portion of the cartridge so that the portion of the cartridge is extendable through and beyond the dispensing outlet and into the dispensing area. A drive system operatively coupled to the movable platen to move the movable platen toward the stationary platen. A lining is disposed within the pressing chamber. The lining is sized and shaped to cover at least a portion of opposing pressing surfaces of the opposing platens.

In another embodiment, a includes a housing having an upper portion having a lower region and a dispensing outlet disposed at the lower region of the upper portion of the housing. A dispensing area is defined in a face of the housing and below the dispensing outlet. A pair of opposing platens is disposed within the upper portion of the housing. The upper portion of the housing and the pair of opposing platens define a pressing chamber that is constructed and arranged to receive a cartridge. One of the pair of opposing platens is a stationary platen that is stationary relative to the housing when the press is pressing the cartridge and the other of the opposing platens is a movable platen that is moveable relative to the stationary platen and the housing when the press is pressing the cartridge. The dispensing outlet is constructed and arranged to receive a portion of the cartridge so that the portion of the cartridge is extendable through and beyond the dispensing outlet and into the dispensing area. A drive system operatively coupled to the movable platen to move the movable platen toward the stationary platen. A seal is disposed within the pressing chamber.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
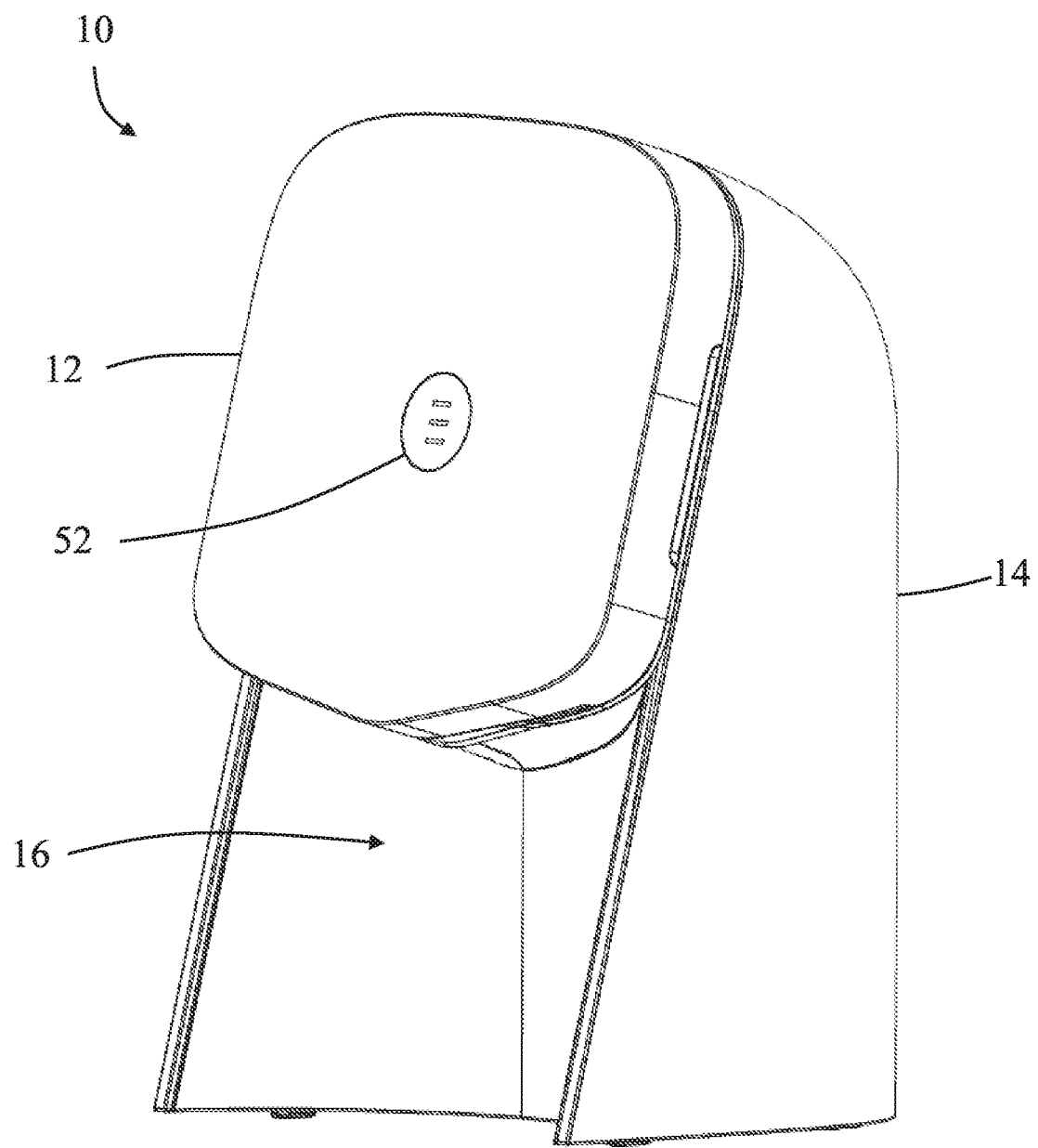
FIG. 1 is a perspective view of one embodiment of a juicer.

The inventors have recognized drawbacks related to the use of typical juicers such as centrifugal juicers, masticating juicers, and conventional press juicers. More specifically, these types of juicers are exposed to food matter and extracted liquids during use. Due to the use of complex mechanisms within these juicers, crushed and/or pulped food matter left after juice extraction may become entrapped in the machinery of these juicers, making cleanup difficult. If not completely cleaned, undetected food matter left behind within a juicer may become a food safety hazard. Furthermore, typical juicers may require difficult and/or time consuming preparation of food matter in addition to oftentimes being complex to operate.

In view of the above, the inventors have recognized numerous benefits associated with a juicing system capable of providing a variety of juices and/or juice blends without the need to prepare individual ingredients as well as dealing with the complex operation and cleaning associated with a typical juicing system. For example, the inventors have found that a juicing system in which food matter contained within individual juicer cartridges that are positioned within and pressed by a corresponding juicer may afford simple operation and cleanup. In some embodiments, such a juicing system may press one or more juicer cartridges containing single or multiple ingredients to create one or more servings of a custom juice blend while minimizing and/or eliminating contact between the juicer and the associated food matter and/or extracted juice. However, instances where a particular embodiment, or concept, is used in a system where juice and/or food matter come into contact with a portion of a juicer are also contemplated.

In one embodiment, a juicer includes a pressing chamber sized and shaped to receive one or more juicer cartridges containing food matter. The pressing chamber may include one or more displaceable pressing surfaces that are associated with the pressing chamber and which may be driven by a suitable drive mechanism during actuation, as will be described in more detail below. Displacement of the one or more pressing surfaces relative to the pressing chamber may compress the one or more juicer cartridges in the pressing chamber in order to apply pressure to the food matter contained therein and extract juice from the food matter.

In some embodiments, it is desirable to help control a flow of juice exiting a juicer from an associated juicer cartridge. In such embodiments, a pressing chamber may include a juicer outlet that is configured to receive an outlet of a juicer cartridge positioned within a pressing chamber of the juicer. Depending on the particular embodiment, the juicer outlet may be constructed and arranged such that the outlet of the juicer cartridge extends beyond an exterior edge of the juicer outlet from the pressing chamber to an exterior of the juicer.

Such a configuration may help to reduce or eliminate contact between the juicing system and any extracted juice in order to minimize contamination and/or cleanup of the juicer after juicing. However, it should be understood that embodiments in which an outlet from the juicer cartridge is not positioned within an outlet from an associated pressing chamber as well as embodiments where an outlet from a juicer cartridge does not extend out from a juicer are also contemplated.

Depending on the desired application, a juicer may also include a dispensing area adapted to receive a beverage container. The dispensing area may be located adjacent to an outlet from a pressing chamber of a juicer so that juice is directed from the outlet of the juicer cartridge directly into the beverage container when the juicer cartridge is pressed. In one such embodiment, the dispensing area is formed as a recess in an exterior housing of the juicer, and is sized and shaped to receive a desired beverage container such as a mug or glass. In other embodiments, the juicer may not include a recess, and the dispensing area may instead be an exterior area adjacent the juicer into which juice is directed from the juicer cartridge outlet. Accordingly, it should be understood that any suitable configuration that may allow a user to position a beverage container to receive juice from a juicer may be used, as the current disclosure is not limited to any particular configuration for a dispensing area.

According to some embodiments, the pressing chamber may be selectively openable to allow for loading and/or unloading of juicer cartridges. Depending on the particular embodiment, a juicing system may include one or more doors movable between an open position and a closed position. When the door is in the open position, the pressing chamber is exposed, permitting a user to easily load or unload one or more juicer cartridges from the pressing chamber. Once the one or more doors are closed, the pressing chamber is ready for pressing the one or more juicer cartridges contained therein. It should be understood that the one or more doors may feature any suitable number of moveable portions which attach to the juicer via one or more hinges or other attachment mechanisms, including arrangements such as a single panel door, a bi-fold door, a tri-fold door, a rolling door, or a French door. Additionally, the one or more doors may open in any appropriate direction, including to the side, or up and down. In some embodiments, a door alternatively may slide between an open and a closed position, and thus may not include a hinge. As discussed in more detail below, the juicer may include a suitable lock to secure the door in a closed position during pressing. Additionally, in some embodiments, a portion of the interior surface of the door may be used as a fixed pressing surface (e.g. opposing a movable pressing surface) when the door is in the closed position to facilitate juicing. Though embodiments in which the door does not act as a pressing surface are also contemplated.

While the use of one or more doors to selectively open and close the pressing chamber is described above, in some embodiments, the pressing chamber may not include a door or other openable feature, as the disclosure is not so limited. For example, in one such embodiment, the pressing chamber may include a suitably sized and shaped opening such as a slot at the top or side of the chamber to allow one or more juicer cartridges to be loaded into and/or unloaded from the pressing chamber. Accordingly, it should be understood that juicer cartridges may be loaded or unloaded from the pressing chamber of a juicer by via any suitable structure or mechanism.

Having described several general aspects of a juicer several illustrative embodiments of juicers are described further in relation to the figures. However, it should be understood that the juicers and juicer cartridges described herein should not be limited to only the embodiments shown in the figures, and instead the various aspects and components of the juicers and juicer cartridges described herein may be used in any appropriate arrangement or combination as the disclosure is not so limited.

Figure 2:
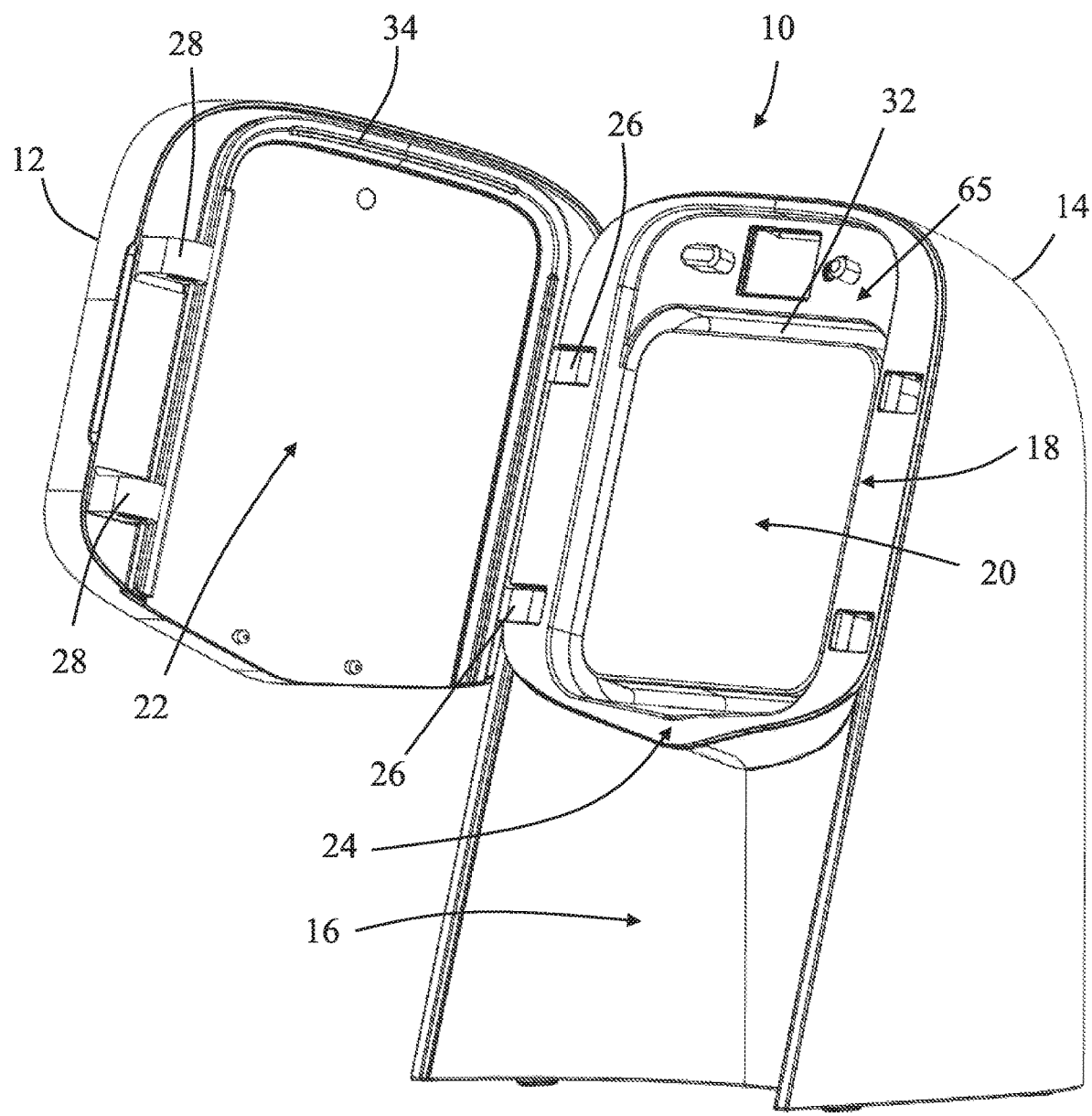
FIG. 2 is a perspective view of the juicer of FIG. 1 with a door of the juicer in an open position.

FIGS. 1-2 depict perspective views of one illustrative embodiment of a juicer 10. The juicer includes a door 12 movable between a closed position, as shown in FIG. 1, and an open position as shown in FIG. 2. The juicer includes an outer housing 14 that surrounds and covers an internal frame (not depicted) and various internal components of the juicer, which are discussed in more detail below. A dispensing area 16 is formed as a recess in the housing 14. The recess is sized and shaped to receive a user's beverage container. For example, the dispensing area 16 depicted in the figure forms a curved recess in the housing underlying the door. However, it should be understood that the dispensing area may have any suitable shape, and may not be curved in some embodiments, as the disclosure is not so limited. For example, a recess may be formed from two or more planar portions, or alternatively, the dispensing area may be located in an area that is not adjacent to, i.e. removed from, the front of the juicer 10. Alternatively, the dispensing area may not correspond to a recess. For example, a dispensing area may be an extension from the juicer.

As shown in the embodiment of FIG. 2, the juicer 10 includes a pressing chamber 18 that is sized and shaped to accept one or more corresponding juicer cartridges within the pressing chamber. The pressing chamber includes a movable pressing surface 20 that is driven by an associated drive mechanism, discussed in more detail below. A fixed pressing surface 22 is located on an interior surface of the door 12 that is located opposite the movable pressing surface 20 when the door is in the closed position. In this manner, a juicer cartridge may be pressed between the movable pressing surface 20 and the fixed pressing surface 22 when the juicer cartridge is loaded in the closed pressing chamber and the movable pressing surface 20 is moved towards the fixed pressing surface 22.

In some embodiments, a pressing chamber 18 includes a juicer outlet 24 arranged to receive an outlet of a juicer cartridge and direct the juicer cartridge outlet toward the dispensing area 16 of the juicer 10. For example, in the depicted embodiment, a portion of a front face of the pressing chamber 18 is angled towards the dispensing area 16. In other embodiments, the juicer outlet may include a cutout or any other suitable structure capable of receiving a juicer cartridge outlet. In some instances, the juicer outlet may be formed as a channel, or other open space, between the juicer door and the front face of the pressing chamber when the door is closed, and the juicer cartridge outlet may pass through the space when the juicer cartridge outlet is received in the juicer outlet. Accordingly, the juicer outlet may allow fluid communication between an interior of the pressing chamber and an exterior of the juicer.

Figure 3:
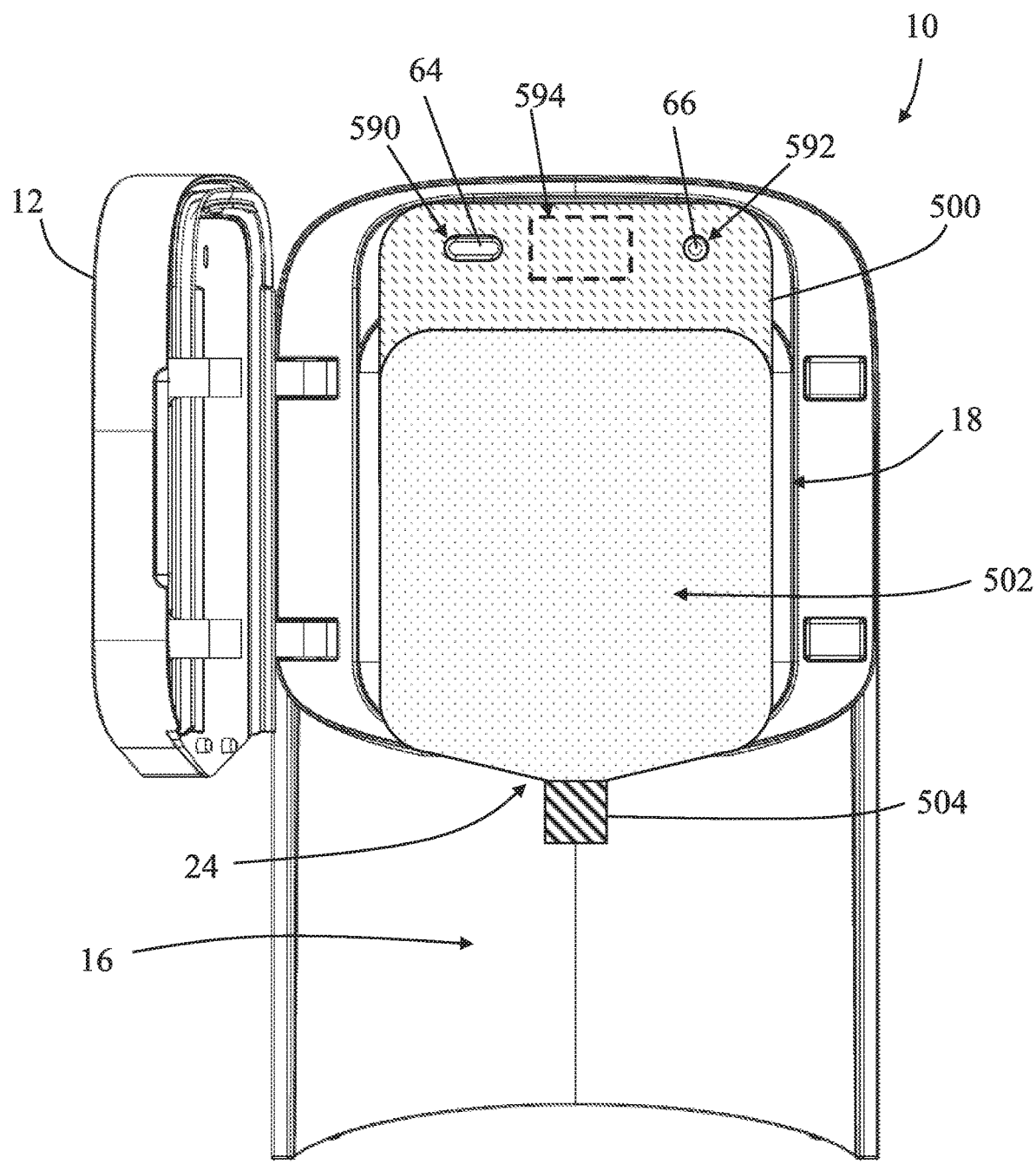
FIG. 3 is front view of the juicer of FIG. 1 with the door in the open position, further including a corresponding juicer cartridge.
Figure 4:
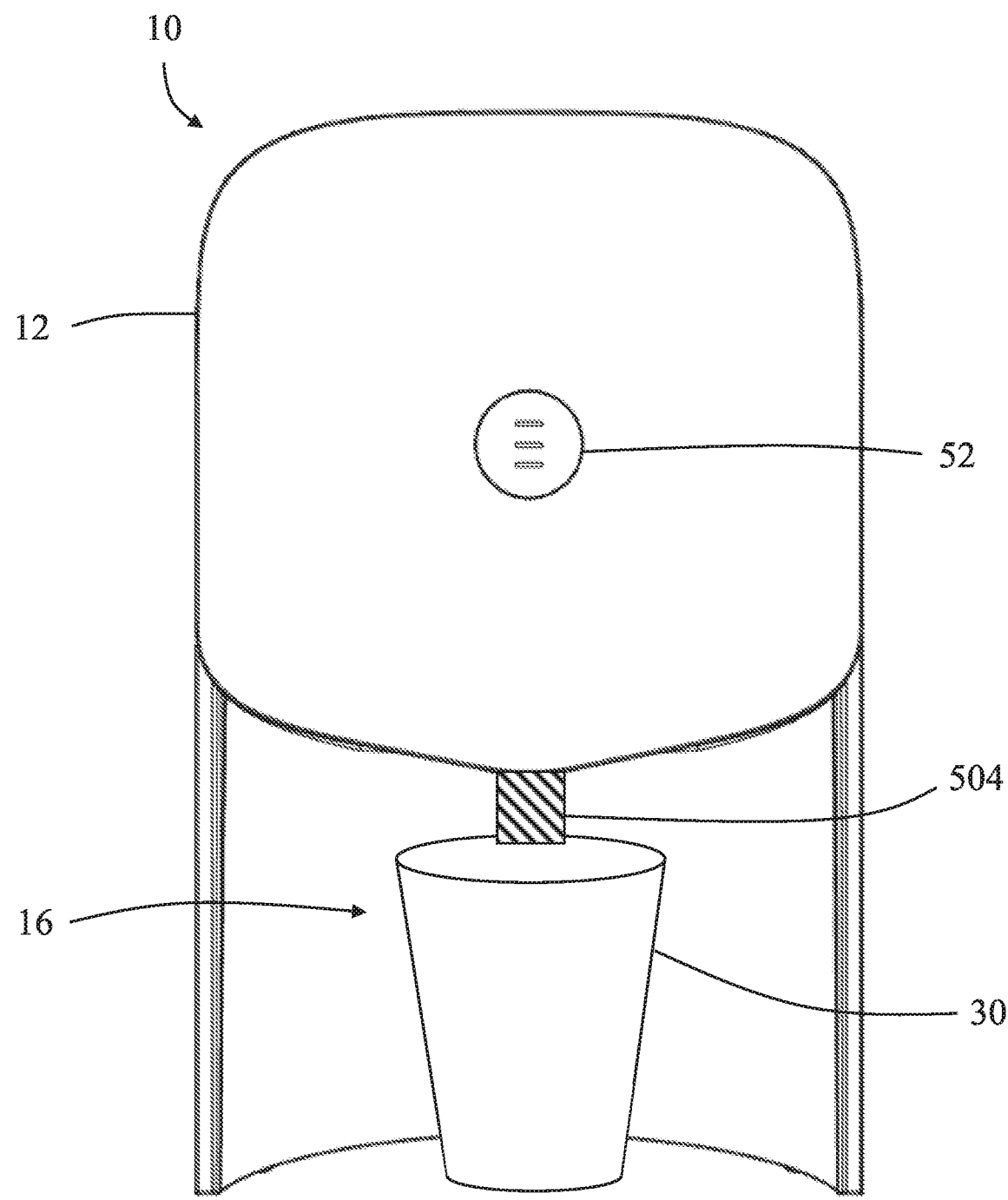
FIG. 4 is a front view of a the juicer of FIG. 1 with the door in a closed position, further including the corresponding juicer cartridge.

FIGS. 3-4 show front views of one embodiment of a juicer 10 in the open position and closed position, respectively, and with a corresponding juicer cartridge 500 loaded in the pressing chamber 18. It should be understood that any suitable juicer cartridge may be used in the juicer 10. For example, in one embodiment, a juicer cartridge having a liquid impermeable compartment 502 containing food matter, and an outlet 504 associated with the liquid impermeable compartment for dispensing extracted juice, is depicted in FIG. 3. However, other juicer cartridges, such as those described in more detail below, may also be used with the juicer 10, as the current disclosure is not limited in this regard. As shown in FIG. 4, in some embodiments, when a juicer cartridge is loaded in the juicer 10 and the door 12 is in the closed position, at least a portion of the outlet 504 of the juicer cartridge extends out from the juicer outlet 24 and into the dispensing area 14. In this manner, juice may be dispensed directly into a beverage container 30 provided in the dispensing area without extracted juice or other food matter contacting the juicer 10.

Figure 5:
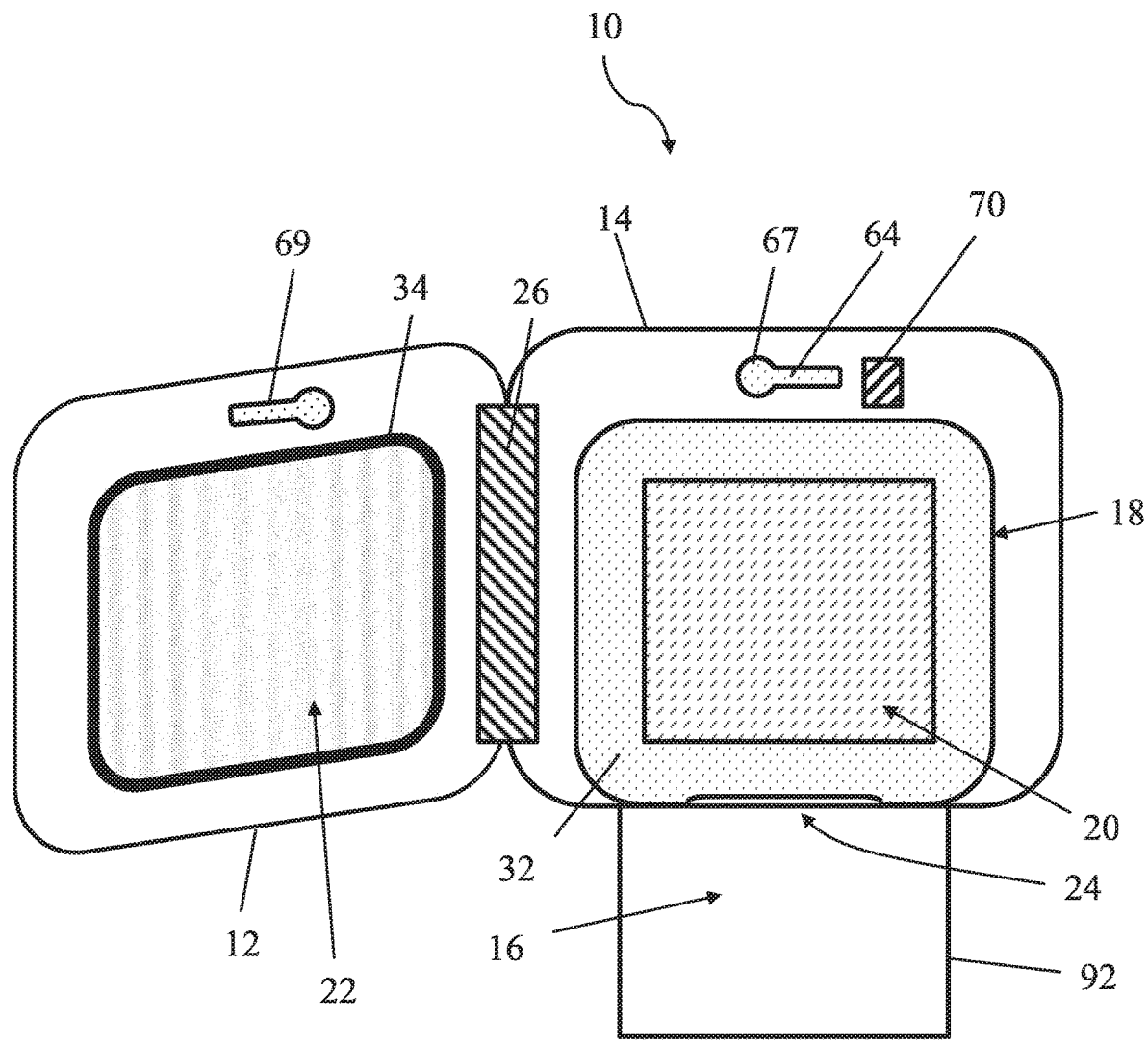
FIG. 5 is a schematic representation of another embodiment of a juicer.

FIG. 5 is a schematic representation of another embodiment of a juicer 10. Similar to the embodiment described above, the juicer 10 includes a housing 14 that contains the internal components of the juicer. A pressing chamber 18 is constructed in the housing and includes a first, displaceable pressing surface 20 such as a movable platen. The pressing chamber includes a juicer outlet 24 in a bottom portion of the pressing chamber; in this embodiment, the juicer outlet is configured as a cutout in the pressing chamber sized and/or shaped to accept an outlet of a juicer cartridge. The juicer further includes a door 16 connected to the housing 14 via a hinge 26. A second or opposing pressing surface 22 is positioned on a portion of the interior surface of the door. Further, the juicer 10 includes a base 92 separate from the housing 14. A portion of the housing 14 may overhang the base 92 to form a dispensing area 16 adjacent the base and under the juicer outlet 24.

As discussed above, a juicer may include a door that is movable between an open position and a closed position. For example, moving the door to the open position may expose a pressing chamber for loading and/or unloading of corresponding juicer cartridges. In some embodiments, the door of a juicer may include an interior surface that is used as a fixed pressing surface when the door is in the closed position. For example, the interior surface may be located opposite a displaceable pressing surface in the pressing chamber of the juicer such that the movable pressing surface may press an associated juicer cartridge against the fixed pressing surface during a pressing operation to apply pressure to the food matter within the juicer cartridge. Accordingly, the door of a juicer may be constructed and arranged to withstand the forces applied to the fixed pressing surface by the movable pressing surface when a juicer cartridge is pressed. However, other embodiments in which the door is not located on a side of the pressing chamber that is opposite the displaceable pressing surface are also contemplated.

In one embodiment, a fixed pressing surface on a door, one or more hinges, and/or lock components that secure the door to the juicer are integrally formed as a single monolithic structure, e.g. machined from a single plate or cast as a single piece. Without wishing to be bound by any particular theory, a monolithic construction may allow the door to have a higher strength and withstand greater pressing forces compared to a non-monolithic construction. For example, in one embodiment the fixed pressing surface may be formed as a plate having one or more hinges on one edge of the plate that are permanently attached to the juicer, and one or more locking portions on an opposing edge of the plate that can be releasably engaged with the juicer. However, it should be understood that other embodiments in which a fixed pressing surface on the door, hinges, and/or locking portions of a door are not formed as a monolithic structure are also contemplated. For instance, the pressing surface, hinges, and/or locking portions may be formed as separate components that are assembled together with screws, bolts, rivets, welds, or any other suitable fastening mechanisms. Further, in certain embodiments, the door may also include a cover disposed over at least a portion of the fixed pressing surface such that the pressing surface does not directly contact a juicer cartridge. In such an embodiment, the cover may directly contact a juicer cartridge located within the pressing chamber while the fixed pressing surface provides the structural support required for pressing of the juicer cartridge.

Figure 6:
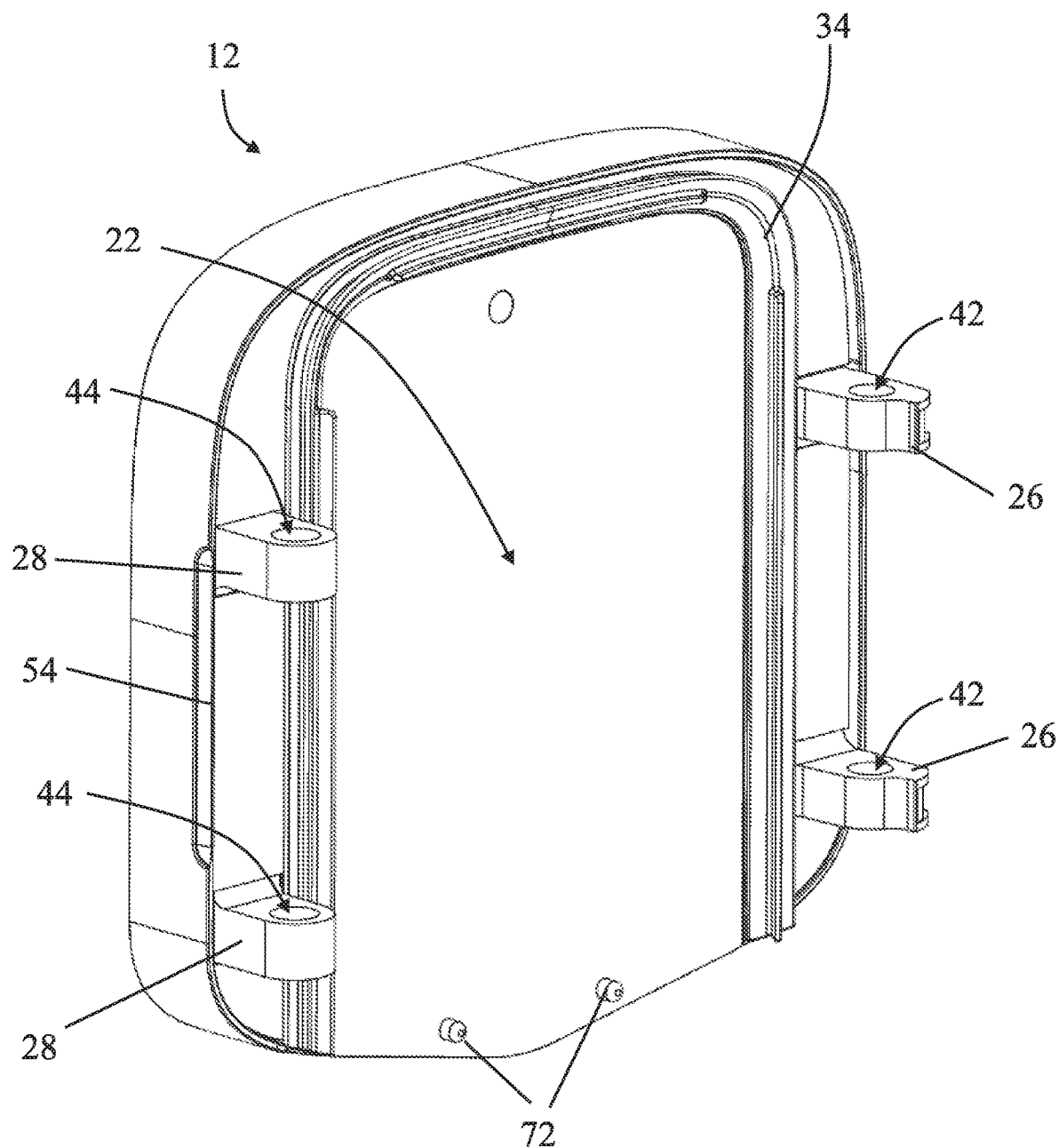
FIG. 6 is a perspective view of the juicer door of the juicer of FIG. 1.
Figure 7:
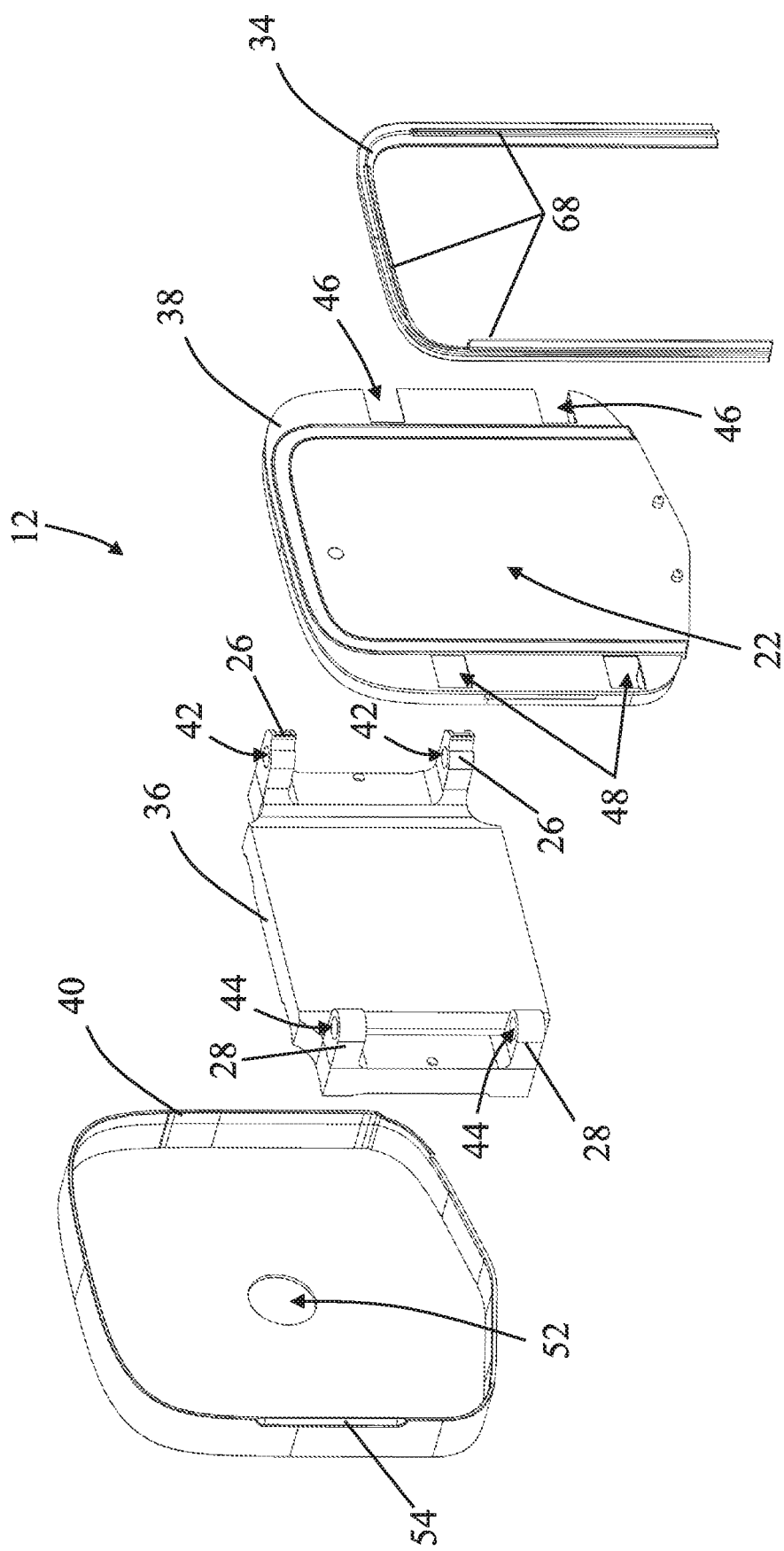
FIG. 7 is an exploded view of the juicer door of FIG. 6.

FIGS. 6-7 show a perspective view and an exploded view, respectively, of one embodiment of a door 12 usable to selectively open and close an associated pressing chamber of a juicer. As discussed above, the door includes a fixed pressing surface 22 that is located opposite a displaceable pressing surface in the pressing chamber as previously described. In the depicted embodiment, the fixed pressing surface includes a pressing plate 36 and a pressing plate cover 38 disposed on top of the pressing plate. Accordingly, the pressing plate cover 38 directly contacts the associated juicer cartridges located in the pressing chamber during pressing, while the pressing plate 36 provides a suitable degree of structural support to withstand the forces applied by a drive mechanism during a pressing operation. Although a separate pressing plate cover is shown and described above, it should be understood that in some embodiments, a juicer door may not include a pressing plate cover. For example, in one such embodiment, a surface of the pressing plate may act as the fixed pressing surface and may directly contact a juicer cartridge during pressing.

Referring again to FIGS. 6-7, the pressing plate 36 includes one or more hinges 26 extending from a first edge of the pressing plate and one or more locking portions 28 extending from a second edge of the pressing plate. In the depicted embodiment, the first and second edges are located opposite one another, though embodiments with the locking portions and hinges located on sides adjacent to one another are also contemplated. In addition to the general layout of the features, in some embodiments, the pressing plate may be integrally formed with the hinges and locking portions to form a single, monolithic structure.

Figure 8:
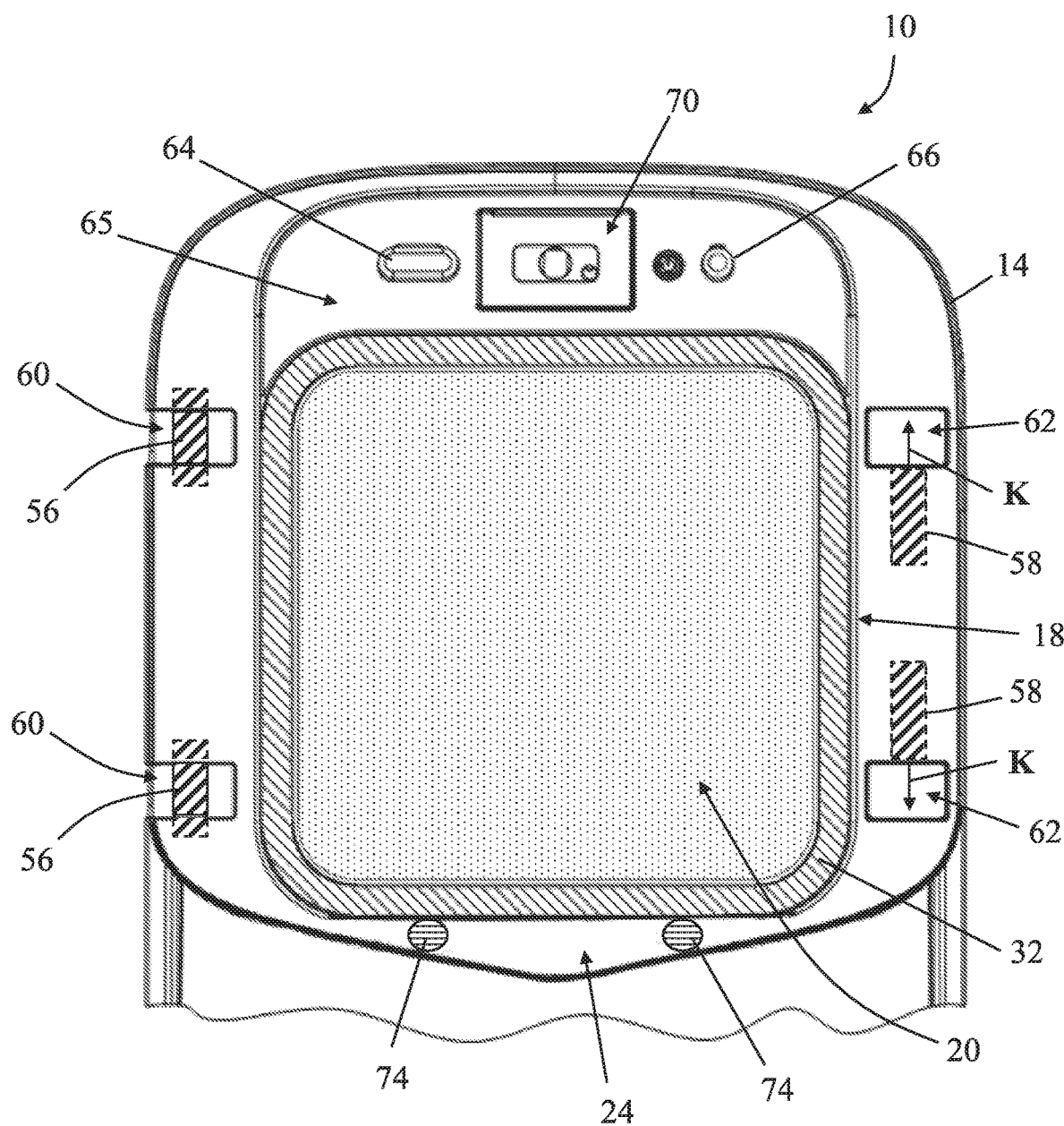
FIG. 8 is a front view of a portion of the juicer of FIG. 1.

In some embodiments, the hinges 26 of a door may include a through bore 42 constructed and arranged to receive a corresponding shaft 56 on the juicer, each of which is secured to the juicer within a hinge recess 60 that receives the hinge 26 when the door is attached (see FIG. 8). For example, the shaft may be a press-fit shaft attached to a frame, the pressing chamber, or other suitable component of the juicer, and the shaft may pass through the through bore 42. The shaft may be sized and shaped to permit rotation of the hinge, and correspondingly the door 12, about the shaft. In this manner, the hinges 26 permanently attach the door 12 to the juicer while allowing pivotal motion of the door 12 relative to the juicer for moving the door between the open and closed positions.

As noted above, in some instances, a shaft may be press-fit into corresponding through bores or cavities formed in the frame, pressing chamber, or other component of the juicer to attach a door to a juicer. However, in alternative embodiments, the door may be attached to the juicer in a variety of ways. For example, a shaft may be a threaded fastener such as a bolt, which may engage a corresponding threaded through bore or cavity on the juicer. Further, a hinge may not have a through bore that extends all the way through the hinge in some embodiments. For instance, a hinge may have one or more cavities that extend partially through the hinge and receive one or more corresponding shafts or other suitable features on the juicer. In other embodiments, however, a hinge may not include a through bore. For example, in one such embodiment a hinge may have one or more projections extending outwardly from the hinge that are received in corresponding through bores or cavities formed in the juicer.

As noted above, a juicer may include a lock to secure the door to the juicer in the closed position. In some embodiments, the lock includes one or more locking portions on the door, such as recesses, that are selectively engageable with one or more corresponding locking portions on the juicer, such as extendable bolts. For example the lock bolts may be movable between a retracted position and an extended position to selectively engage the recess formed on the door, corresponding to an unlocked configuration and a locked configuration, respectively. Depending on the embodiment, the lock bolts may be connected to any suitable portion of the juicer, such as a frame or pressing chamber. Referring again to FIGS. 6-7, each of the locking portions 28 on the door 12 includes a lock recess 44 constructed and arranged to receive a corresponding lock bolt 58 on the juicer (FIG. 8). As discussed in more detail below, the lock bolts on the juicer may selectively engage the lock recesses formed in the locking portions of the door to secure the door to the juicer in the closed position. For example, in FIG. 8, the lock bolts 58 are shown in a retracted position such that the door may be moved from an open position to a closed position, and subsequently, the lock bolts may be displaced by an associated lock drive or manual mechanism to engage the lock recesses 44, as described in more detail below. Once the door is secured to the juicer in the closed position, the pressing plate 36 is fixed in place along two opposing edges by the hinges and the engaged lock to close the pressing chamber, and in some embodiments, provide a fixed pressing surface against which a juicer cartridge may be pressed.

As discussed in more detail below, in certain embodiments the door may contain one or more electronic components such as user interface elements or control circuits. Accordingly, the pressing plate cover 38 may provide a barrier between these internal components of the door and the pressing chamber such that the internal components may not exposed to food matter and/or juice in the event that a juicer cartridge inadvertently leaks or ruptures during juicing. The pressing plate cover includes cutouts 46 and 48 through which the hinges 26 and locking portions 28 are received, respectively, when the door is assembled. However, as noted above, a pressing plate cover may not be included in some embodiments, and the pressing plate 36 may directly contact a juicer cartridge during pressing.

In the depicted embodiment, each of the through bores 42 and lock recesses 44 are depicted as cylindrical throughbores extending through the hinges 26 and locking portions 28, respectively. However, it should be understood that these features may have any suitable shape and/or configuration, as the current disclosure is not so limited. For example, the lock recesses may have a non-circular cross-sectional shape that corresponds to a non-circular cross-sectional shape of the lock bolts 58. Further, the through bores of the hinges and/or the lock recesses may extend only partially through the hinges and/or locking portions. Additionally, in the depicted embodiment, the through bores 42 of the hinges 26 are aligned along a first axis and the lock recesses 44 of the locking portions 28 are aligned along a second axis parallel to the first axis. The first and second axes are also parallel to the door and pressing surfaces of the juicer. However, in other embodiments, the through bores and/or lock recesses may not be aligned. For example, in embodiments including two or more locking portions, the lock recesses, or other appropriate feature used to selectively lock the separate portions of the lock together, may be offset and/or oriented at different angles relative to one another, the hinges, the door, and/or one or more pressing surfaces of the juicer, as the disclosure is not so limited.

Depending on the particular embodiment, the door of a juicer may have any suitable number of hinges and/or locking portions associated with any suitable sides of the door that permit the door to be selectively moved between an open and closed position and selectively locked in the closed position. For example, FIG. 5 depicts a juicer 10 in which the door 12 is attached by a single hinge 26. Further, a door may have a different number of hinges than locking portions. For example, a door may have two hinges and only one locking portions. Moreover, although a door having hinges that are permanently attached to the juicer is described above, the door may instead have one or more locking portions on either side of door such that the entire door is selectively attachable to the juicer. For example, in one embodiment the door may be a panel with locking portions provided on two or more edges, and the locking portions may be configured to completely disengage the door from the juicer so that it may be removed for loading and/or unloading of juicer cartridges. The door may be subsequently attached to the juicer and secured in place for pressing. In view of the above, it should be understood that the current disclosure is not limited to any particular configuration of the hinges and/or locking portions on a juicer door.

In certain embodiments, a juicer door may include a user interface that a user may interact with to control certain aspects of the operation of the juicer. In such an embodiment, the door may contain control circuits or other suitable electronic components associated with the user interface, which are electronically connected to additional circuits provided within the juicer. For example, in the embodiment illustrated in FIGS. 1-4, a button 52 is provided on the exterior surface of the door. As illustrated in the figure, in some embodiments, the button 52 may include a display that provides information regarding a status of the juicer. For example, a combination of shapes, colors, text, and/or patterns may be used to indicate that a juicer is prevented from operating due to any number of conditions, that the juicer has a juicer cartridge in a pressing chamber ready for pressing, that the juicer is performing a pressing operation, that a pressing operation is done and a juicer cartridge may be removed, and/or any other information that a user may wish to have displayed, However, it should be understood that in other embodiments, the door may not include a button, display, or any other user interface element, as the current disclosure is not limited in this regard.

As best illustrated in FIG. 7, in some embodiments, a door 12 of a juicer includes an outer cover 40 which receives the pressing plate 36, pressing plate cover 38, and any other components which may be included within the door. In the depicted embodiment, the outer cover includes a cutout 50 that is shaped and sized to receive a user interface button 52 as described above. The outer cover may be attached to the various components of the door in any appropriate manner. For example, adhesives, welds, ultrasonic welds, mechanically interlocking features, threaded fasteners, or any other appropriate connecting mechanism may be used to attach the various components of the door together in any appropriate combination as the disclosure is not so limited. In addition to being attached to the various components, the outer cover, and/or a component associated with the door may also include a handle 54, or other appropriate feature, that a user may grip for opening and/or closing the door. Although the handle is depicted as an indentation along an edge of the outer cover 40, it should be understood that the handle may have any suitable shape and/or size. For example, the handle may be a knob or a loop extending from the side or the front of the door. Alternatively, in some embodiments, a door may not include a handle. Instead, a user may simply grab any suitable portion of the door (e.g., an edge or corner) to open and/or close the door.

As discussed in more detail below in regards to the pressing chamber, in some embodiments, a juicer door may include one or more seals 34 extending around at least a portion of a fixed pressing surface 22 of the door. In the embodiment depicted in FIG. 7, the seal may be disposed on the pressing plate cover 38 and extends around the sides adjacent to, and opposite from, a side of the pressing plate cover and door that form an outlet from the pressing chamber of the juicer when the door is in the closed position. Additionally, the seal may be attached to the pressing plate cover in any suitable manner. For example, in some embodiments, the seal may be attached to the pressing plate cover with a suitable adhesive and/or a press fit with a corresponding groove formed in the door, such as in the pressing plate cover or pressing surface. Alternatively, the seal may be integrally formed with the pressing plate cover. Appropriate materials for the seal include, but are not limited to polymeric materials such as silicone rubber, natural rubbers, thermoplastic rubbers, thermoplastic elastomers, or other elastomeric materials.

Depending on the particular embodiment, the other components of a juicer door may be made from any suitable combination of materials. For example, a fixed pressing plate, which may or may not include one or more hinges and/or locking portions, may be formed from a metal or metal alloy such as aluminum or aluminum alloys, iron alloys such as stainless steel, and or any other appropriate material. A pressing plate cover and/or door cover, may also be formed from a metallic material, or from any of a variety of polymeric materials (e.g., plastics), or any other suitable material. Accordingly, the current disclosure is not limited to any particular materials for the components of a juicer door or other portion of the juicer.

According to one aspect of the current disclosure, the inventors have found that a juicing system in which juicer cartridges are maintained in a substantially upright orientation during juicing may offer multiple benefits. For example, such a juicing system may provide for easy operation by utilizing gravity to aid in aligning a juicer cartridge in a juicing system. Additionally, an upright juicer cartridge orientation may aid in reducing the chance of clogging within the juicer cartridge. The upright orientation may also aid with directing extracted juice out of a juicer and into a beverage container, thus reducing the chance of spillage and/or contamination of the juicer. Furthermore, the upright orientation may allow the juicers and associated juicer cartridges to feature a simpler mechanical design compared to juicers which use other orientations, which in turn may result in cheaper and/or more facile manufacturing of such juicers and juicer cartridges. While particular benefits and features are noted above, it should be understood that a juicer incorporating vertically oriented juicer cartridges, may offer any one of the above noted benefits and may not provide all of the noted benefits or features as the disclosure is not so limited.

According to some embodiments, a pressing chamber of a juicer may be configured to maintain a juicer cartridge in an upright orientation during juicing. As described above, such a configuration may offer multiple benefits, including aiding with aligning and positioning a juicer cartridge in the pressing chamber and reducing the chance of contamination from inadvertent leakage of the juicer cartridge which may require extensive cleaning. For example, if a juicer cartridge leaks during juicing, the upright orientation and/or the configuration of the pressing chamber may help to direct juice towards the outlet area of the pressing chamber so that the juice may be directed away from the pressing chamber interior and other components within the juicer, and in some embodiments, into a beverage container.

As used herein, a juicer that maintains a juicer cartridge in an upright or vertical orientation generally refers to a juicer that orients an axis passing through the an outlet of the juicer cartridge downwardly at an angle between or equal to about 0 degrees and 30 degrees relative to a vertical axis extending upwardly from a base of the juicer when the juicer cartridge is appropriately loaded in the pressing chamber. Accordingly, an upright orientation may refer to a completely vertical orientation (i.e., a zero degree angle), or an inclined orientation (i.e., an angle greater than zero degrees). Depending on the particular embodiment, a juicer may orient a juicer cartridge in a vertical orientation in a number of ways. For example, an angle between one or more support features used to maintain a position of a juicer cartridge within a pressing chamber and an outlet from the pressing chamber may be between 0 degrees and 30 degrees relative to the vertical axis extending upwardly from the base of the juicer. Similarly, in some embodiments, an angle of one pressing surfaces within the juicer and/or an axis extending through an outlet of the juicer pressing chamber may also be between 0 degrees and 30 degrees relative to the vertical axis extending upwardly from the base of the juicer. Depending on the particular embodiment, the juicer cartridge outlet may be oriented at substantially the same angle as the one or more of the features noted above associated with the pressing chamber, or alternatively, the juicer cartridge outlet may be oriented at a different angle than the oriented features of the pressing chamber, as the current disclosure is not so limited.

Figure 9:
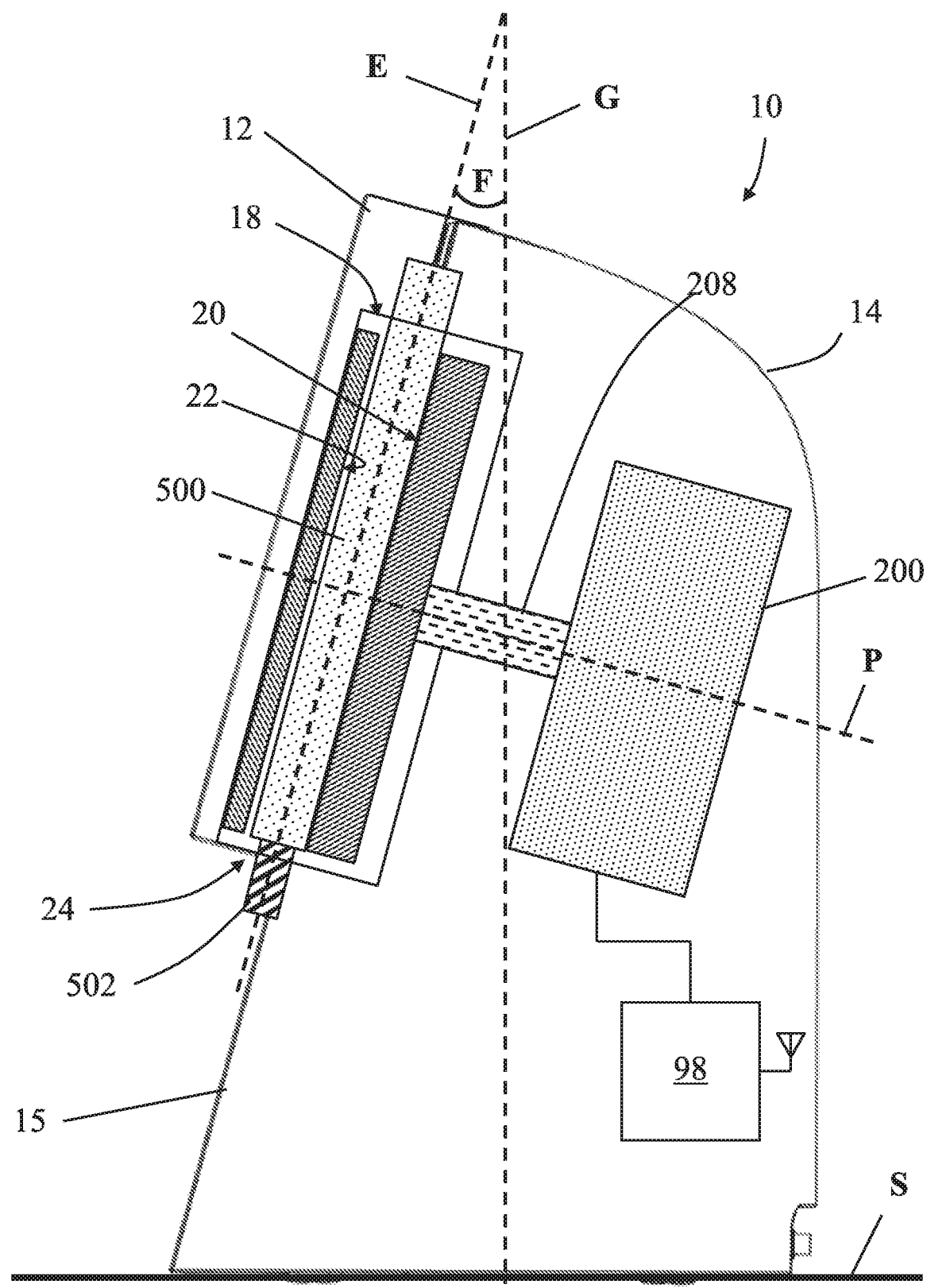
FIG. 9 is a schematic cross-sectional side view of one embodiment of a juicer, further including a corresponding juicer cartridge.

FIG. 9 depicts a schematic cross-sectional side view of one embodiment of a juicer 10 similar to that shown in FIGS. 1-4 with an associated juicer cartridge 500 loaded in the pressing chamber 18. In the depicted embodiment, the juicer is constructed and arranged such that an axis E extending through the outlet area 24 of the pressing chamber 18 forms an angle F with respect to a vertical axis G. Axis G is generally perpendicular to surface S on which a base of the juicer 10 sits. As noted above, in some embodiments, the pressing chamber is oriented at any suitable angle such that a juicer cartridge is maintained in a substantially upright orientation. For example, in some embodiments, the angle F may be greater than or equal to 0 degrees, greater than or equal to 5 degrees, greater than or equal to 10 degrees, greater than or equal to 15 degrees, greater than or equal to 20 degrees, or any other appropriate angle. Additionally, the angle F may be less than 35 degrees, less than 20 degrees, less than 15 degrees, less than 10 degrees, less than 5 degrees, or any other appropriate angle. Combinations of the above-noted ranges for the angle F at which the pressing chamber is oriented are contemplated. For example, in some embodiments, the angle F may be between about 0 degrees and 35 degrees, 5 degrees and 30 degrees, or any other appropriate combination or range of angles as the disclosure is not so limited.

In order to provide a desired pressing operation, in some embodiments, the one or more pressing surfaces located within a pressing chamber may be oriented in substantially the same orientation as corresponding faces of a juicer cartridge. For example, as depicted in FIG. 9, the displaceable pressing surface 20 and the fixed pressing surface 22 associated with the door 12 are both parallel to axis E which again is oriented at an angle F relative to a vertical axis extending upward from a base of the juicer. Furthermore, in some embodiments, the displaceable pressing surface 22 is configured to displace in a direction substantially perpendicular to axis E, such as along an axis P. However, it should be understood that in some embodiments the one or more pressing surfaces may not be parallel to the axis E and may be displaced in directions that are not perpendicular to axis E, as the current disclosure is not so limited. Additionally, in some embodiments, it may be desirable for one or more of the pressing surfaces to have a variable orientation that accommodates variation in the location and/or distribution of food matter within a juicer cartridge. Accordingly, a pressing surface may have a coupling that permits some amount of angular rotation between the displaceable pressing surface and an associated drive mechanism to permit the pressing surface to vary its orientation during one or more stages of a pressing operation, as will be described in more detail below.

In certain embodiments, a portion of the housing 14 may also feature an inclined orientation. For example, as depicted in FIG. 9, a front portion 15 of the housing 14 may be angled such that the surface is parallel to axis E. In such an embodiment, the front portion of the housing has substantially the same orientation relative to the base of the juicing system as the noted one or more features of the pressing chamber described above. In some instances, such a configuration may permit the juicer to accommodate larger juicer cartridges while still providing additional height under the outlet area 24 to accommodate a beverage container 30 and without adding additional overall height to the juicer 10. This may be beneficial to allow for a smaller juicing system which may be desirable in home appliance applications. For example, such a juicer may more readily fit on a kitchen counter beneath upper cabinets. Furthermore, a juicing system in which the housing and the pressing chamber feature substantially the same orientation may be easier and/or cheaper to manufacture. However, embodiments in which the housing and the pressing chamber have different orientations are also contemplated.

According to another aspect of the current disclosure, a juicing system may include one or more cartridge supports constructed and arranged to support a juicer cartridge in the pressing chamber. For example, in one embodiment, one or more cartridge supports associated with the pressing chamber of a juicer are selectively engageable with one or more couplings formed on an associated juicer cartridge, as described in more detail below, to support and maintain the juicer cartridge in a desired location and orientation during pressing. Depending on the particular embodiment, the cartridge supports and corresponding couplings may correspond to any number of different features and combinations of features including, but not limited to: interlocking mechanical components such as protrusions, ledges, pins, pegs, hooks, recesses, through holes, and openings; combinations of magnetic materials (e.g. two attracted magnets or a magnet and magnetically susceptible material); hook-and-loop materials (e.g., Velcro); a rigid spout or valve extending out from a juicer cartridge that mechanically interlocks, or otherwise interfaces, with a corresponding feature on a juicer; or any other suitable feature capable of supporting a juicer cartridge within the pressing chamber. In certain embodiments, the cartridge supports may include a frictional engagement region, such as an area that has a higher coefficient of friction compared to adjacent areas. In such embodiments, the corresponding coupling on the juicer cartridge may include a similar region with a higher coefficient of friction. Accordingly, when the cartridge is loaded in the pressing chamber, one or more components of the juicer (e.g., a juicer door) may press the frictional engagement regions together, thereby providing a normal force which brings the regions into frictional engagement. For example, on or more opposing regions on the door and frame may include frictional material that is either disposed on, or is set flush with, the surfaces of these components. Therefore, when the door is closed, the one or more portions of the juicer cartridge are pressed against one or more frictional engagement regions. Further, engagement of the juicer cartridge with the frictional engagement regions may either be on one, or both, sides of a juicer cartridge as the disclosure is not so limited.

In addition to the above, it should be understood that that the cartridge supports and couplings may have any suitable size and/or shape and may be associated with any suitable locations or portions of the juicer and juicer cartridge such that they can support a juicer cartridge in the pressing chamber when engaged with the associated couplings of the juicer cartridge. For example, in one specific embodiment, and as described further below, a cartridge support may be a cartridge hanger such as a protrusion disposed along an upper edge of the pressing chamber. A corresponding juicer cartridge may be hung from the cartridge hanger by one or more corresponding holes formed along an upper edge of the cartridge thus coupling the juicer cartridge to the juicer within the pressing chamber and in a desired location and orientation.

A juicer may further include one or more orientation features associated with the pressing chamber that interact with corresponding orientation features associated with a corresponding juicer cartridge. As described in more detail below, the corresponding orientation features may interact with one another in order to define a correct position and/or orientation for the juicer cartridge in the pressing chamber. For example, the one or more orientation features of both the juicer and corresponding juicer cartridge may only fit together when located in a correct position and orientation, i.e. they may form a keyed fit. In this manner, the orientation features allow a user to easily determine the correct position and/or orientation for a juicer cartridge when loading the juicer cartridge into the pressing chamber.

According to some embodiments, an orientation feature associated with a pressing chamber of a juicer may be integrated with one or more cartridge supports intended to support the juicer cartridge as previously described. Such a configuration may be beneficial as it may allow for easier operation of the juicer, as the steps of orienting the juicer cartridge to a correct orientation and loading the juicer cartridge into the pressing chamber are performed at the same time, and it may help prevent loading of the juicer cartridge in an incorrect manner. For example, the cartridge supports may have an asymmetrical shape and/or arrangement that corresponds to a similar shape and/or asymmetrical arrangement of the corresponding couplings on the juicer cartridge described further below. In such an embodiment, the couplings on the juicer cartridge may only be engageable with the cartridge supports when oriented in the correct orientation.

According to another aspect of the present disclosure, a juicing system may include a reader for reading information related to a juicer cartridge from an information region located on a corresponding portion of the juicer cartridge.

This may provide a juicer with "smart" functionality, including benefits such as enhanced safety features, tracking usage, operating commands, and/or enhanced operator experience, as described in more detail below. For example, a reader may include a camera, an optical scanner, a laser scanner, a magnetic reader, a radio frequency identification ("RFID") tag reader, or any other suitable reader capable of reading associated information which may be included on an associated juicer cartridge, as described below. Correspondingly, the information region of the juicer cartridge may include features to store and recall the desired information, such as printed or digital indicator technologies including, but not limited to, bar codes, quick response (QR) codes, RFID devices, magnetic strips, a color bar or other similar graphics (e.g., printed graphics, embossed graphics and/or etched graphics), a time temperature indicator, and/or any other suitable readable medium. In such an embodiment, the reader may be positioned on the juicing system such that it may read the information on a juicer cartridge when the juicer cartridge is loaded into the pressing chamber of the juicing system in the correct orientation. Accordingly, in some embodiments, the cartridge supports and/or orientation features may be arranged such that the information region on the juicer cartridge is aligned with the reader on the juicer when the juicer cartridge is correctly positioned and oriented within the juicer. However, it should be understood that in some embodiments, a reader may not require line-of-sight to read the information region of the juicer cartridge. In one such embodiment, an RFID reader only needs to be within an appropriate range of an associated RFID tag. Alternatively, in some embodiments, a reader and/or information region may not be included on a juicer and associated juicer cartridge. Instead, the cartridge supports and/or orientation features may just be arranged to provide a correct positioning of the juicer cartridge within the pressing chamber for pressing without the above noted "smart" functionality.

FIG. 8 is a partial front view of one embodiment of a juicer 10, similar to the juicer shown in FIGS. 1-4. For the sake of clarity, the door is not shown in FIG. 8. In this embodiment, the juicer includes a first cartridge support 64 and a second cartridge support 66 positioned on a ledge 65. In particular, the ledge is positioned on a side of the pressing chamber opposite the juicer outlet 24, and the ledge is recessed relative to an outer front surface of the juicer. Each of the first and second cartridge supports are protrusions extending outwardly from the ledge 65 in a direction that is towards the juicer door when the door is in the closed position. In some instances, the cartridge supports may contact an interior surface of the door (e.g., a portion of the fixed pressing surface 22), or may be received in corresponding receptacles formed on or attached to the door, when the door is closed. However, embodiments in which the cartridge supports do not contact any portion of the door when it is closed are also contemplated. As noted above, the ledge 65 is positioned opposite the juicer outlet 24. Accordingly, the cartridge supports 64 and 66 are also disposed on a portion of the juicer opposite the juicer outlet such that a corresponding juicer cartridge may extend across the pressing chamber 18. In some embodiments, such as those in which the juicer maintains the juicer cartridge in an upright orientation, the cartridge supports may be positioned above the pressing chamber, while the juicer outlet may be positioned below the pressing chamber. Accordingly, the juicer cartridge may be suspended in the juicer from the cartridge supports with a portion of the juicer cartridge maintained within the pressing chamber. For example, as illustrated in FIG. 3, the cartridge supports may be positioned such that the liquid impermeable compartment 502 of the juicer cartridge 500 is positioned within the pressing chamber when the juicer cartridge is supported by the cartridge supports.

In the depicted embodiment the first and second cartridge supports have different shapes such that they define an asymmetrical configuration and act as orientation features for orienting a juicer cartridge within the pressing chamber. In particular, in the depicted embodiment, the first cartridge support 64 is shaped as an oval, while the second cartridge support 66 has a circular shape. Referring again to FIG. 3, the juicer cartridge includes first and second couplings 590 and 592 formed as cutouts in a portion of the juicer cartridge above the liquid impermeable compartment 502. The first coupling 590 is shaped to receive the first cartridge support 64 and a second coupling 592 shaped to receive the second cartridge support 66, and importantly, the second coupling 592 cannot receive the first cartridge support 64. Specifically, in the depicted embodiment, the first coupling is an ovular hole sized to match the first cartridge support and the second coupling is a circular hole sized to match the second cartridge support. In this manner, the cartridge supports and couplings define a correct orientation for the juicer cartridge. Although two differently shaped cartridge supports are depicted, the cartridge supports may have the same shape in some embodiments. For example, an asymmetrical arrangement may be formed with multiple cartridge supports having the same shape but different sizes. In one such embodiment, the cartridge supports may be arranged or distributed asymmetrically relative to the pressing chamber such that a corresponding juicer cartridge would not fit within the pressing chamber if inserted in an incorrect orientation. For example, a portion of the juicer cartridge may extend outside of the pressing chamber if not oriented correctly. In view of the above, it should be understood that the current disclosure is not limited to any particular configuration or arrangement of cartridge supports and/or orientation features.

While an embodiment with cartridge supports located on a side of the pressing chamber that is opposite an outlet of the juicer has been discussed above, it should be understood that embodiments in which the cartridge supports are located on other sides of the pressing chamber are also contemplated. For example, in one embodiment, two or more cartridge supports may be formed on opposing sides of a pressing chamber that extend between a side of the pressing including an outlet from the pressing chamber and a side opposite the side including the outlet.

Turning again to FIG. 8, a juicer 10 may include a reader 70 positioned between the cartridge supports 64 and 66, though other locations are also contemplated. As illustrated in FIG. 3, a corresponding juicer cartridge 500 includes an information region that is aligned, and in some instances, oriented towards the reader when the juicer cartridge is appropriately oriented and positioned within the pressing chamber. For example, in the depicted embodiment, the juicer cartridge includes an information region on one side that may include printed media such as a QR code, or other appropriate information encoding method. As shown in the figure, and the information region is disposed on a side of the juicer cartridge that faces inwardly towards the juicer when the juicer cartridge is loaded in the juicer with the correct orientation and is therefore not visible. However, the location of the information region is indicated by box 594. Accordingly the information region of the juicer cartridge faces the reader 70 when the juicer cartridge is correctly loaded in the juicer. Such an arrangement may be appropriate for use with a reader and information region such as a QR code and associated optical or laser based reader.

Although a juicer cartridge with an information region located on an exterior surface of the juicer cartridge is described above, it should be understood that other configurations may also be suitable. For example, an information region may include a component located within an interior of a juicer cartridge, such as an RFID tag located within laminated layers of the juicer cartridge, or a printed tag (e.g., a QR code) that is viewable through one or more transparent layers of the juicer cartridge. Accordingly, it should be understood that the current disclosure is not limited to any particular configuration for an information region on a juicer cartridge.

As another example, FIG. 5 shows another embodiment of a juicer 10 including a cartridge support 64. In this embodiment, the cartridge support comprises a ledge which protrudes from the housing 14 above the pressing chamber 18. The cartridge support also includes an orientation feature 67 integrated with the ledge that defines an asymmetrical shape for the cartridge support such that a juicer cartridge having a correspondingly shaped coupling may only engage the cartridge support in a single, correct orientation. The door 12 includes a recess 69 sized and shaped to receive the cartridge support when the door is in the closed position. Such a configuration may aid in securing a juicer cartridge to the cartridge support during pressing due to the corresponding coupling of the juicer cartridge being locked in place between a front surface of the juicer and the door of the juicer while positioned on the ledge. Similar to the above, the juicer may also include a reader 70 positioned on the housing 14 outside of the pressing chamber and adjacent to the cartridge support. Again, an identification region on a corresponding juicer cartridge may be positioned adjacent to the reader 70 when the juicer cartridge is correctly positioned and oriented within the juicing chamber and engaged with the cartridge support such that the reader may read the associated information contained in the identification region.

While particular arrangements and configurations for the cartridge supports are described above, modifications and alternative arrangements and configurations are also contemplated. For example, in some embodiments, the cartridge supports of a juicer may be angled upward relative to an axis normal to the front of the juicer and/or pressing surface of the pressing chamber. Such a configuration may aid in engaging the couplings of a juicer cartridge with the associated cartridge supports and positioning the juicer cartridge in the desired location and orientations. Depending on the embodiment, the cartridge supports of a juicer may also include one or more retaining features to further aid in retaining the associated couplings of a juicer cartridge thereon and help avoid the juicer cartridge disengaging with the cartridge support during pressing. Appropriate retaining features include, but are not limited to: upwardly oriented tabs or hooks formed on an end of a cartridge support; protuberances or areas of increased thickness that form an interference fit with the associated coupling; slots or channels formed on a portion of the cartridge support that receives a corresponding portion of the associated coupling; or any other suitable combination of structures.

According to another aspect, the inventors have recognized and appreciated benefits associated with a juicer in which at least the portions of a pressing chamber formed by a main body of a juicer is substantially liquid tight. In such an embodiment, the internal components of the juicer may be sealed from exposure to liquids from the pressing chamber. In addition to aiding cleaning, and protecting components within the juicer, such a configuration may also aid in reducing the chance of leakage out of the pressing chamber in the event that a juicer cartridge inadvertently leaks during juicing. Additionally, in some instances, any juice which may inadvertently leak from a cartridge during juicing may be directed to the outlet area of the pressing chamber where it is ultimately directed into a user's beverage container. As discussed in more detail below, a liquid tight seal may be beneficial in one or more locations on a juicer, including, but not limited to, an interface between a juicer door and the pressing chamber, and between a housing of the juicer and one or more edges of a displaceable pressing surface located within the pressing chamber.

In one embodiment, the interface between a displaceable pressing surface and the pressing chamber of a juicer is sealed using one or more flexible seals. For example, a first flexible seal may extend between at least a portion of a periphery of the displaceable pressing surface to a portion of the pressing chamber. In this manner, the first flexible seal may maintain a fluid tight seal between the pressing chamber and an interior of the juicer while the displaceable pressing surface displaces to compress a juicer cartridge. One exemplary embodiment of such a configuration is detailed further below in relation to the figures.

In certain embodiments, a second flexible seal may be provided around at least a portion of the second and/or fixed pressing surface of a pressing chamber. For example, in some embodiments, a second flexible seal may be located between a door of a juicer and at least a portion of the juicer front surface and/or pressing chamber opposing the door. In some instances, the second flexible seal may be located on an interior surface of the juicer door such that the second seal contacts an outer front surface of the juicer when the door is in the closed position. Alternatively, the second flexible seal may be located on the outer front surface of the juicer and may contact the interior surface of the door when the door is closed. Accordingly, it should be understood that the current disclosure is not limited to any particular arrangement of the second flexible seal.

Referring again to FIGS. 2 and 8, a juicer 10 includes a first flexible seal 32 around the periphery of a displaceable pressing surface 20. The seal connects the displaceable pressing surface and a front portion of the housing 14 and/or one or more edges of the pressing chamber. Accordingly, the first flexible seal and the displaceable pressing surface provide a fluid-tight barrier between the pressing chamber and an interior of the juicer. Further, as noted above, a door 12 of the juicer may include a second flexible seal 34 around at least a portion of the fixed pressing surface 22 on the door. For example, as illustrated in FIGS. 2 and 6, the second flexible seal extends around three sides of the fixed pressing surface, opposite from and adjacent to the side corresponding to the outlet area of the pressing chamber. However, other arrangements for the first and/or second flexible seals are also contemplated. For example, in the embodiment depicted in FIG. 5, the juicer 10 includes a second flexible seal 34 that extends entirely around the fixed pressing surface 22 on the door 12. Accordingly, it should be understood that the second flexible seal may have any suitable configuration.

In some embodiments, a second flexible seal such, such as a seal 34 on a juicer door 12, may further include one or more ribs 68 on at least a portion of the seal (e.g., see FIG. 7). The ribs may engage a portion of the pressing chamber 18 when the door is closed to further aid in forming a fluid-tight seal during pressing. In the depicted embodiment, the ribs 68 are elongated protrusions extending outward from a surface of the second flexible seal that may engage with a portion of a front surface of a juicer. For example, in some embodiments, the ribs may engage sides of a recess formed around the pressing chamber, or the ribs may be received in and/or compressed within a corresponding groove, slot, or other suitable structure formed on the front of the juicer. Although three ribs 68 are depicted, it should be understood that the second flexible seal may have any suitable number of ribs, or may not have any ribs, as the disclosure is not so limited.

Figure 10:
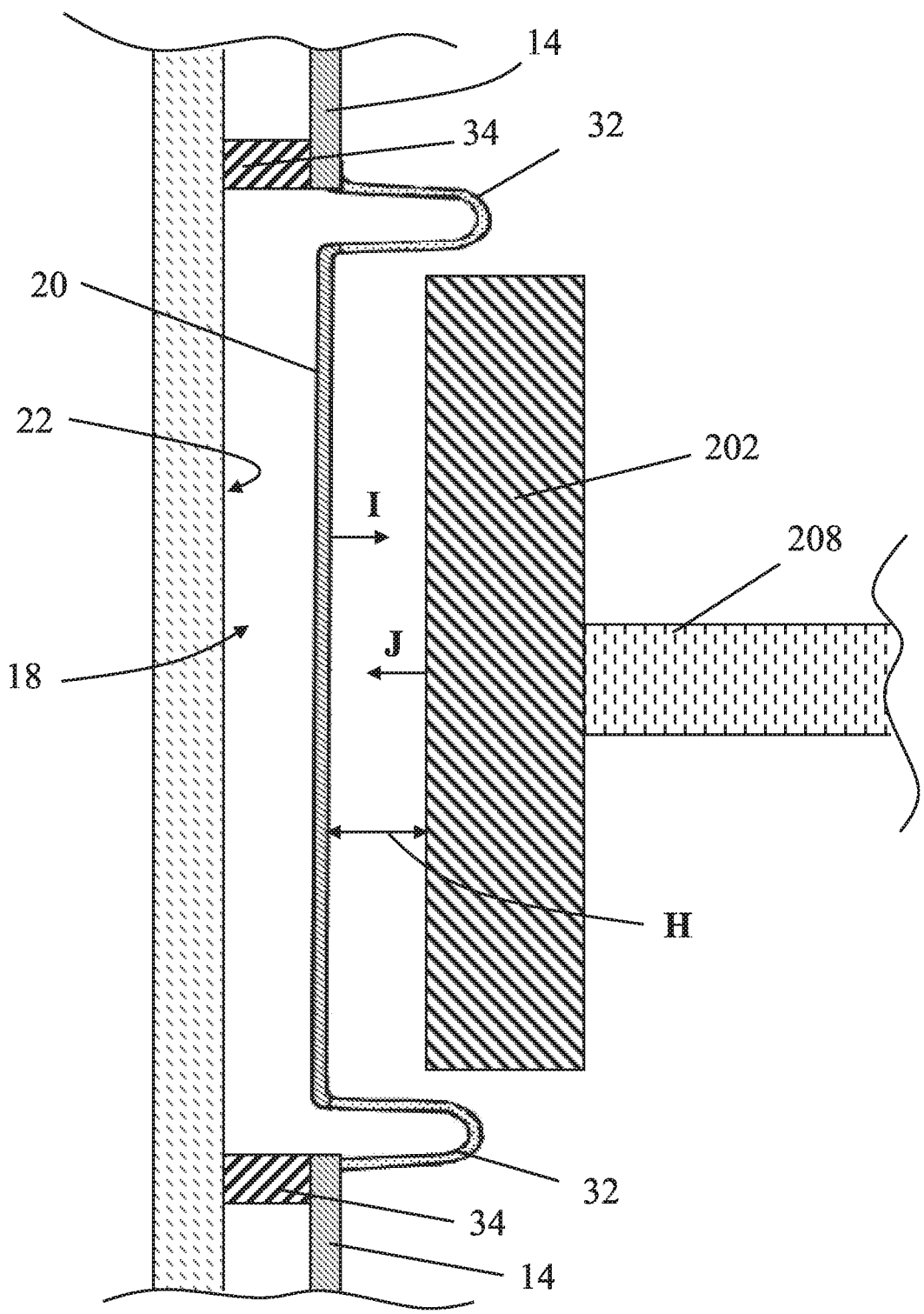
FIG. 10 is a schematic cross-sectional top view of one embodiment of a pressing chamber of a juicer with a displaceable pressing surface in a neutral position.

FIG. 10 shows a schematic cross-sectional top view of a pressing chamber 18 of a juicer 10 similar to those shown in FIGS. 1-4 when the door 12 is in the closed position. For the sake of clarity, a juicer cartridge is not depicted in the pressing chamber. The first flexible seal 32 is connected to the displaceable pressing surface 20 and to the housing 14 of the juicer to form a fluid-tight barrier between the pressing chamber 18 and an interior of the juicer, and in some instances, to accommodate movement of the displaceable pressing surface as described further below. As noted above, the second flexible seal 34 may engage with the housing 14 when the door is in the closed position such that a fluid-tight seal is formed around at least portion of the pressing chamber 18.

Depending on the particular embodiment, the first and/or second flexible seals may be attached to the pressing surfaces of the juicer in any suitable manner. For example, in some embodiments, the seals may be molded together with the pressing surfaces by over-molding, co-molding, or any other suitable molding process. Alternatively, the seals may be attached to the pressing surfaces with an adhesive, thermal welding, ultrasonic welding, or any other suitable fastening means as the current disclosure is not limited in this regard. Further, the first and second flexible seals may be made from any suitable materials including, but not limited to, a rubber such as a silicone rubber, an elastomer, or any other suitable material capable of forming a fluid-tight seal and allowing movement of the displaceable pressing surface within the pressing chamber.

Although the seals are described as being provided around the periphery of the pressing surfaces, in the above embodiments, in other embodiments, the flexible seals may be sized and shapes such that they are disposed on and cover a portion, or the entirety of, the opposing pressing surfaces. Thus, in such an embodiment, the seals may act as linings to help reduce mess or contamination of any internal components of the juicing system. Furthermore, in some embodiments, the seals may be removably attached to the juicer. For example, the seals may include one or more engagement structures such as mechanically interlocking structures (e.g. interference fits, clips, overlapping structures, etc.), magnetic couplings, threaded fasteners, or any other appropriate type of attachment. In one such embodiment, channels formed in a seal may be deformed over and past corresponding structures such as lips on the juicer to engage the seals with the juicer. If desired, for example for cleaning the seals and/or other portions of the juicer, the seals may be removed by disengaging the engagement structures.

In addition to the use of a seal to reduce possible contamination and messes, the inventors have recognized that such a configuration may be used to enable other desirable advantages. For example, embodiments in which a displaceable pressing surface is movable relative to an portion of an associated a drive mechanism, such as a displaceable platen or press, may allow for easier manufacturing of the juicer, and as described in more detail below, may allow for improved alignment and handling of a juicer cartridge within a pressing chamber both prior to and during pressing.

In some embodiments, a first flexible seal located between a displaceable pressing surface and one or more edges of a pressing chamber accommodates movement of the displaceable pressing surface relative to a displaceable platen associated with a drive mechanism, or other suitable component(s) of a juicer. The first flexible seal may accommodate such movement through stretching, bending, buckling of structures associated with the first flexible seal, or other suitable deformation mechanisms. For example, in one embodiment, the first flexible seal permits movement of the displaceable pressing surface from an initial neutral position, in which the displaceable pressing surface is spaced from a displaceable platen, or other component of the drive mechanism, to a compressed position located further inward relative to the pressing chamber to accommodate the presence of a juicer cartridge. In the compressed position, the displaceable pressing surface may be adjacent to, and in some instances in contact with, the displaceable pressing surface. The first flexible seal also permits movement of the displaceable pressing surface from the compressed position to an extended position, which may correspond to the displaceable platen, or other associated portion of a drive mechanism such as a shaft, being driven from a retracted position to an extended position during a pressing operation. In the extended position, the displaceable pressing surface may be moved into an interior of the pressing chamber to apply a pressing force to a juicer cartridge.

As described above, in some embodiments, a flexible seal may connect the periphery of a displaceable pressing surface to at least a portion of the pressing chamber. Additionally, in some embodiments, it is desirable to bias the displaceable pressing surface towards a neutral position. In some instances, this biasing force may be provided by the flexible seal itself. In other embodiment, some other appropriate biasing structure, such as a spring, may be associated with the displaceable pressing surface to provide a biasing force to the displaceable pressing surface when the displaceable pressing surface is displaced from its initial neutral position and/or when the seal is deformed from its initial configuration. In either case, the biasing force may bias the displaceable pressing surface in one or more directions such as in a direction parallel to a pressing direction and/or in a direction perpendicular to a pressing direction towards the neutral position depending on whether the displaceable pressing surface has been displaced inwards or out from the pressing chamber. In this manner, the displaceable pressing surface is biased towards the neutral position within the pressing chamber when no forces are applied to the displaceable pressing surface by a juicer cartridge and/or the drive system of the juicer.

Figure 11:
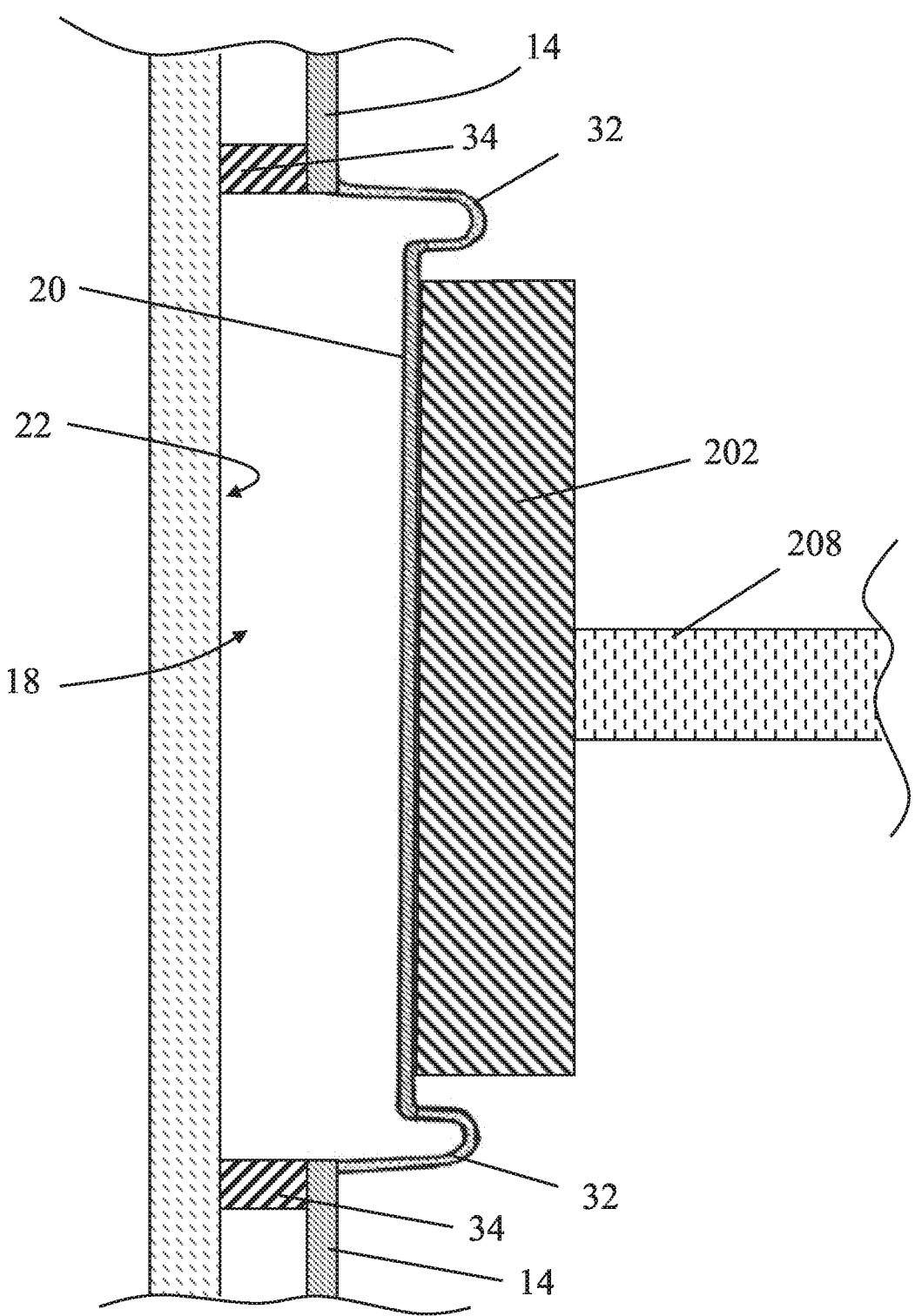
FIG. 11 is a schematic cross-sectional top view of the pressing chamber of FIG. 10 with the displaceable pressing surface in a compressed position.
Figure 12:
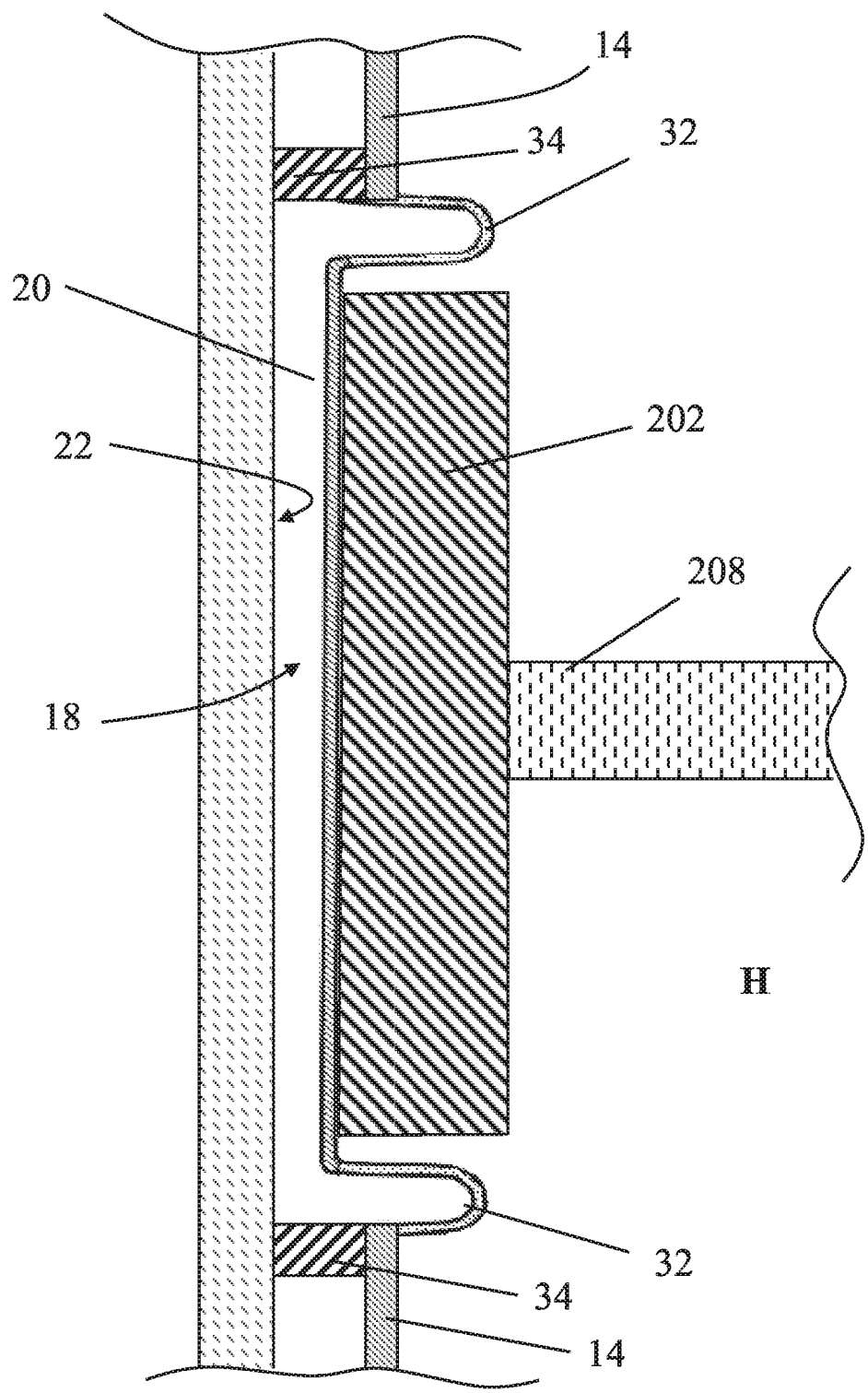
FIG. 12 is a schematic cross-sectional top view of the pressing chamber of FIG. 10 with the displaceable pressing surface in an extended position.

Referring now to FIGS. 10-12, the movement of a displaceable pressing surface relative to a displaceable platen, according to some embodiments, is described in more detail. In particular, FIGS. 10-12 show schematic cross-sectional top views of a pressing chamber 18 with the displaceable pressing surface 20 in a neutral position, a compressed position, and an extended position, respectively. When a juicer cartridge (not depicted for clarity) is loaded in the pressing chamber 18 and the door is closed, the fixed pressing surface 22 on the door pushes the juicer cartridge into the pressing chamber displacing the displaceable pressing surface 20 inwards into the pressing chamber, thereby causing the displaceable pressing surface to move along direction I (see FIG. 10), which may be parallel to a pressing direction of the displaceable pressing surface, and towards the displaceable platen. Accordingly, the displaceable pressing surface is moved to the compressed position, as shown in FIG. 11. Once in the compressed position, the displaceable pressing surface 20 may, or may not, be in contact with the displaceable platen 202 depending on the particular embodiment. During a pressing operation, the displaceable platen is displaced along direction J (see FIG. 10) from its initial retracted position towards an extended position, as shown in FIG. 12. During movement, the displaceable platen engages and subsequently displaces the displaceable pressing surface towards the fixed pressing surface to apply a pressing force to a juicer cartridge positioned there between. Depending on the particular juicer being used and the desired juicing operation, the extended position may either correspond to a constant fixed position, or it may be variable depending on the desired amount of compression to be applied to extract juice from a particular juicer cartridge.

As noted above, a seal between a displaceable pressing surface and one or more edges of a pressing chamber may be maintained by first flexible seal extending between the displaceable pressing surface and the one or more edges of the pressing chamber. Again this seal may accommodate movement of the displaceable pressing surface by deforming and/or stretching, see for example seal 32 in FIGS. 10-12. In such an embodiment, when the displaceable pressing surface is moved from an initial neutral position (FIG. 10) to a compressed position (FIG. 11), a portion of the first flexible seal 32 compresses, buckles, folds, or undergo some other deformation to permit movement of the displaceable pressing surface 20. Similarly, when the displaceable pressing surface is moved to an extended position, a portion of the first flexible seal may extend by stretching or unfolding. In addition, a shape of the first flexible seal may be selected to aid in accommodating this deformation.

Referring again to FIG. 10, in some embodiments, the displaceable pressing surface 20 is separate from the displaceable platen 202, and the displaceable pressing surface, which is shown in a neutral position, is spaced from the displaceable platen, which is shown in a retracted position. In particular, in the neutral position, the displaceable pressing surface 20 is spaced from the displaceable platen 202 by a distance H. For example, in some embodiments, the distance H may be greater than or equal to 0.1 inches, greater than or equal to 0.25 inches, greater than or equal to 0.5 inches, greater than or equal to 1 inch, or any other appropriate length. Additionally, the distance H may be less than or equal to 1 inch, less than or equal to 0.5 inches, less than or equal to 0.25 inches, or less than or equal to 0.1 inches, or any other appropriate length. Combinations of the above-noted ranges, or values outside of these ranges, also may be possible for the distance which the displaceable pressing surface is spaced from the displaceable platen when in the neutral position. For example, in some embodiments, the distance H may be between or equal to about 0.5 inches and 1 inch. In another embodiment, the distance H may be about 0.75 inches. In certain embodiments, the distance H may correspond to a thickness of a juicer cartridge.

As discussed above, the displaceable pressing surface may be biased towards the neutral position by the first flexible seal shown in FIG. 10. In the depicted embodiment, the first flexible seal 32 has a folded configuration, and the seal is formed from a material such that it is suitably resilient to apply a biasing force to the displaceable pressing surface in this folded configuration to hold the displaceable pressing surface in the neutral position distanced away from the displaceable platen 202. Alternatively, a juicer may include a non-resilient seal and may include springs or other suitable biasing elements to bias the displaceable pressing surface towards the neutral position. However, in some embodiments, the displaceable pressing surface may not biased towards the neutral position by the first flexible seal or any other component of the juicer.

Depending on the particular embodiment, a displaceable platen, or other drive structure, may engage any suitable portion of a displaceable pressing surface to displace it during a pressing operation. For example, as shown in FIG. 10, the displaceable platen may have substantially the same size and shape as the displaceable pressing surface such that an area of the displaceable platen that engages the displaceable pressing surface is substantially matched to an area of the displaceable pressing surface. Alternatively, the area of the displaceable platen that engages the displaceable pressing surface may be less than the area of the displaceable pressing surface. For example, the displaceable platen, or other drive structure engaged with the displaceable pressing surface, may have an area that corresponds to at least 50% of the area of the displaceable pressing surface, at least 75% of the area of the displaceable pressing surface, at least 90% of the area of the displaceable pressing surface, at least 95% of the area of the displaceable pressing surface, or any other appropriate area. Correspondingly, the displaceable platen, or other drive structure, may have an area that is less than 95% of the area of the displaceable pressing surface, less than 90% of the area of the displaceable pressing surface, less than 75% of the area of the displaceable pressing surface, less than 50% of the area of the displaceable pressing surface, or any other appropriate area. Combinations of the above ranges are contemplated. For example, in some embodiments, the displaceable platen may have an area that corresponds to between 50% and 100% of the area of the displaceable pressing surface. Additionally, areas of the displaceable pressing platen, or other structure, with values outside of the above noted ranges are also contemplated.

In certain embodiments, the flexible seal around the periphery of the displaceable pressing surface may allow the pressing surface to displace and/or rotate along multiple axes, which may allow the juicer to accommodate variability in the location and or distribution of food matter within a juicer cartridge. For example, if the food matter is not evenly distributed within the juicer cartridge, the juicer cartridge may have a non-uniform thickness. When the juicer cartridge is loaded in the pressing chamber, a portion of the displaceable pressing surface adjacent the thicker portion of the juicer cartridge may be displaced to a greater extent than other portions of the displaceable pressing surface. Accordingly, the displaceable pressing surface may tilt to accommodate the thicker portion of the juicer cartridge, which may allow a greater area of the displaceable pressing surface to engage the juicer cartridge compared to an embodiment in which the orientation of the displaceable pressing surface is fixed.

In addition to supporting a juicer cartridge in the pressing chamber with one or more cartridge supports, such as those discussed above, the inventors have appreciated that it may be desirable to restrain one or more portions of a juicer cartridge within a pressing chamber during juicing. For example, restraining a portion of a juicer cartridge near the outlet of the juicer cartridge may help to limit movement of the outlet during pressing and/or may aid in directing juice into a beverage container, thereby minimizing splashing and/or spillage during pressing.

According to some embodiments, and as described in more detail below, a juicer may include one or more restraints associated with a pressing chamber that engage corresponding landings on a juicer cartridge to limit movement of at least a portion of the juicer cartridge during pressing. For example, the restraints may be located adjacent to the outlet portion of the pressing chamber. Correspondingly, the landings of the juicer cartridge may be located adjacent to the juicer cartridge outlet. Thus, when the juicer cartridge is properly positioned within a pressing chamber, the restraints are in position to engage the juicer cartridge landings. It should be understood that the restraints may take any number of different forms. However, in one embodiment, the restraints are protrusions that engage the landings on the juicer cartridge by pressing the landings against a surface opposite the protrusions during a pressing operation. For example, the restraints may be protrusions disposed on an interior surface of a door of the juicer and may engage the landings on the juicer cartridge and press the landings against a front surface of the pressing chamber when the door is in the closed position. Alternatively, the opposite configuration with the protrusions formed on a front surface of the juicer such that they press against the door is also contemplated.

Referring again to FIG. 6, in some embodiments, a door 12 of a juicer 10 includes two or more restraints 72 which may be formed as protrusions extending outwardly from the fixed pressing surface 22. The restraints are positioned such that are adjacent the outlet area 24 of the pressing chamber when the door is in the closed position. For example, as illustrated in FIG. 8, the restraints engage the landings on a juicer cartridge, discussed further below, and press the landings formed adjacent to the juicer cartridge outlet against regions 74 formed on the juicer front surface adjacent to the juicer outlet 24. In this manner, the restraints secure the juicer cartridge outlet in place in the outlet area and limit movement of the outlet during pressing.

In certain embodiments, it may be desirable to further limit the relative movement between restraints of a juicer and the corresponding landings on a juicer cartridge the restraints are engaged with. In one such embodiment, the restraints, landings, and/or the corresponding regions of the juicer the restraints are pressed against may be formed from materials that exhibit a relatively high coefficient of friction when engaged. For example a coefficient of friction may be greater than or equal to 0.5, 0.75, 0.9, 1.0, or any other appropriate value. Additionally, the coefficient of friction may be less than 1.5, 1.25, 1.0, or other any appropriate value. Combinations of the above ranges are contemplated, including, for example a coefficient of friction between or equal to 0.5 and 1.5. Of course other coefficients of friction both greater than and less than those noted above are also contemplated. Further, and without wishing to be bound by any particular theory, a high coefficient of friction may aid in limiting motion of the juicer cartridge relative to the restraints when the restraints are engaged with the landings. Additionally, in some embodiments, the restraints may be made from a soft or deformable material such as a rubber or an elastomer to further aid engagement of the restraints with the juicer cartridge landings. However, other materials, including rigid or non-deformable materials may also be used as the disclosure is not so limited. It may also be beneficial in some applications for the restraints, landings, and/or the corresponding regions of the juicer the restraints are pressed against to include a textured surface to further enhance the frictional engagement of the restraints with the landings. Although a juicer including two restraints is described above, it should be understood that a juicer may include any suitable number of restraints in any number of arrangements. Alternatively, a juicer may not include any restraints, as the disclosure is not so limited.

While particular configurations of a restraint have been described above, it should be understood that other types of restraints may also be used. For example, possible restraints configurations include, but are not limited to: two flat opposing surfaces may act as restraints that press the landings of a cartridge between them; clamps that engage the landings or other suitable portion of a juicer cartridge; protrusions that are received by cutouts on a juicer cartridge; or any other suitable structure, as the disclosure is not limited to any particular type of restraint configuration.

While simple flat opposing platens have been depicted as the pressing surfaces in the provided figures, in some embodiments, the one or more of the pressing surfaces may be shaped to facilitate enhanced or optimized juice extraction during a juicing process. For example, the pressing surfaces may include a textured surface such as nesting or opposing (i.e., non-nesting) grooved surfaces. The grooves may have sharp peaks, rounded peaks, sinusoidal shapes, square or rectangular shapes, or any other suitable geometry. In some instances, a textured surface may aid in holding food matter in place within a juicer cartridge during pressing, may create a force concentration which may aid in juice extraction, and/or increasing the effective pressing area applied to a juicer cartridge for extracting juice. Other aspects related to the pressing surface shape, texture, geometry, and other possible variations that may be employed, are described further in assignee's co-pending international application PCT/US2014/034676 filed Apr. 18, 2014, published as WO 2014/182423, which is hereby incorporated by reference in its entirety.

According to another aspect of the current disclosure, a juicer may include a drive mechanism associated with at least one displaceable pressing surface. For example the drive mechanism may control the displacement of the displaceable pressing surface in order to compress an associated juicer cartridge within a pressing chamber of the juicer during pressing. As discussed above, in some embodiments a displaceable pressing surface may be associated with a separate displaceable platen, or other drive structure, that applies a force to the displaceable pressing surface to perform a pressing operation. Of course, appropriate drive mechanisms are drivingly coupled to the displaceable platen, or other drive structure, in order to provide this desired functionality. While any number of appropriate drive mechanisms may be used, several specific embodiments and variations of a drive mechanism are described further below.

In the current embodiment, a pressing chamber, drive mechanism, as well as other internal components of the juicer, are supported relative to one another within a juicer by an associated frame that they are either directly, or indirectly, connected to. Depending on the embodiment, the frame, may be an internal frame provided within an exterior housing of the juicer. The frame may provide structural support for the various components and surfaces associated with the pressing chamber, pressing surfaces, drive mechanisms, and/or the other internal components of the juicer such as one or more control circuits of the juicer. For example, the frame may support the drive mechanism and one or more displaceable pressing surfaces relative to one another such that the drive mechanism is able to apply the desired pressing forces to displace the one or more displaceable pressing surfaces. While a particular combination of components and frame are listed above, it should be understood that the various components described herein are not limited to any particular layout or arrangement with a particular frame system as the disclosure is not so limited. Additionally, for the sake of clarity, the embodiments of the drive mechanisms and pressing arrangements shown in the figures discuss below do not include the frame. However, it should be understood that any appropriate connection of these various components to a frame may be used as the disclosure is not so limited.

In one embodiment, a drive mechanism of a juicer, includes a linear screw drive coupled to a motor. The screw drive converts a rotational motion from an output shaft of the motor to a linear displacement of a shaft or piston connected to a movable pressing surface, such as a displaceable platen. The screw drive may include a threaded shaft attached to the displaceable platen and a threaded drive collar rotatably engaged with the threaded shaft. For example, the threaded shaft may be rotatably fixed and the threaded drive collar may be axially fixed. In this manner, rotating the drive collar may move the threaded shaft axially to displace the displaceable platen, which may be attached to one end of the threaded shaft. In some embodiments, the rotating drive collar may be coupled to the motor via a transmission including one or more intermediate gears. Without wishing to be bound by any particular theory, the transmission may provide a suitable gear reduction from the output shaft of the motor to the rotating drive collar to provide a suitable drive speed and/or pressing force to the displaceable platen.

Figure 13:
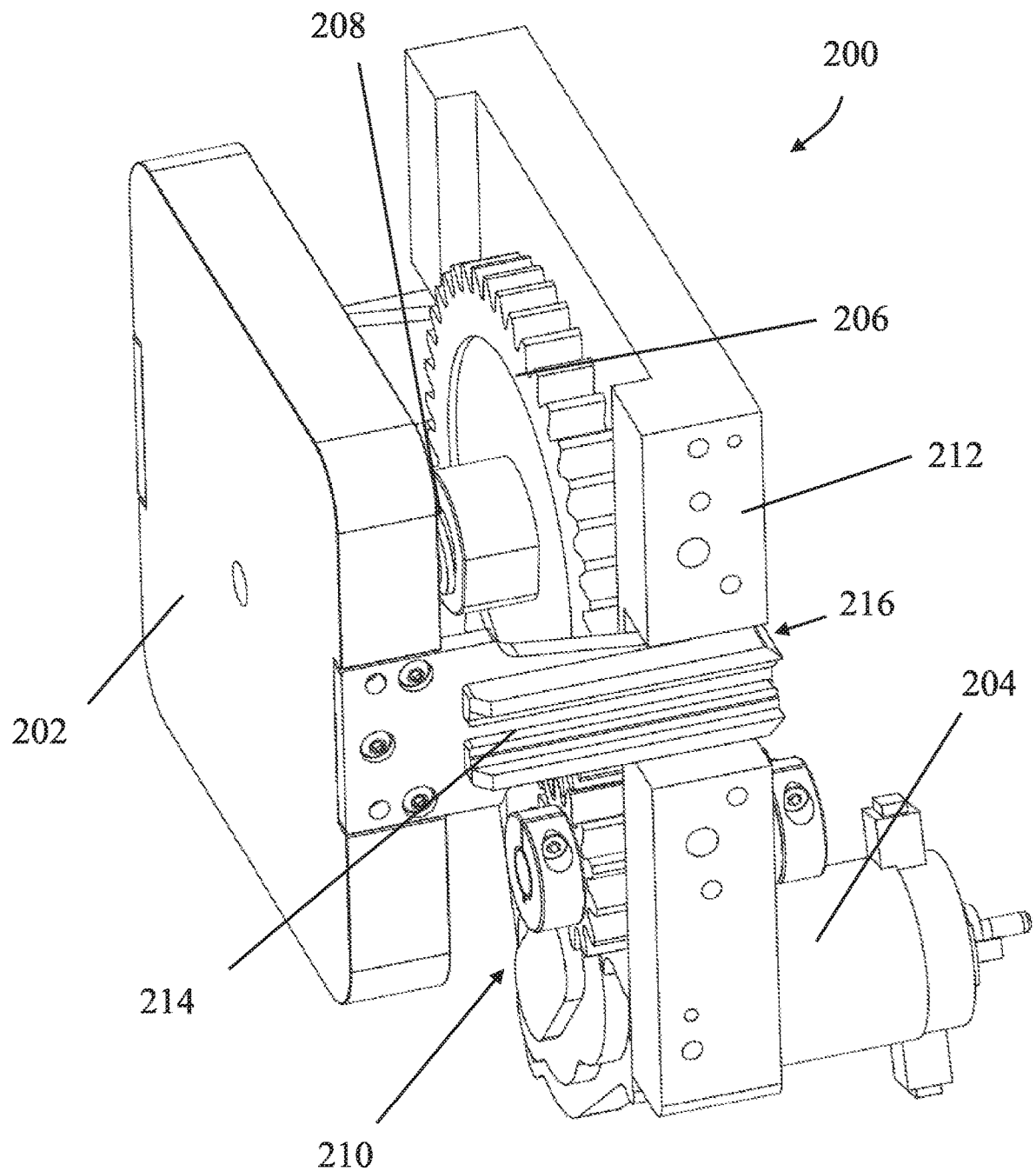
FIG. 13 is a perspective front view of one embodiment of a drive mechanism.
Figure 14:
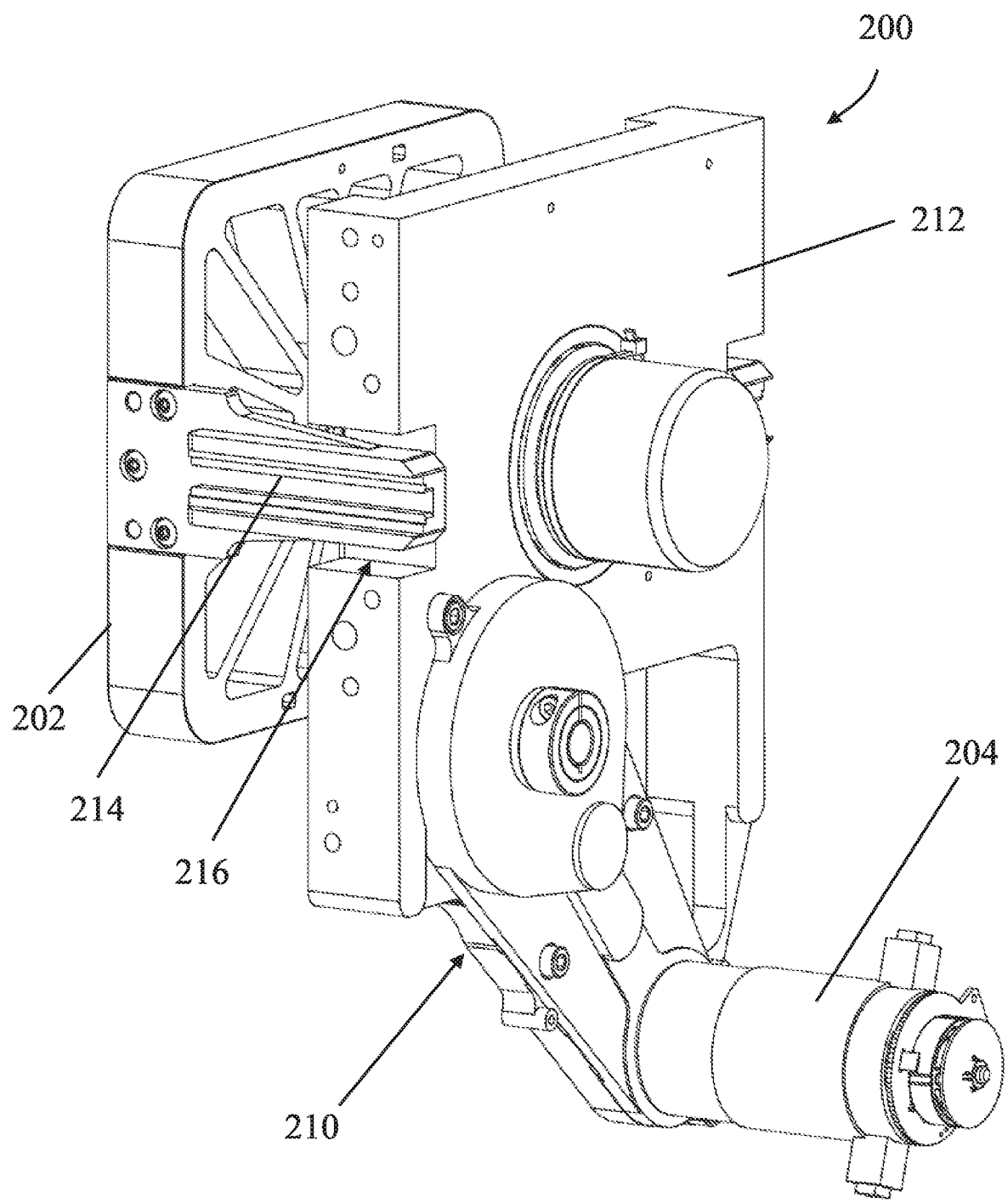
FIG. 14 is a perspective rear view of the drive mechanism of FIG. 13.
Figure 15:
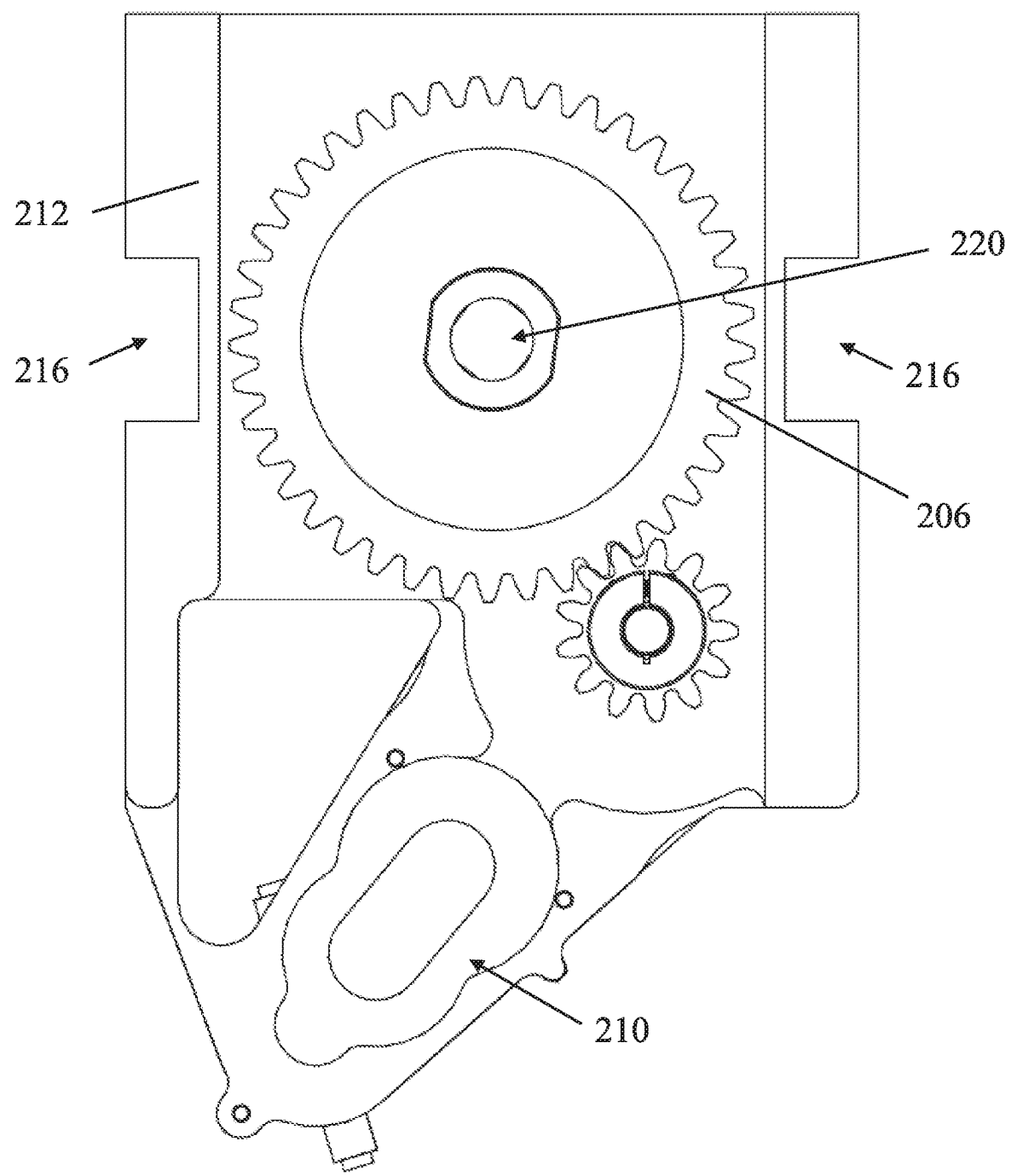
FIG. 15 is a front view of a portion of the drive mechanism of FIG. 13.

FIGS. 13 and 14 depict various views of one embodiment of a drive mechanism 200. The drive mechanism includes a displaceable platen 202 that is drivingly coupled to a motor 204 that displaces the platen back and forth within a desired pressing direction. In the embodiment depicted in the figures, the motor drives rotation of a rotatable drive collar 206 which in turn drives axial displacement of a drive shaft 208 that is threadably engaged with the drive collar. Specifically, the motor 204 is coupled to the rotatable drive collar 206 by a transmission 210 including one or more transmission gears such that rotation of an output shaft of the motor causes rotation of the rotatable drive collar. Further, the rotatable drive collar is attached to a housing plate 212 such that the drive collar is axially fixed relative to the plate and is only free to move rotationally. In contrast, the drive shaft 208 is rotationally fixed relative to the displaceable platen and juicer frame, but is permitted to move axially in the desired pressing direction. In this manner, when the motor 204 drives rotation of the drive collar, the drive collar rotates imparting an axial force to the drive shaft which subsequently results in axially displacement of the drive shaft and the displaceable platen 202 to provide a desired displacement and/or force during a pressing operation.

Figure 17:
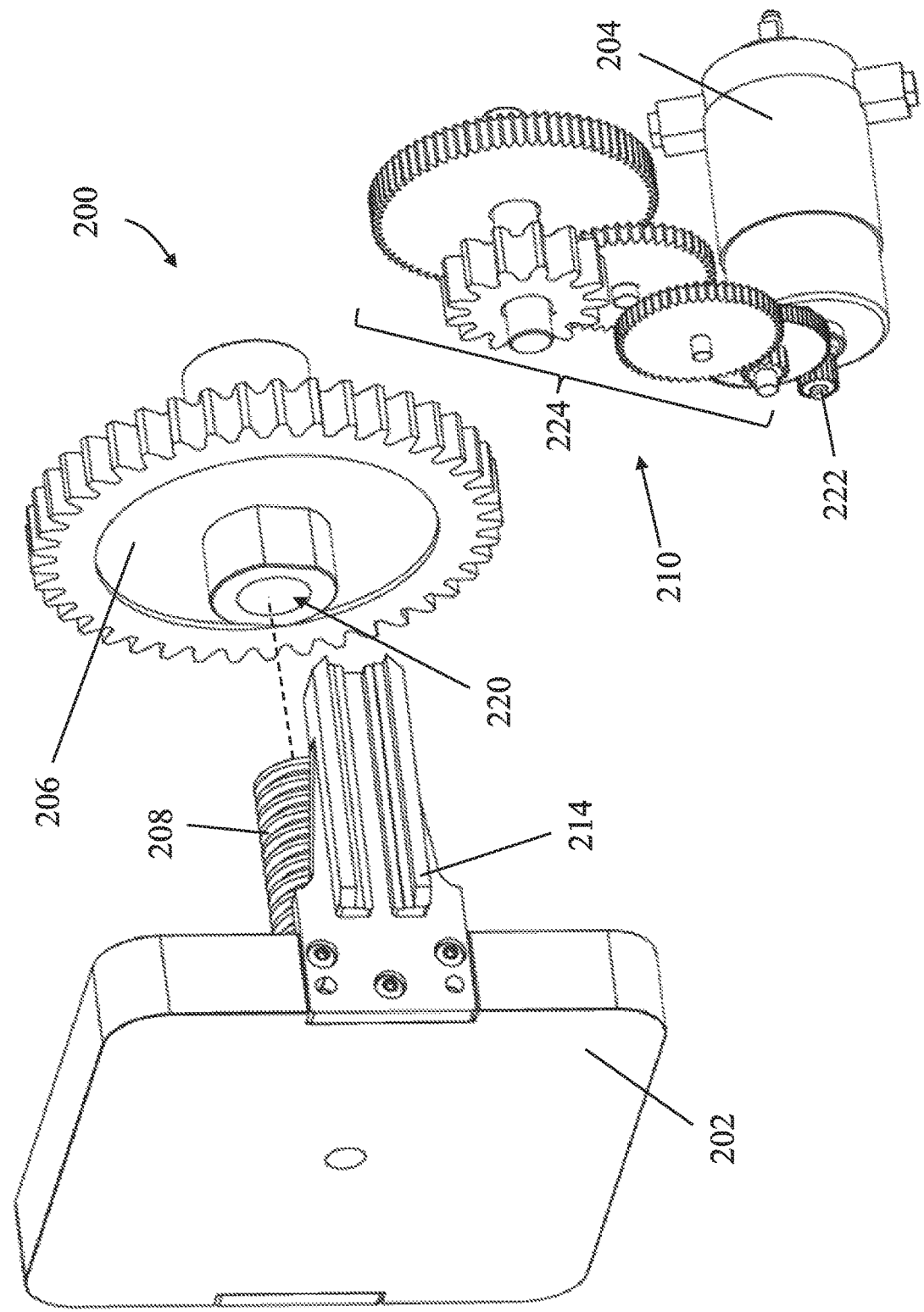
FIG. 17 is a partially exploded view of the drive mechanism of FIG. 13.

FIG. 17 depicts an exploded view of a drive mechanism 200 without the housing plate or other covering structures for illustrative purposes. In particular, FIG. 17 illustrates that the threaded drive shaft 208 is received in a threaded channel 220 of the rotatable drive collar 206. Further, transmission 210 includes multiple intermediate gears 224 which couple the output shaft 222 of the motor 204 to the rotatable drive collar. Although four intermediate gears are depicted, it should be understood that the transmission may have any suitable number of intermediate gears. Moreover although a generally linear gear train is depicted for the transmission, it should be understood that the transmission may include one or more planetary gears, worm gears, helical gears, hypoid gears, face gears, racks and pinions, or any other suitable type and/or configuration of gears, as the current disclosure is not limited to any particular arrangement for the intermediate gears of the transmission.

As also illustrated in the figures, in some embodiments, a transmission 210 forming a portion of a drive mechanism of the juicer is attached to a housing plate 212, which, in turn, may be attached to a frame of the juicer (not depicted). Due to this arrangement, the transmission 210, housing plate 212, and drive collar 206 are arranged in a generally planar configuration. Without wishing to be bound by any particular theory, this planar configuration may allow the drive mechanism to be more compact compared to non-planar designs. However, it should be understood that non-planar configurations for the drive mechanism are also contemplated as the current disclosure is not so limited.

To help avoid binding and/or misalignment of a drive mechanism and/or pressing surface during operation, it may be desirable to include one or more guide features associated with a displaceable platen or pressing surface that may aid in maintaining an orientation of the various components during a pressing operation. For example the guide features may include one or more guide rails attached to the edges of the displaceable platen that are received in corresponding channels within the juicer. In this manner, the guides aid in maintaining the orientation of the displaceable platen and/or the displaceable pressing surface during pressing.

One such embodiment is illustrated in FIGS. 13-17. In the depicted embodiment, the housing plate 212 includes channels 216 on opposing sides of the plate that are configured to receive guide rails 214 attached to the displaceable platen. As illustrated in FIG. 14, the guide rails are attached on opposing sides of the displaceable platen 202. When the drive mechanism drives displacement of the displaceable platen, an engagement between the guide rails and the channels permits movement of the guide rails relative to the housing plate along a direction parallel to the drive shaft. For example, the guide rails 214 slide along their length within the channels 216. However, the engagement between the channels and the guide rails either partially restricts, or substantially eliminates, rotational movement of the guide rails relative to the housing plate. Accordingly, the engagement between the guide rails 214 and the channels 216 may aid in limiting any off-axis movement of the displaceable platen during pressing. In some embodiments, the guide rails may have a loose fit within the channels to permit some degree of off-axis movement of the displaceable platen 202 during a pressing operation which may help with avoiding binding of the displaceable platen during a pressing operation. However, in other embodiments, the guide rails may have a tighter fit within the channels such that it forms a slip fit, as the disclosure is not so limited. Additionally other arrangements such as linear bearings and the like may be used as well. Accordingly, it should be understood that the current disclosure is not limited to any particular arrangement of guide rails and/or channels within a drive mechanism to aid in maintaining alignment of the various pressing components during operation.

Referring again to FIG. 16, the guide rails 214 are depicted as being attached to the displaceable platen with multiple fasteners (e.g., screws, bolts, etc.). However, it should be understood that the guide rails may be attached to the displaceable platen, and/or a displaceable pressing surface in any appropriate manner including, but not limited to, one or more welds, an adhesive bond, an interference fit, mechanically interlocking components, or in any other suitable manner. Further, in some embodiments the guide rails and/or the threaded drive shaft 208 may be integrally formed with the displaceable platen to form a single, unitary structure.

Figure 16:
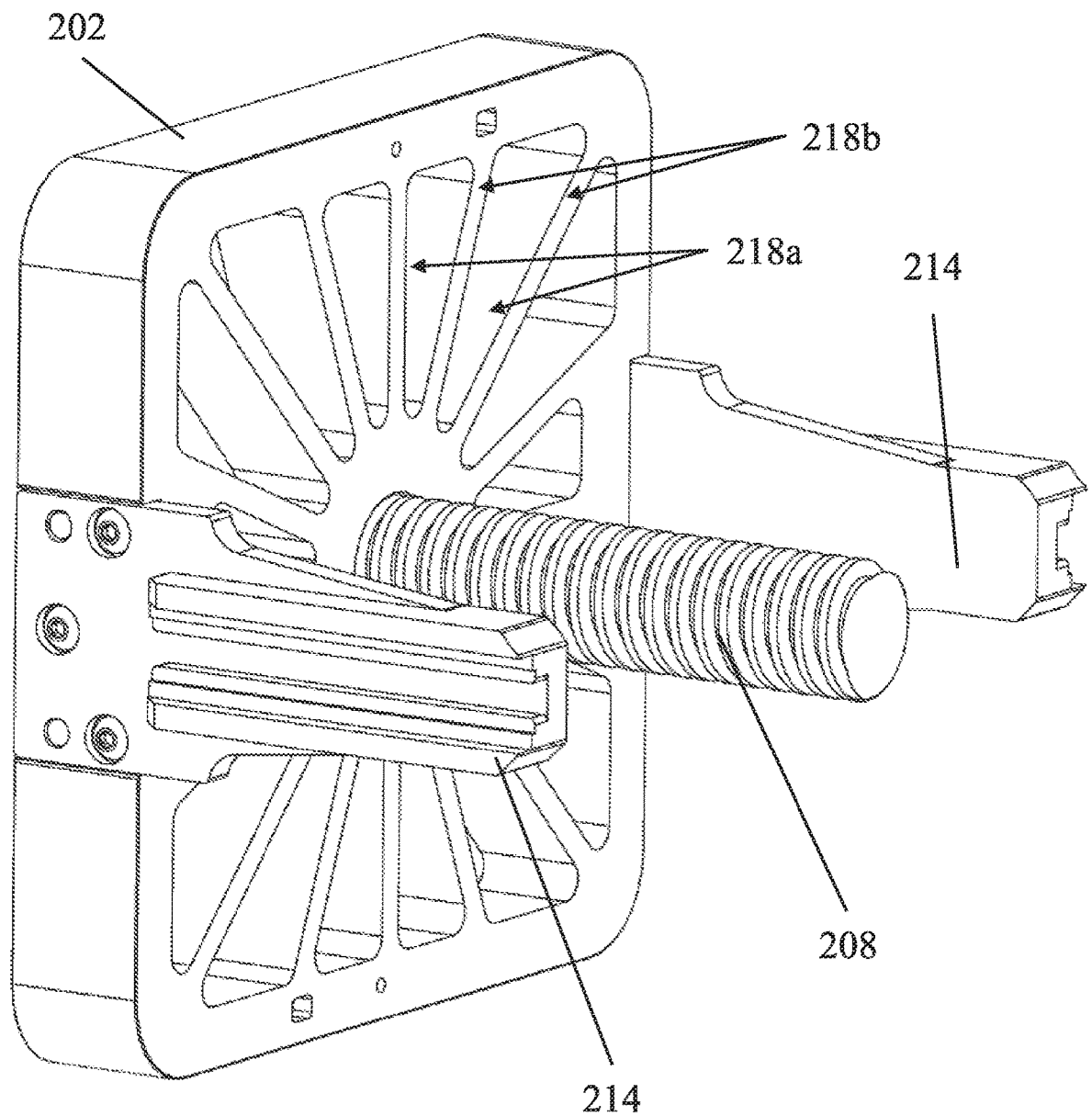
FIG. 16 is a perspective view of a displaceable platen of the drive mechanism of FIG. 13.

As also illustrated in FIG. 16, in certain embodiments, it may be advantageous for a displaceable platen to include one or more cavities 218a formed in a rear surface of the displaceable platen 202 with ribs 218b extending between the cavities. For example, these cavities and ribs may provide a stiffer structure while also reducing the weight of the displaceable platen, which may allow the displaceable platen to be driven more easily and/or aid in reducing the overall weight of a juicer. It should be understood that the cavities may have any suitable shape and/or size. Depending on the embodiment, a total volume of the cavities may correspond to any suitable fraction of the total volume of the displaceable platen (e.g., less than or equal to 75%, 50%, 25%, or any other appropriate percentage of the volume of the displaceable platen). Further, a displaceable platen may not include any such cavities and may instead be formed as a solid plate, as the current disclosure is not so limited.

Depending on the particular embodiment, the intermediate gears that couple the motor to the drive collar and the thread pitch of the threaded portion of the drive collar and drive shaft may be constructed and arranged to provide a suitable gear reduction in order to convert a speed and/or power of the motor to a desired displacement rate and/or pressing force of the displaceable platen. For example, in some embodiments, the motor may operate at a speed between about 500 revolutions per minute (RPM) and 5000 RPM as well as provide a power between about 50 Watts and 1000 Watts, and the one or more intermediate gears may provide a gear reduction between 100 and 5000. Further, the threaded drive shaft may have a thread pitch between about 1 mm/thread and 10 mm/thread. Accordingly, the motor may displace drive axial displacement of the drive shaft at a rate between about 1 mm/minute and 60 mm/minute. However, it should be understood that the one or more intermediate gears may provide any suitable gear reduction to provide a desired displacement rate for the displaceable platen. Further, in certain embodiments, the one or more intermediate gears may be constructed and arranged to have a suitable amount of slop to avoid binding of the gears during pressing.

In some embodiments, the drive mechanism may be constructed and arranged to apply a suitable pressing force to a juicer cartridge during pressing. For example, the drive may be constructed and arranged to apply between about 6,700 N to 35,600 N (1500 pounds of force to about 8000 pounds of force) to a juicer cartridge during the approximately final 3 mm to 13 mm (0.1 inches to 0.5 inches) of movement of the one or more displaceable pressing surfaces, or other appropriate pressing elements used to extract juice from the juicer cartridge. In some embodiments, the applied force during this final movement of the pressing surfaces may be between about 17,800 N to about 44,500 N (4000 pounds to about 10,000 pounds), 8900 N to 53,400 N (2000 pounds to 12,000 pounds), or any other appropriate range of forces as the disclosure is not so limited. In addition to applying the above noted forces during the final amount of travel, the pressing surfaces, or other appropriate pressing element, may have a total travel of about 38 mm (1.5 inches) and may have a gap between about 3 mm to about 9 mm (0.1 inches to about 0.35 inches) between the pressing surfaces, or other pressing elements, after being displaced to extract juice from the food matter located within the juicer cartridge. It should be understood that while particular dimensions and forces are noted above with regards to a specific embodiment of a juicer, any appropriate combination of forces, distances of force application, total pressing surface travel, and gaps might be used as the disclosure is not so limited. The force ranges and displacements noted above are directed to an appliance sized for consumer applications. However, different forces and extension ranges for other applications are also contemplated. In view of the above, it should be understood that a variety of combinations of forces, displacement, pressing speeds, and other pressing parameters may be controlled during a pressing operation. Further, disclosure related to these various parameters and their combinations are described in international application PCT/US2014/034676 filed Apr. 18, 2014, published as WO 2014/182423, which is incorporated herein in its entirety.

In addition to the possible ranges of applied force, a juicer may apply at least 60 psi to a surface of a juicer cartridge during juice extraction. Further, in some embodiments, a juicer may apply between about 80 psi to about 240 psi to a surface of a juicer cartridge during the final distances of platen displacement as noted above. However, it should be understood that other pressures might be applied by a juicer as the disclosure is not so limited.

Although a drive mechanism including a linear screw drive is described above, it should be understood that a juicer may use other drive mechanisms. For example, in some embodiments a drive mechanism may include a scissor jack press, a hydraulic drive, a pneumatic drive, a hydraulic drive, a rotating cam, a linear ramp, or any other suitable mechanism capable of driving a displaceable platen, as the current disclosure is not limited to any particular type of drive mechanism.

According to another aspect of the current disclosure, the motor of a juicer that drives displacement of a displaceable pressing surface may be controlled in any number of ways. However, in some embodiments, it may be desirable to limit a force applied to a juicer cartridge to either avoid over extraction of juice from food matter being pressed, avoid rupture of the juicer cartridge, and/or avoid damage to the juicer itself amongst other possible reasons. Therefore, in some instances, the motor is controlled to limit a force applied by the displaceable pressing surface is maintained to below a desired force threshold. In some embodiments the force applied by the displaceable pressing surface may be controlled using an appropriate force sensor with a control feedback loop. Alternatively, in another embodiment, the force applied by the motor may be controlled by monitoring and controlling a current applied to the motor. For example, a predetermined relationship between the current applied to the motor and the resulting force may be known. For example, the force may be linearly, or non-linearly, related to the current such that the force may be calculated by multiplying the current by an appropriate conversion factor or applying some other appropriate calculation. Accordingly, when the relationship between the force and the current is determined for a juicer, the force may be maintained below the threshold by maintaining a current applied to the motor below a corresponding current threshold. Appropriate methods for sensing and controlling the applied current are detailed further below.

In some embodiments the force and current thresholds noted above may be constant throughout a pressing operation. However, in other embodiments, the force and/or current thresholds may vary during a pressing operation. For example, in some instances it may be beneficial to apply different forces to a juicer cartridge during different stages of a pressing operation. In one embodiment, a juicer may maintain a first force threshold during an initial portion of the pressing operation, and subsequently, the juicer may maintain a second larger force threshold for a force applied to the juicer cartridge during a later portion of the pressing operation. Without wishing to be bound by any particular theory, increasing the pressing force in a later portion of the pressing operation may aid in optimizing the extraction of juice from food matter contained within the juicer cartridge, or may aid in dispensing a desired amount of juice. Depending on the embodiment, the juicer may vary the force and/or current threshold values during juicing in any suitable manner, such as in discrete steps corresponding to different portions of the pressing operation, or continuously to ramp up the pressing force during the pressing operation.

In certain embodiments, a conversion factor or other relationship used for converting between a current applied to a motor and a resulting force applied by a displaceable pressing surface to a juicer cartridge may vary over time. For example, the conversion factor may depend on a particular configuration of a transmission that couples the motor to the displaceable pressing surface, and in some instances, the efficiency of the transmission may vary over time. In particular, the transmission may have an initial efficiency that is different from a steady-state efficiency after a suitable break-in period for the transmission. Without wishing to be bound by any particular theory, the efficiency of the transmission may vary due to a number of factors, including, but not limited to, wear of sharp surfaces or corners, the distribution of lubrication within the transmission, breakdown and/or contamination of lubricants over time, as well as other appropriate sources of drift in the efficiency of a transmission. Accordingly, in some instances, during manufacture a conversion factor for a particular juicer may be measured after the initial assembly of the juicer, and again after a suitable break-in period, such that a controller on the juicer may be adjusted to provide a suitable current to the motor for a desired force output.

Once determined, a conversion factor or relationship between motor current and force used to control a juicer may be held constant throughout the life of the juicer. However, the transmission efficiency is expected to keep changing, albeit more slowly than in the initial break-in period, as the juicer is used. Therefore, in some embodiments, the conversion factor or relationship may vary with time and/or number of juicing cycles performed to take into account additional break-in and wear of the transmission system that would change the expected efficiency of the system during the products life time. The appropriate relationship needed to determine how to modify the relationship of expected force to applied current may be easily determined through appropriate cycling and/or accelerated aging tests.

Figure 18:
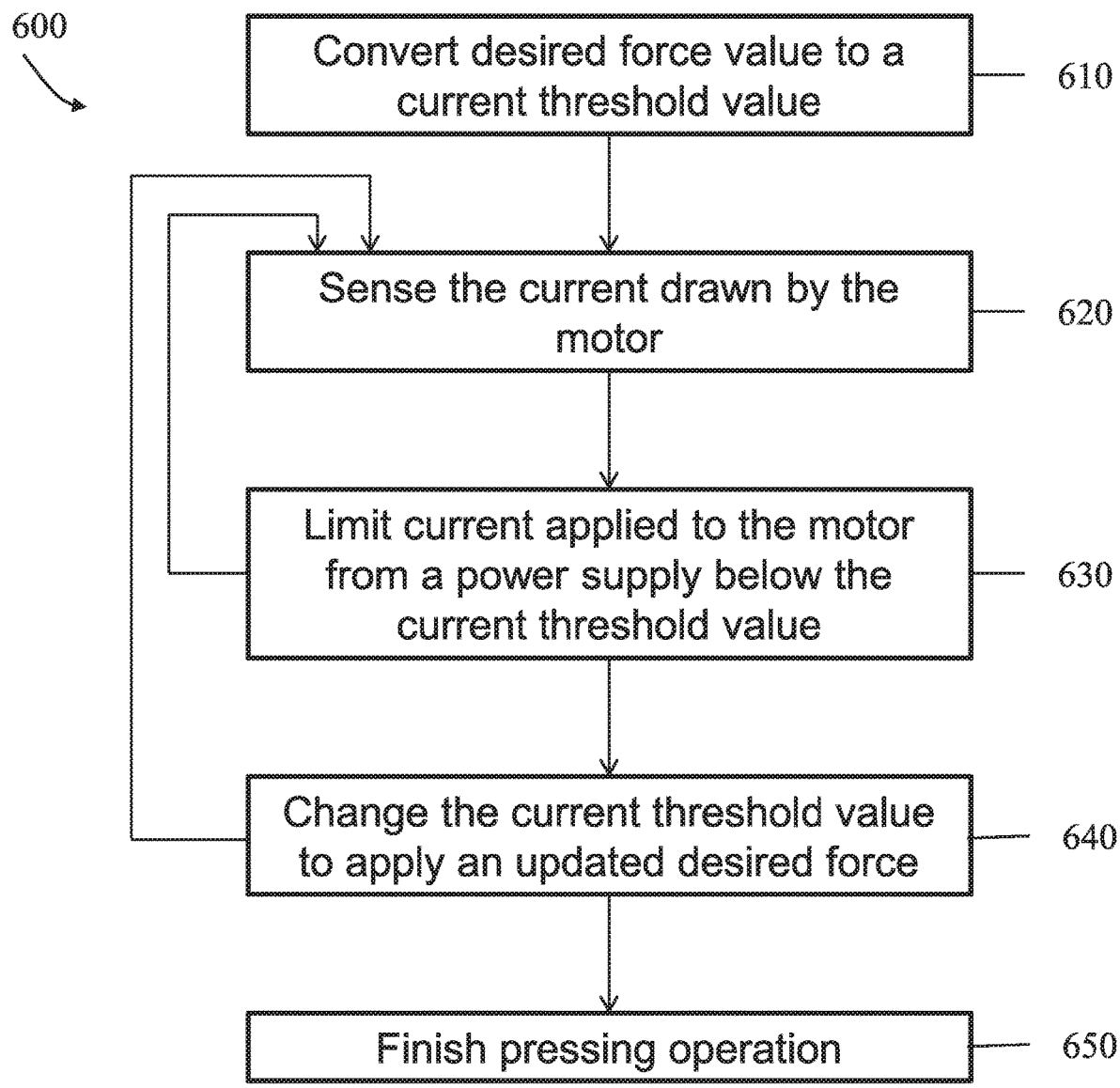
FIG. 18 is a flow chart depicting one embodiment of a method for controlling a motor current.

Referring now to FIG. 18, one illustrative embodiment of a method 600 for controlling the motor current during a pressing operation is described in more detail. At block 610, a desired force is converted to a current threshold using, for example, a suitable conversion factor or relationship as described above. The method further includes sensing the current drawn by the motor from an associated power supply (block 620), and allowing the motor to draw any amount of current up to the current threshold (block 630). As illustrated, the method may include applying a feedback loop to sense the current drawn by the motor and maintain the current below the threshold value using any appropriate control method as described further below. As noted above, in some embodiments, a desired force may vary during a pressing operation. Accordingly, method 600 may also include changing the threshold current to apply a different force at block 640, and subsequently maintaining the current at or below the new threshold value by repeating blocks 620 and 630. At block 650, the pressing operation is completed.

Figure 19:
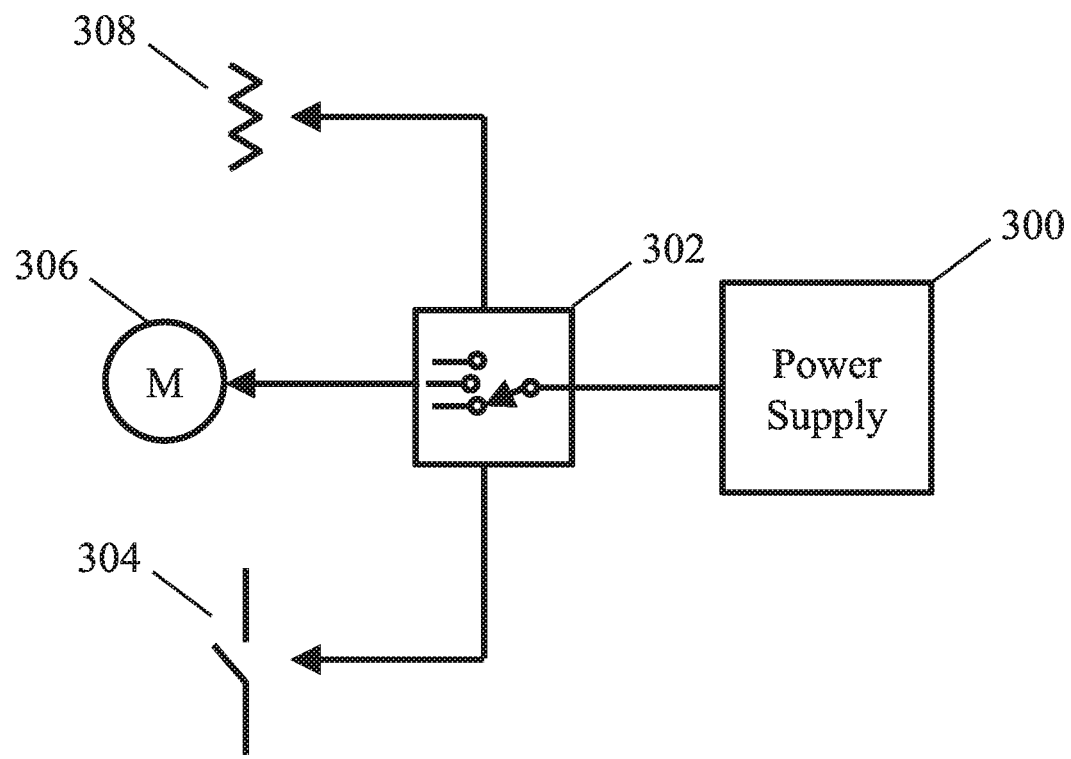
FIG. 19 is a schematic representation of one embodiment of a motor control circuit.

While the motor current may be controlled in any number of ways, in some embodiments, the current applied to the motor may be controlled via a pulse width modulation (PWM) technique. For example, as shown in FIG. 19, a power supply 300 may be connected to the motor by a control circuit including a switch 302 (e.g., a solid state switch) that can rapidly switch a motor between an on state 306 and an off state corresponding to when the switch is connected to an open circuit arrangement 304 and/or another electrical load 308. In the on state, the current applied to the motor corresponds to 100% of the current provided by the power supply, and in the off state, no current is applied to the motor (i.e. 0%). Accordingly, by rapidly switching between the on state and the off state, the controller can deliver a time-averaged current to the motor with any value between 0% and 100% of the power supply output. In this manner, the controller may adjust the current applied to the motor to provide a desired pressing force. Such a system may be combined with an appropriate current sensor to institute a feedback loop to control the applied current. Alternatively, the current might be controlled by adjusting the time averaged current to limit the current draw to a percentage of the maximum current the power supply can output. While the PWM technique is discussed above with regards to placing the motor in a closed or open state, a PWM arrangement may also be used to control the power supplied to one or more other electrical loads 308 such as control circuits, displays, lights, lock actuators, and communication devices to name a few.

As noted above, a juicer may include one or more locks that secure a door of a juicer in a closed position during a pressing operation. For example, in some embodiments a lock may include one or more locking bolts on the juicer that engage with corresponding recesses formed in corresponding locking portions associated with the door. When engaged, the locking bolts secure the locking portions of the door the corresponding locking portions associated with the pressing chamber and/or frame of the juicer to limit, or substantially prevent, movement of the locking portions relative to one another, thereby securing the door in the closed position.

In one embodiment, the locking bolts of a lock are movable between an unlocked configuration in which the locking bolts are not engaged with the lock recesses of the corresponding locking portions, and a locked configuration in which a least a portion of the locking bolts are received in the lock recesses to engage the locking portions. For example, in the embodiment depicted in FIG. 8, the locking bolts 58 are in a retracted position. Accordingly, the locking portions 28 on the door 12, see FIG. 6, are received in corresponding lock receptacles 62 on the juicer when the door is moved to the closed position. Subsequently, the locking bolts are displaced along the directions K towards their extended positions to engage the locking bolts with the lock recesses 44 of the locking portions 28. When it is desired to unlock the door, the bolts are moved in the opposite directions disengaging the bolts from the associated lock recesses, thus permitting the door to be opened. In the depicted embodiment, the bolts extend and retract in opposite directions. However, embodiments in which two or more bolts extend and retract in the same direction to engage corresponding lock recesses are also contemplated as the disclosure is not so limited.

Figure 20:
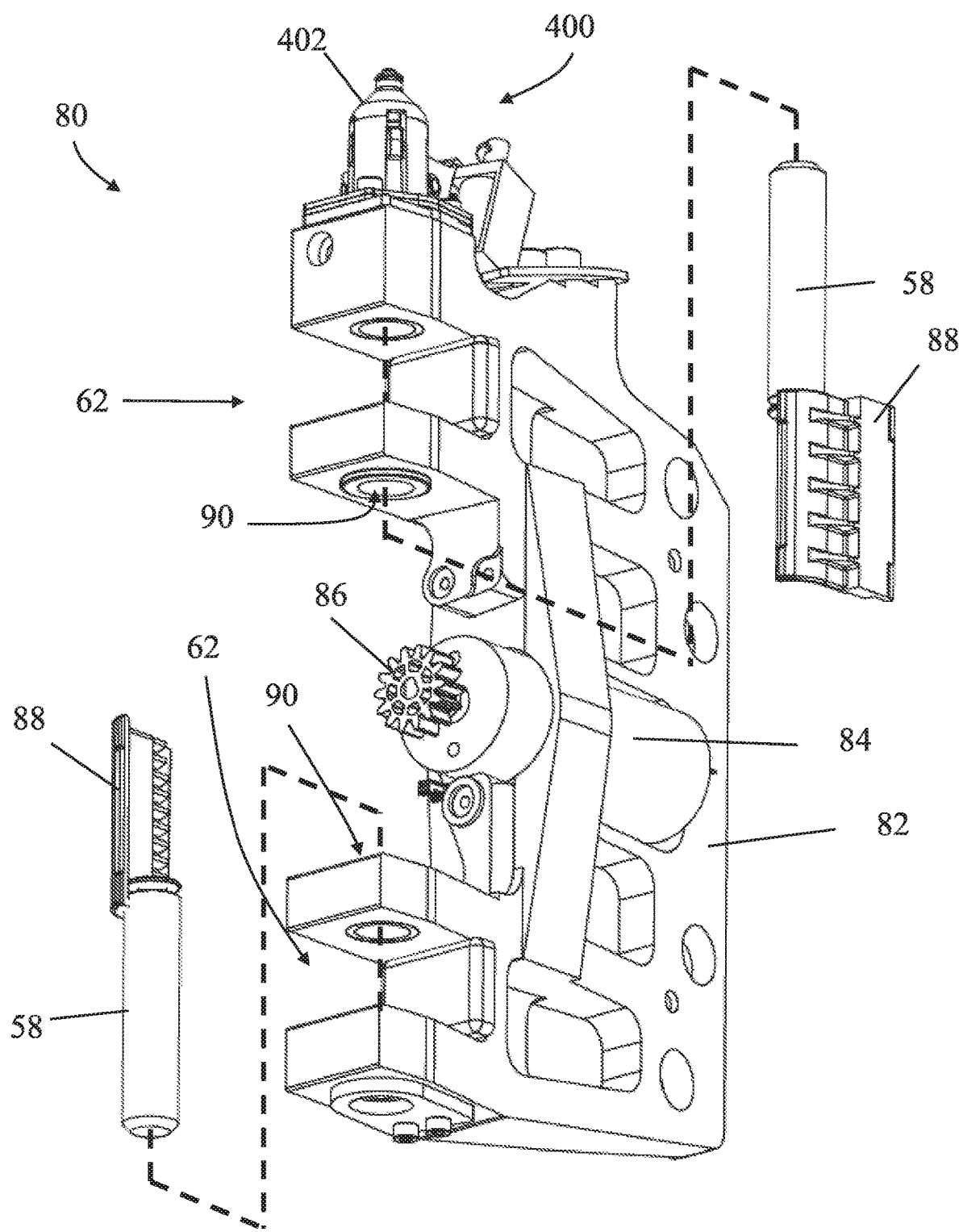
FIG. 20 is a partially exploded view of one embodiment of a lock.
Figure 21:
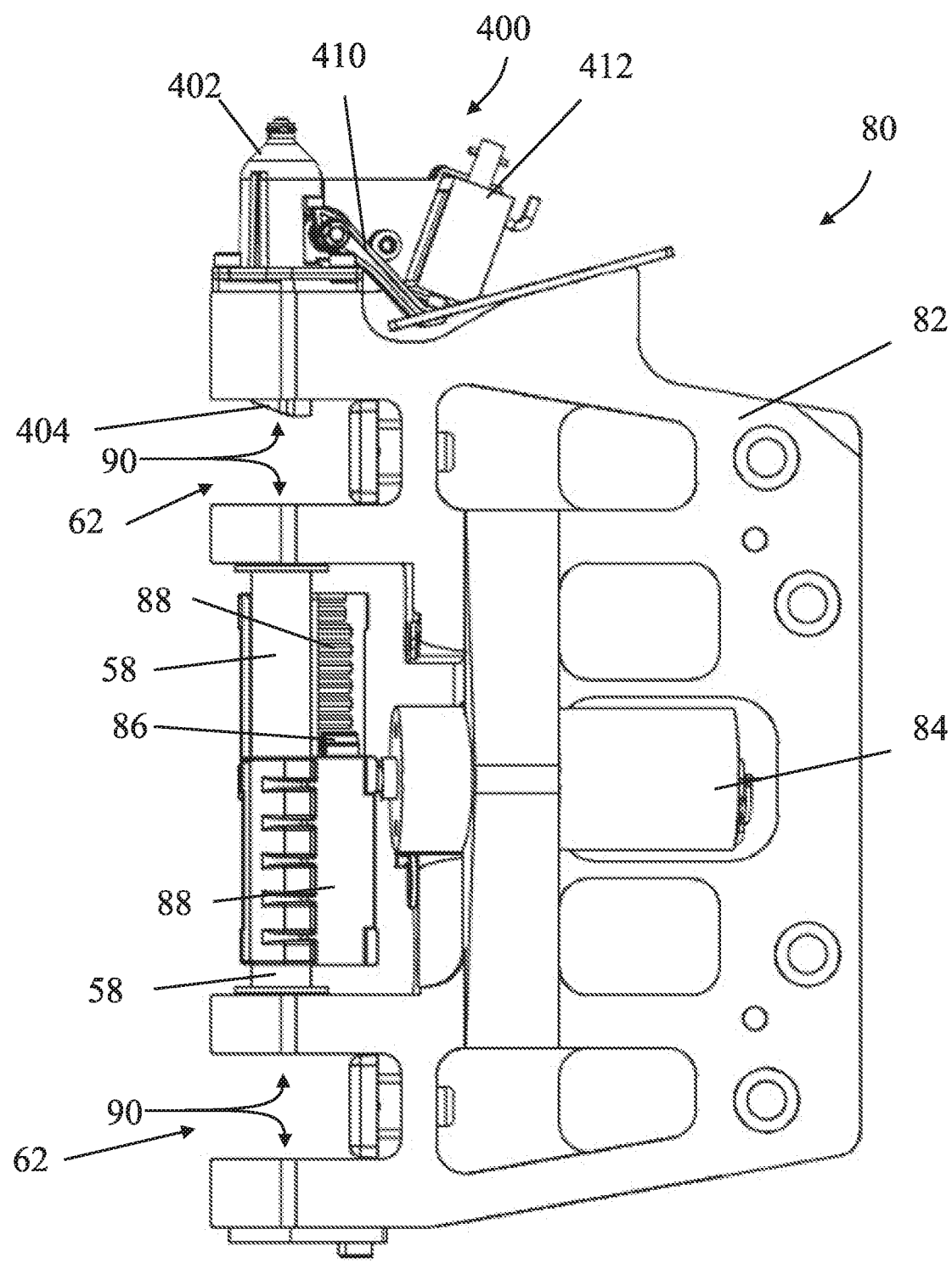
FIG. 21 is a side view of the lock of FIG. 20 in an unlocked configuration.
Figure 22:
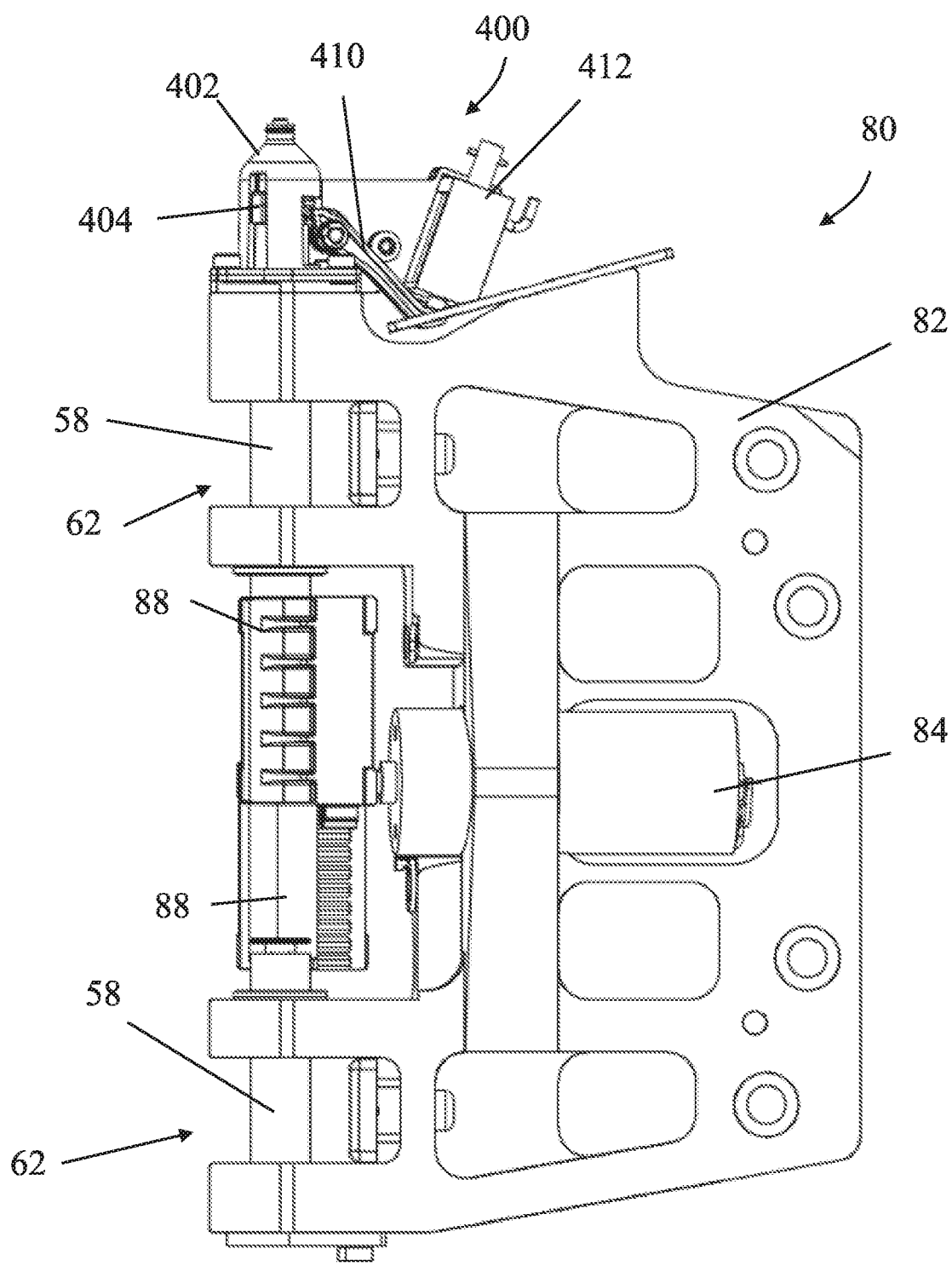
FIG. 22 is a side view of the lock of FIG. 20 in a locked configuration.

FIG. 20 depicts a partially exploded view of one embodiment of a lock 80. The lock includes a housing 82 that supports the various components of the lock. Depending on the embodiment, the housing may be attached to a frame or other portion of the juicer (not depicted). Two locking bolts 58 are moveable within the housing between an unlocked configuration as shown in FIG. 21, and a locked configuration as shown in FIG. 22 corresponding to retracted and extended states of the bolts respectively. In particular, the housing 82 includes channels 90 that receive the locking bolts, and a portion of each channel passes through a lock receptacle 62. As discussed above, the lock receptacles are located on the juicer and receive the locking portions 28 on the door when the door is in the closed position (e.g., see FIGS. 6 and 8). Further, when the locking portions 28 are received in the lock receptacles 62, the lock recesses 44 on the locking portions 28 may align with the channels 90. In this manner, the locking bolts 58 may pass through the lock recesses 44 of the locking portions when the locking bolts are received in the channels 90 (i.e., in the locked configuration), thereby securing the door to the juicer for pressing.

In certain embodiments, the lock is moved between the unlocked and locked configurations using a lock motor drivingly coupled with the locking bolts 58. For example, the lock 80 of FIG. 20 includes a lock motor 84 attached to a pinion gear 86 that engages corresponding teeth on racks 88. The racks 88 are separately attached to each of the locking bolts 58 which are constrained to move axially in a direction parallel to an extension direction of the bolts. Additionally, the two racks engage two opposing sides of the pinion gear. Accordingly, actuating the lock motor rotates the pinion gear which in turn displaces one of the locking bolts in a first direction and displaces the other locking bolt in the other opposing direction as illustrated by arrows K. This resulting displacement of the bolts continues until the bolts have moved from the unlocked configuration in their retracted positions to their extended positions where they have engaged the corresponding lock recesses formed in the door and are engaged with the channels 90 to place the lock in the locked configuration. The lock motor 84 may be operated in a reverse direction to move the locking bolts from the locked configuration back to the unlocked configuration after juicing.

Although the depicted lock includes two locking bolts that are displaced in opposing directions to move the lock between the unlocked configuration and the locked configuration, it should be understood that other arrangements for a lock are also contemplated. For example, a lock may use only a single locking bolt, or alternatively may include more than two locking bolts. Further, although the two locking bolts are co-linear and are displaced in opposing directions, the locking bolts may be offset and/or may be displaced in any suitable direction to move the lock to the locked configuration. Moreover, while the embodiments described above include a lock in which the locking bolts engage corresponding channels located on either side of a cavity that accepts a corresponding portion of the lock, it should be understood that the lock may include other locking structures such as one or more latches, cam locks, crossbars, hooks, or any other suitable structure, as the current disclosure is not limited to any particular type of lock.

In certain embodiments, it may be desirable to automate the alignment and/or locking of the door of a juicer. In one such embodiment, a juicer includes a door sensor that determines a position of the door in at least one location. For example the door sensor may include a switch that is triggered when the door is moved from the open position to the closed position, and/or when then door is moved from the closed position to the open position. The door sensor may be operatively coupled to a lock controller. In response to an output signal from the sensor to the lock controller, the lock controller may automatically control one or more aspects of the locking mechanism. One such type of control includes activating a lock motor to move the lock from an unlocked configuration to a locked configuration when the door is closed. However, it should be understood that a juicer may not include a door sensor, and the operation of a lock and/or associated features may be controlled manually or with any other suitable controller as the disclosure is not so limited.

Appropriate sensors for use with a juicer door as described above include, but are not limited to, contact sensors, magnetic sensors (e.g., a hall effect sensor), contact switches, and optical sensors.

According to another aspect of the current disclosure, the inventors have recognized that in some instances it may be difficult to align the various components of a lock when sufficiently tight tolerances and alignments have been used and/or when the various components may automatically move past a desired alignment position. For example, the angled construction of the juicer and associated door may result in the doors swinging past the closed position where the corresponding portions of a lock are aligned. Consequently, the inventors have recognized the benefits associated with a lock that includes a provisional lock to temporarily secure at least one locking portion of the door to the frame or pressing chamber of the juicer when the door is moved to the closed position. For example, the provisional lock may aid in aligning portions of a lock, such as a locking bolt in a first lock portion and recess formed in a second lock portion. In one embodiment, the provisional lock includes a detent that selectively engages at least one lock portion on a door when the door is moved to the closed position. In some embodiments, this detent may be a deformable protrusion that engages a recess on the door when appropriately positioned. Alternatively, the detent may be movable between a retracted position where it does not engage the recess formed in a corresponding lock portion and an extended position where it is able to engage the recess formed in the corresponding lock portion. Depending on the embodiment, a juicer may include a door sensor coupled to an actuator that automatically displaces the detent to the extended position when the door is opened to ready the detent for engaging the door. The detent may either deform, or be biased out of the way, of the corresponding lock portion as it is aligned with the corresponding recess. Either way, once aligned with the recess the detent engages the recess and temporarily holds the doors in the closed position prior to engaging the lock itself. Either during the locking process, or after a juicing operation is completed, the detent may be retracted to permit the door to be opened after the lock is disengaged. In some instances, opening the door may cause the detent to return to the locking position.

Referring again to FIG. 20, one embodiment of a lock 80 that includes a provisional lock 400 is depicted in a locked configuration. The provisional lock includes a housing 402 and a detent 404 that is displaceable within at least a portion of the channel 90 of the lock 80. The detent 404 is aligned with at least one locking bolt 58 that is displaceable towards the detent. The detent is biased towards an extended locked configuration for engaging a corresponding lock portion by a biasing element 408. Appropriate biasing elements include, but are not limited to, coil springs, deflectable beams, torsion springs, and elastic bands. As shown in the figure, a portion of the detent 404 protrudes into the receptacle 62 intended to receive the other portion of the lock when the provisional lock is in the extended locked configuration. The provisional lock further includes a lever 410 that is rotatable relative to the housing 402 and an actuator 412 drivingly associated with an end of the lever. Specifically, the lever 410 rotates about a pivot when the actuator is actuated. As discussed in more detail below, the lever selectively engages a catch on the detent such that when it is rotated by the actuator, it selectively releases the detent from the retracted position to the extended position.

Figure 23:
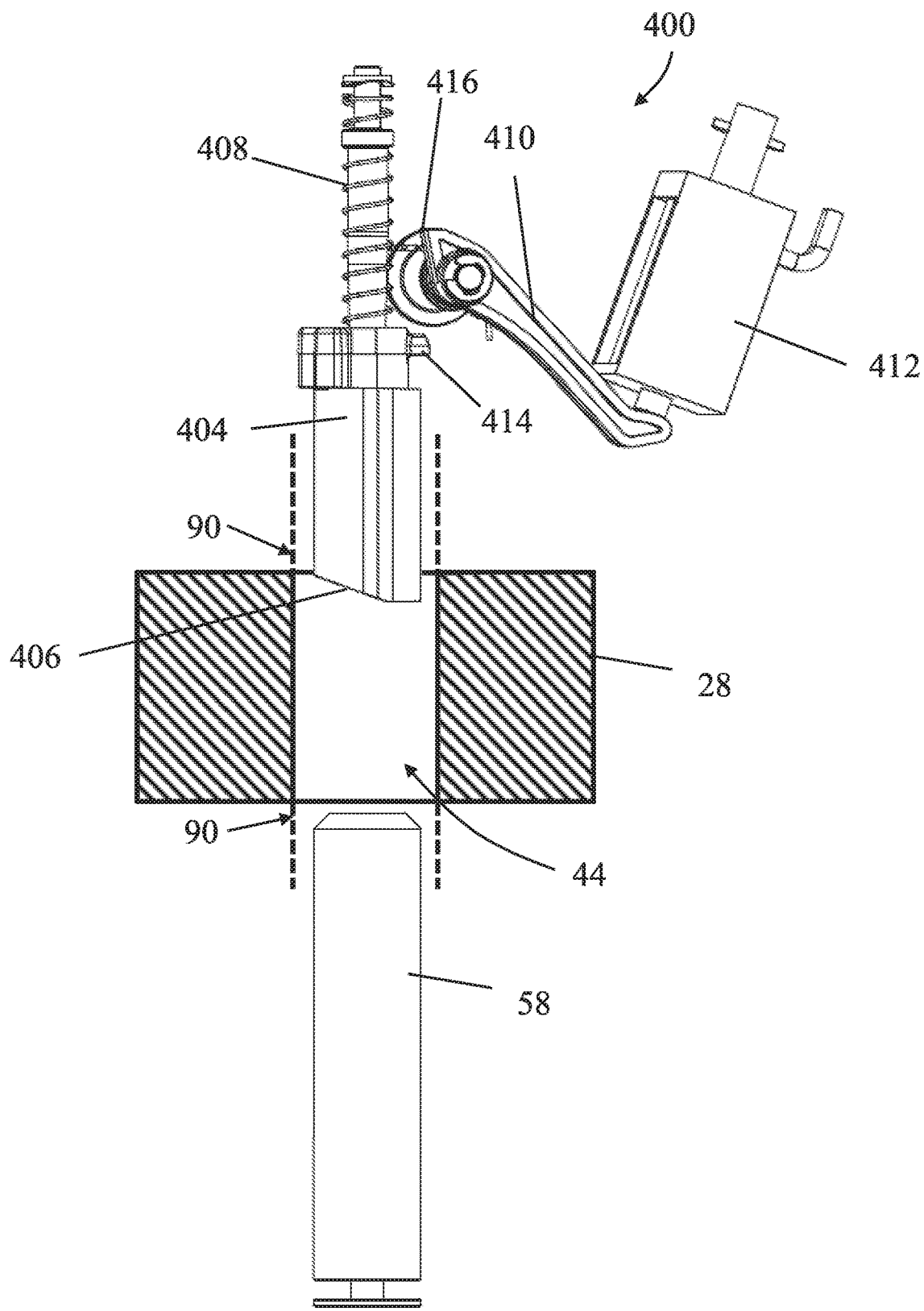
FIG. 23 is a schematic side view of a portion of the lock of FIG. 20 with a provisional lock in an extended locked position.
Figure 24:
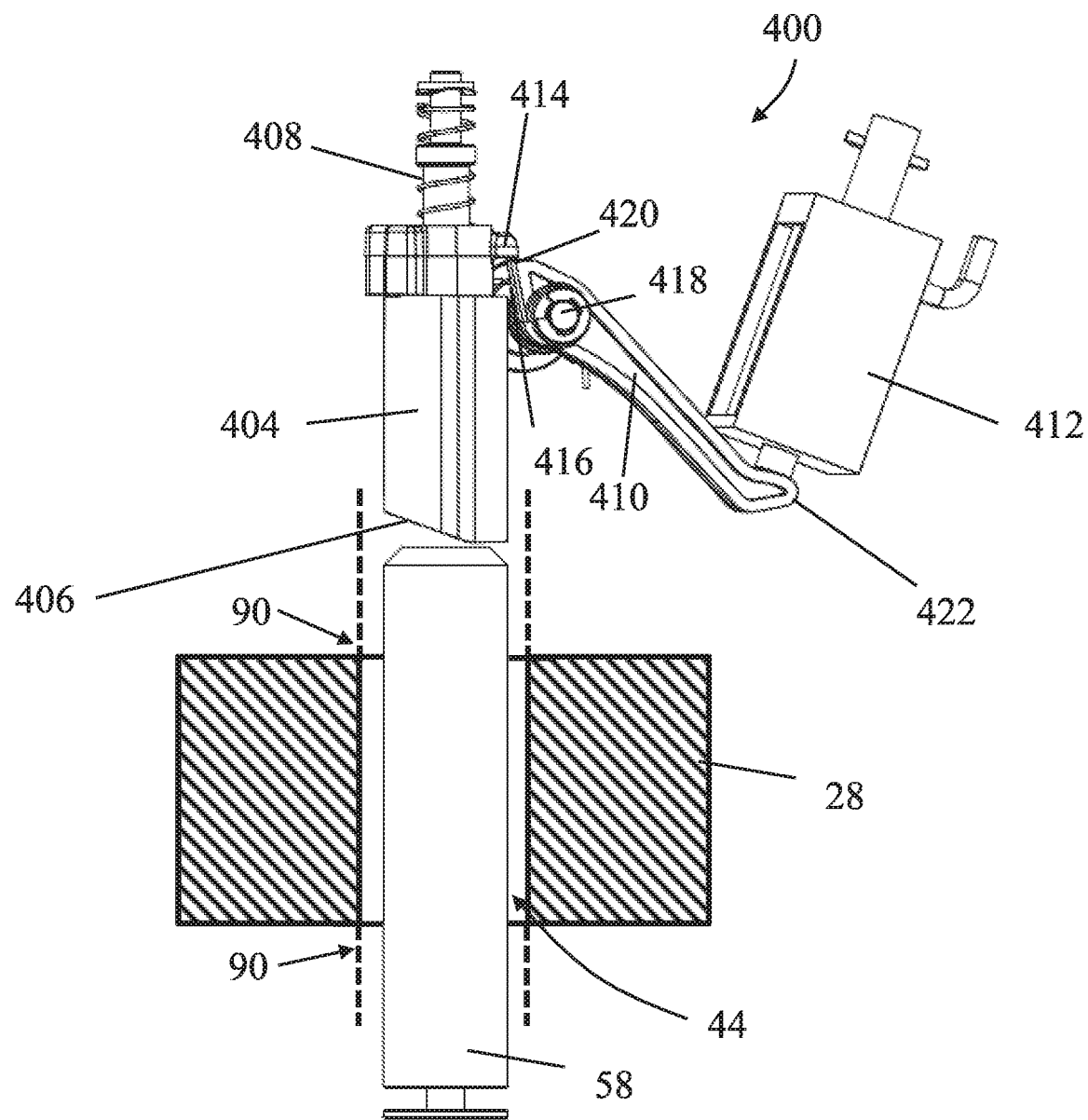
FIG. 24 is a schematic side view of the portion of the lock of FIG. 23 in the locked configuration.
Figure 25:
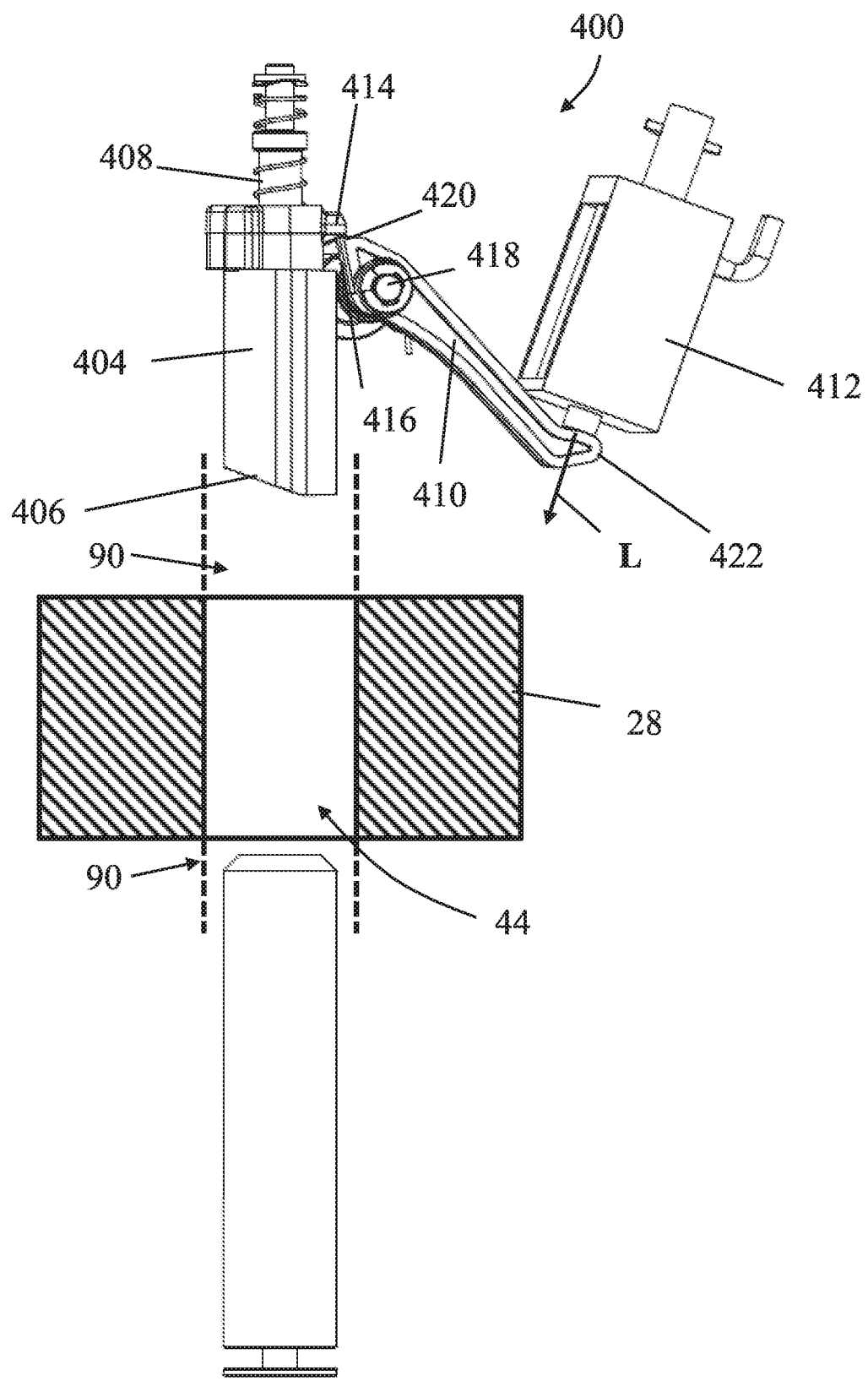
FIG. 25 is a schematic side view of the portion of the lock of FIG. 23 in the unlocked configuration.

FIGS. 23-25 illustrate the operation of the provisional lock 400. For the sake of clarity, certain portions of the lock and provisional lock are not depicted. In particular, FIG. 23 shows the provisional lock in the extended locked configuration after a locking portion 28 of the door has been received in the corresponding receptacle 62 (not depicted). The detent 404 includes an angled surface 406 and is biased towards an extended position by an associated with biasing element, such as a spring. Thus, as the door is closed, the detent is cammed upwards into channel 90 when the lock portion 28 is moved into contact with the detent as it is inserted into the receptacle. When the locking portion is fully received in the receptacle, the detent 404 is aligned with lock recess 44 and the biasing element displaces the detent into the lock recess of the locking portion. In this manner, the detent engages the lock portion to provisionally retain the door in the closed position where the channel 90 of the lock is aligned with the recess 44 of the locking portion 28 of the door ready for subsequent extension of the associated locking bolts.

As shown in FIG. 24, in some embodiments, displacing a locking bolt 58 associated with a detent 404 to the locked configuration may displace the detent 404 out of engagement with a locking portion 28 of a door or other component while also compressing the associated biasing element 408. Additionally, a ledge 414, or other retention feature, formed on the detent engages a camming surface 416 on the lever 410, causing the lever to rotate about a spring-biased pin 418. Accordingly, when the ledge 414 moves past the camming surface 416, the spring-biased pin 418 causes the lever to rotate back to a position in which the ledge 414 is engaged with a locking surface 420 on the lever 410. As shown in FIG. 25, the engagement between the ledge 414 on the detent 404 and the locking surface on the lever holds the detent in the retracted unlocked position. Consequently, when the locking bolt 58 is retracted to the unlocked configuration, as shown in FIG. 25, the detent is restrained from moving back into engagement with the locking portion 28 under the force of the biasing element 408 such that the locking portion may be removed from the receptacle and the door may be opened.

As noted above, in some embodiments, a juicer may include a door sensor that determines when a door is moved from the closed position to the open position. In some instances, a provisional lock 400 may be associated with the door sensor such that the provision lock is automatically moved to the extended locked configuration when the door is opened after a pressing operation. For example, as best illustrated in FIG. 25, the provisional lock may include an actuator 415 such as a solenoid that is operatively coupled to the door sensor. When the door is opened, the sensor triggers the actuator to displace an end 422 of the lever 410 by applying a force along a direction L. In this manner, the actuator drives rotation of the lever about pin 418 until the locking surface 422 is moved out of engagement with the ledge 414 of the detent, at which point the biasing element 408 causes the detent to displace downwardly into the extended locked position where it is ready to provisionally lock the door in place when it is subsequently closed.

To provide an additional layer of safety, in some instances, it may be desirable to disable operation of a juicer when the door is either unlocked, or partially locked. Thus, in some embodiments, a lock may further include a failsafe mechanism operatively coupled to the drive mechanism of the juicer. Depending on the particular embodiment, the failsafe mechanism may be constructed and arranged to determine if the lock is in the locked configuration such that the door is fully secured to the juicer. If the failsafe mechanism determines that the lock is not in a suitable configuration, such as if the locking bolts are not fully engaged with the corresponding recesses, the failsafe may prevent operation of the drive mechanism. For example, in one embodiment a failsafe mechanism includes one or more electronic gates (e.g., photogate sensors) that monitor a position of the locking bolts. The one or more electronic gates may be used to verify that each of the locking bolts is in the locked configuration. A control circuit associated with the electronic gates and the drive mechanism may check the position of the electronic gates and prevent operation of the drive mechanism, and thus prevent a pressing operation of a juicer, if the locking bolts are not in the locked configuration. In some cases if the failsafe mechanism determines that the lock is not in a suitable configuration, the device may attempt to move the lock to the locked configuration for a predetermined amount of time and/or for a predetermined number of attempts. After attempting to close the lock, if the lock is still not in the fully locked configuration, an associated controller may move the lock to an unlocked configuration, and again prevent a pressing operation of the juicer. In addition to the above, a failsafe mechanism may also be configured to detect a failure of the lock during a pressing operation, in which case the failsafe mechanism may terminate the pressing operation. Depending on the embodiment, a failsafe mechanism may have any suitable configuration, or alternatively, a juicer may not include such a failsafe mechanism, as the current disclosure is not so limited.

In some embodiments, a juicer includes a controller configured to control one or more aspects of the operation of the juicer. For example, as discussed above, a controller may include one or more circuits coupled to a drive mechanism and/or other active components of the juicer. For example, a control circuit may provide control signals such as a variable current to a motor of the drive mechanism to control the force applied by a displaceable platen. Moreover, the control circuits of a juicer may control other juicer functions, such as operating a lock, operating a reader to read information stored in an information region of a juicer cartridge, receiving operator input (such as commands for juicer operation), outputting information (e.g., to a visible display screen, indicator lights, juicer status information in electronic data form, and so on), and other functions. The control circuits may include any suitable components to perform the desired control, communication, and/or other functions. For example, a control circuit may include one or more general purpose computers, a network of computers, one or more microprocessors, etc. for performing data processing functions, one or more memories for storing data and/or operating instructions (e.g., including volatile and/or non-volatile memories such as optical disks and disk drives, semiconductor memory, magnetic tape or disk memories, and so on), communication buses or other communication devices for wired or wireless communication (e.g., including various wires, switches, connectors, Ethernet communication devices, WLAN communication devices, and so on), software or other computer-executable instructions (e.g., including instructions for carrying out functions related to controlling the load current control circuit as described above and other components), a power supply or other power source (such as a plug for mating with an electrical outlet, batteries, transformers, etc.), relays and/or other switching devices, mechanical linkages, one or more sensors or data input devices (such as a sensor to detect the position of the door of the juicer, a video camera or other imaging device to capture and analyze information regarding a juicer cartridge or other components, position sensors to indicate positions of a displaceable pressing surface, locking bolts, and so on), user data input devices (such as buttons, dials, knobs, a keyboard, a touch screen or other), information display devices (such as an LCD display, indicator lights, a printer, etc.), and/or other components for providing desired input/output and/or control functions.

Depending on the particular embodiment, a controller including one or more control circuits may either be integrated within a juicer and/or it may be located remotely from the juicer as the disclosure is not so limited. For example, a remote control circuit may be provided in a separate unit adjacent the juicer, or in an offsite device such as a computer or a server that is connected to the juicer via a cable, a wireless connection such as a Wi-Fi network or Bluetooth connection, or via any other suitable connection that can allow for the communication of signals between the juicer and the control circuit.

One illustrative embodiment of a juicer having a control circuit is shown in FIG. 9. In particular, the juicer 10 includes a controller 98, such as a control circuit, within the juicer. In the depicted embodiment, the controller is coupled to the drive mechanism 200, for example a motor including within the drive mechanism, to control one or more aspects of the operation of the pressing process (e.g., the force applied by the displaceable pressing surface 20). However, as noted above, the controller also may be associated with other components of the juicer 10 as well (e.g. a lock and/or a reader) as the current disclosure is not limited to how many controllers are included within a juicer and/or which components the controllers are associated with.

In some embodiments, the inventors have recognized the advantages of a juicer that reads information associated with a juicer cartridge or other information carrier and controls one or more aspects of the operation of the juicer based on that information. For example, this functionality may simplify operation by allowing the juicer to automatically press a juicer cartridge when the juicer cartridge is loaded into the juicer without requiring any additional input from the user using for example, information related to the juicer cartridge as detailed further below. In other embodiments, reading information on an information carrier may be useful during the initial setup of a juicer or other appliance to help set up.

Figure 26:
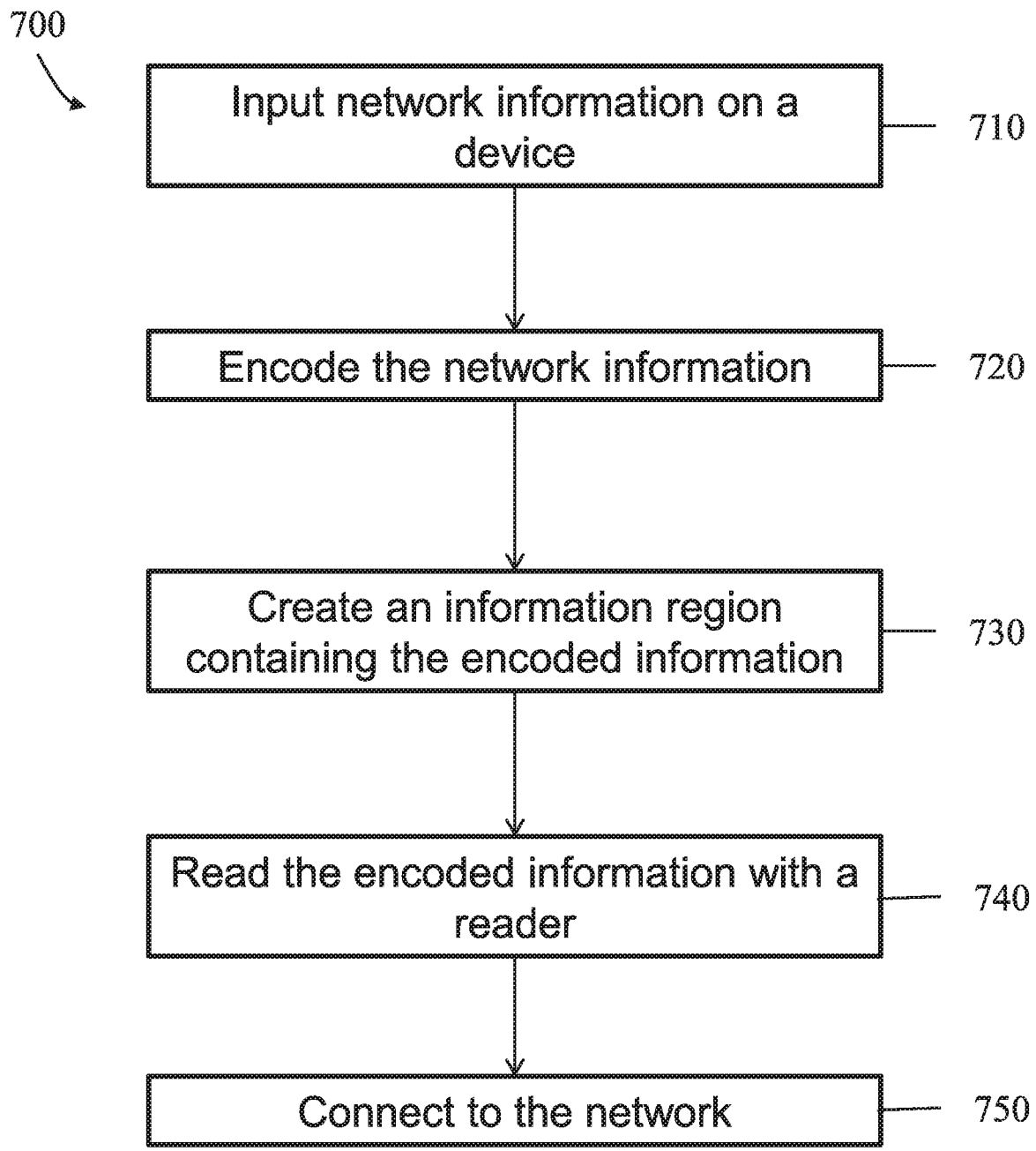
FIG. 26 is a flow chart depicting one embodiment of a method for connecting a juicer to a network.

Oftentimes it is difficult to input wireless network or router information into an appliance or device, such as a juicer, that does not include a keyboard and/or large enough touch screen to enable easy typing. However, the various types of readers noted above, may be incorporated in these devices to read information from a related information carrier. It should be understood that such an arrangement may be used for any number of devices including refrigerators, thermostats, televisions, as well as devices that include various input devices such as tablets, smart phones, and computers. However, for the sake of clarity, a juicer is described below. For example, in one embodiment, a reader on a juicer may read a quick response (QR) code, or other appropriate information encoding method, that contains information related to connecting the juicer to a wireless network such as the name, ip address, and/or passcode for the network. While a physical card or other permanent structure may be used to present this information, in some embodiments, it may be desirable to generate the information for the reader using a smart device such as a tablet, smart phone, or computer to input the network information. FIG. 26 illustrates one embodiment of such a method 700 for connecting a juicer, or other appliance to a network. At block 710, the network information is inputted on a device, and at block 720 the network information is then encoded as a QR code, or other encoding method. The encoded information is then either displayed on a screen or printed out at block 730 to create an information region that is held in front of the reader. At block 740, the reader then reads the encoded network information. Once read, the juicer then connects to the intended network at block 750. In this manner, the juicer is able to automatically establish a connection to a wireless network without the user having to manually input the settings via a separate user interface.

While network information encoded into an information region has been discussed above, it should be understood that other information related to setting up or modifying the performance of a device may be used as well. For example, device settings, operation commands, device names, and/or any other desirable information may be input into a device using the above described methods.

As noted above, in some instances a reader may be used to read information related to a juicer cartridge to control some aspect of the operation of the juicer. In such an embodiment, the inventors have recognized that juicer cartridges containing different types of food matter, different combinations of food matter, and or food matter with varying degrees of freshness and/or juice content may require different pressing parameters in order to optimize the extraction of juice from the food matter. For example, the same combination of food matter within a juicer cartridge may require different pressing parameters for different lots of produce prepared and packaged at different times and/or locations due to the produce having different juice content and/or being harder requiring different pressing pressures and/or compaction amounts to properly extract the juice. Accordingly, a juicer cartridge may include information related to a desired pressing operation for extracting the juice from the food matter contained therein. As noted above, a juicer may include a reader that is capable of reading information provided on an information region of a corresponding juicer cartridge. Accordingly, when a juicer cartridge is loaded in the pressing chamber, the reader may read the information on the juicer cartridge and then press the juicer cartridge according to the desired pressing procedure encoded within that information region.

Depending on the embodiment, a juicer may adjust any suitable combination of operating parameters based on the information contained in the information region of a juicer cartridge that is read by the reader on the juicer. For example, the information may either be used to determine, or may include commands for, an optimal speed profile, force profile, total displacement stroke, number of pauses, duration of pauses, number of press and/or retract cycles, distance of press and/or retract cycles, or any other appropriate operating parameter of a displaceable pressing surface or other component of the juicer during a pressing operation. In some embodiments, the one or more pressing surfaces of a juicer may be temperature controlled (e.g., heated or cooled), and the information may determine an optimal temperature for the pressing surfaces during pressing. Further, in some instances a juicer may disable operation of the juicer (i.e., not press a particular juicer cartridge) based on the information. For example, if a juicer determines that a juicer cartridge is expired, has been recalled, has been stored improperly at elevated temperatures for too long (i.e., the cold chain has been broken as indicated by some thermal indicator readable by the reader or other device) or that a juicer cartridge has already been pressed, the juicer may not press the cartridge.

The desired juicer operation parameters for a particular juicer cartridge (e.g. a particular recipe, type of food matter, etc.) may be determined via any suitable testing method. For example, in some instances the moisture content of the food matter may be determined when the food matter is processed and packaged in the juicer cartridges. The moisture content may be included in an information region on the juicer cartridge, and the juicer may read the moisture content information and adjust the pressing parameters according to a predetermined relationship between the pressing parameters and the moisture content. Alternatively or additionally, the juice extraction yield may be tested versus applied pressure and total compression to determine optimal pressing parameters for a particular lot of juicer cartridges during processing and/or packaging. The desired pressing parameters for that lot of juicer cartridge may then be included in the information region of each juicer cartridge. Alternatively, the information region may simply include information to identify a lot and/or individual juicer cartridge. Correspondingly, the juicer may connect to a central database (e.g., an internet database) to download the optimized pressing parameters for that particular juicer cartridge. In some embodiments, a juicer may periodically connect to a central database to download an updated set of pressing parameters for different recipes of juicer cartridges, recalled juicer cartridges, and/or other appropriate information. The juicer may then store the pressing parameters or other information within a memory of the juicer (or on any other suitable control circuit as described above). This process is described further below in relation to operation of a juicer system with a juicer cartridge loaded in a corresponding juicer.

As discussed above, in some embodiments, it may be desirable to control the extent to which a juicer compresses a juicer cartridge. For example, in some embodiments, a juicer may fully compress a juicer cartridge to extract as much juice as possible from the food matte contained within the juicer cartridge. In other embodiments, a juicer may only partially compress a juicer cartridge. For example, a larger or "bulk" juicer cartridge may contain enough food matter for multiple servings of juice. In such embodiments, a juicer may partially compress the larger cartridge to extract a portion of the juice from the food matter contained in the larger cartridge. The cartridge may subsequently be removed from the juicer and stored for future use. In view of the above, it should be understood that a juicer may be configured to extract any portion of the juice contained within a juicer cartridge. The juicer cartridge may include information encoded in the information region indicating that it is a multiple use juicer cartridge in that extension of the pressing mechanisms should be limited to an extension range appropriate for pressing a single, or other desired number of servings. Of course, in some embodiments, the juicer may store information related to the bulk juicer cartridge such that it knows how many servings have already been extracted from the juicer cartridge and thus may extend the pressing mechanisms to the correct extension for the next serving of juice during a pressing operation. Similar to the other juicing cartridges noted above, the appropriate pressing parameters for a particular bulk juicer cartridge may be encoded into the information region and used during each pressing operation.

In some instances, the food matter contained in a juicer cartridge is perishable. Thus it may be desirable for different components of a juicing system to be cooled or refrigerated in order to aid in preserving the food matter. Furthermore, it may be desirable for the extracted juice to be chilled. For example, a pressing chamber of a juicer may be chilled in order to keep juicer cartridges which may be stored in the pressing chamber at a desired temperature while the juicer is idle and/or to avoid heating of the food matter and juice during a pressing operation. Depending on the embodiment, other elements of the juicer may be chilled as well. For example, the press may be chilled, including for example chilled pressing surfaces which can help to chill the food matter while it is compressed for juice extraction. In such an embodiment, chilled pressing surfaces may further aid in reducing any heat which is generated during the juicing process due to friction. While a refrigerated system is described above, it should be understood that juicer systems that do not include refrigeration, or include other means of cooling, such as refrigerated pressing surfaces insertable into the pressing chamber, chilled inserts, and/or other appropriate features are also contemplated as the disclosure is not so limited.

Depending on the particular embodiment, various refrigeration techniques may be used to provide chilled components in the embodiments noted above. For example, passive cooling techniques may involve the installation of pre-chilled materials such as ice packs into a juicing system. Alternatively, active cooling systems may be used to provide refrigeration including, but not limited to conventional refrigeration cycles, evaporative cooling, thermoelectric devices, magnetic refrigeration devices, or any other suitable device capable of removing heat from a system.

According to another aspect of the present disclosure, a juicer cartridge is provided which may include one or more liquid impermeable compartments containing food matter such as fruits or vegetables, or other types of edible products. For example, a juicer cartridge may comprise a pouch formed from two or more liquid impermeable layers bonded or welded around the perimeter to form one or more internal compartments that at least partially surround the food matter, and in some embodiments, completely surround the food matter. A juicer cartridge may further include an outlet which provides fluid communication between the one or more liquid impermeable compartments and an exterior of the juicer cartridge to allow juice extracted from the food matter to be dispensed from the cartridge. A juicer cartridge may be positioned within a pressing chamber of a corresponding juicer, such as the embodiments described above, which may then compress the juicer cartridge and the food matter contained therein in order to extract juice from the food matter.

In some embodiments, a juicer cartridge may also include one or more liquid permeable compartments disposed within the one or more liquid impermeable compartments. In such embodiments, the liquid permeable compartments may at least partially surround, and in some instances completely surround the food matter and act as a filter when juice is extracted from the food matter. In some embodiments, the one or more liquid permeable compartments may contain different food matter, and the compartments may be sized to appropriately accommodate the type and amount of food matter placed therein. Therefore it should be understood that the compartments may have any suitable size. As described in more detail below, in some instances the one or more liquid permeable compartments may be formed by bonding or welding a liquid permeable layer together with the liquid impermeable layers. Of course, as detailed further below, various modifications and additional features may be incorporated into a juicer cartridge including the juicer cartridge features disclosed in assignee's co-pending U.S. application Ser. No. 14/229,940 filed on Mar. 30, 2014, published as US 2014/0314918, and international application PCT/US2014/034676 filed Apr. 18, 2014, published as WO 2014/182423, each of which are hereby incorporated by reference in their entirety.

As noted above, in some embodiments a liquid impermeable compartment and/or liquid permeable compartment may be formed by bonding or welding together layers of material around their perimeter. As used herein, bonding or welding of liquid impermeable and/or liquid permeable layers generally refers to any suitable bonding method, including, but not limited to, heat welding, ultrasonic welding, adhesive bonding, or any other suitable joining method that may be used to secure the layers of material together. For example, in some embodiments, a weld around a liquid permeable compartment may form a fluid-tight seal and may be strong enough to withstand the forces applied to the weld during pressing of the juicer cartridge in an associated juicer.

FIG. 3 depicts an illustrative embodiment of a juicer cartridge 500 loaded in an associated juicer 10. As discussed above, the juicer cartridge 500 includes a liquid impermeable compartment 502 that contains food matter. The juicer cartridge further includes an outlet 504 associated with the liquid impermeable compartment through which juice extracted from the food matter may flow during pressing.

Figure 27:
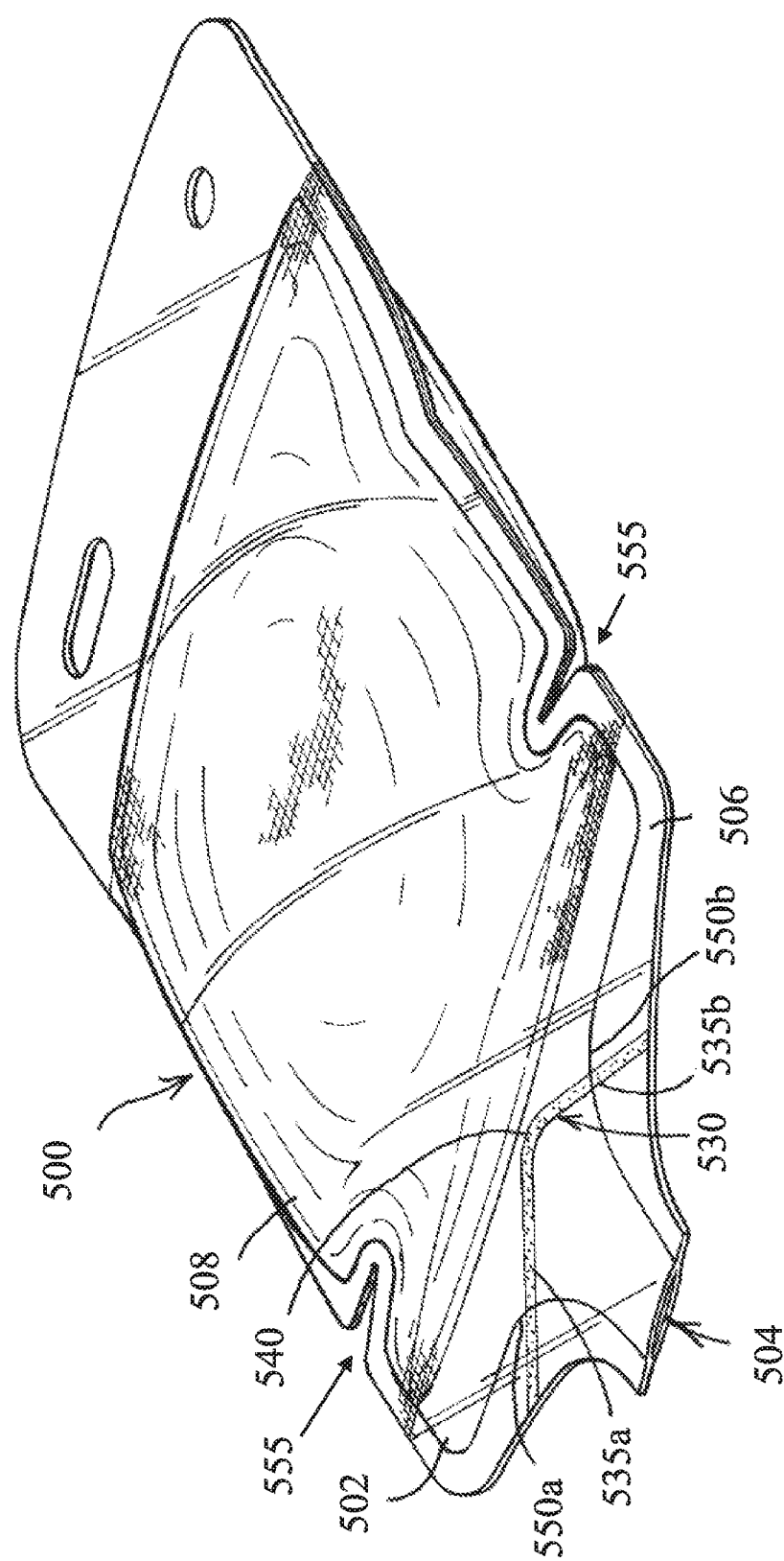
FIG. 27 is a perspective view of one embodiment of a juicer cartridge.

FIG. 27 shows another embodiment of a juicer cartridge 500. The juicer cartridge includes a liquid impermeable compartment 502 containing food matter, and an outlet 504 providing fluid communication with the liquid impermeable compartment and an exterior of the juicer cartridge. In the depicted embodiment, the liquid impermeable compartment 502 is formed from two liquid impermeable layers bonded around their perimeters with a weld 506. However, embodiments in which a single liquid impermeable layer is folded over and bonded around its edges to form one or more liquid impermeable compartments are also contemplated. It should be understood that the perimeter weld 506 is not intended to open or burst during normal handling and use of the juicer cartridge 500, including during pressing. Therefore, the liquid impermeable compartment is capable of supporting pressures sufficient to extract juice from the food matter contained therein during a pressing operation without uncontrollably rupturing.

The juicer cartridge 500 of FIG. 27 also includes a liquid permeable compartment 508 disposed within the liquid impermeable compartment 502. As noted above, the liquid permeable compartment may comprise one or more liquid permeable layers that at least partially surround the food matter. In this manner, the liquid impermeable layers may act as a filter when juice is extracted from the food matter. In some embodiments, a liquid permeable compartment may be formed from a single layer of liquid permeable material that is folded to form two layers, and the folded liquid permeable material may be welded around its periphery with the liquid impermeable layers to form the liquid impermeable compartment. As depicted in the figure, the liquid permeable compartment 508 is spaced from an internal bottom edge of the juicer cartridge 500 adjacent to the juicer cartridge outlet 504. In some embodiments, the bottom edge of the liquid permeable compartment may correspond to a fold in a single sheet of liquid permeable material to help aid strength to this region of the liquid permeable compartment. While a single liquid permeable compartment is depicted in the figure, it should be understood that a juicer cartridge may include more than one liquid permeable compartment and each permeable compartment may be spaced from the bottom internal edge of the liquid impermeable compartment. Of course, embodiments in which a juicer cartridge does not include a liquid permeable compartment also contemplated as the present disclosure is not so limited. Further, although a liquid permeable layer formed from a single folded sheet of liquid permeable material is described above, in other embodiments the liquid impermeable compartment may be formed from two or more layers of liquid permeable material bonded together along their periphery. Similar to the liquid impermeable compartment, the liquid permeable compartment is capable of supporting pressures sufficient to extract juice from the food matter contained therein during a pressing operation without uncontrollably rupturing.

Figure 28:
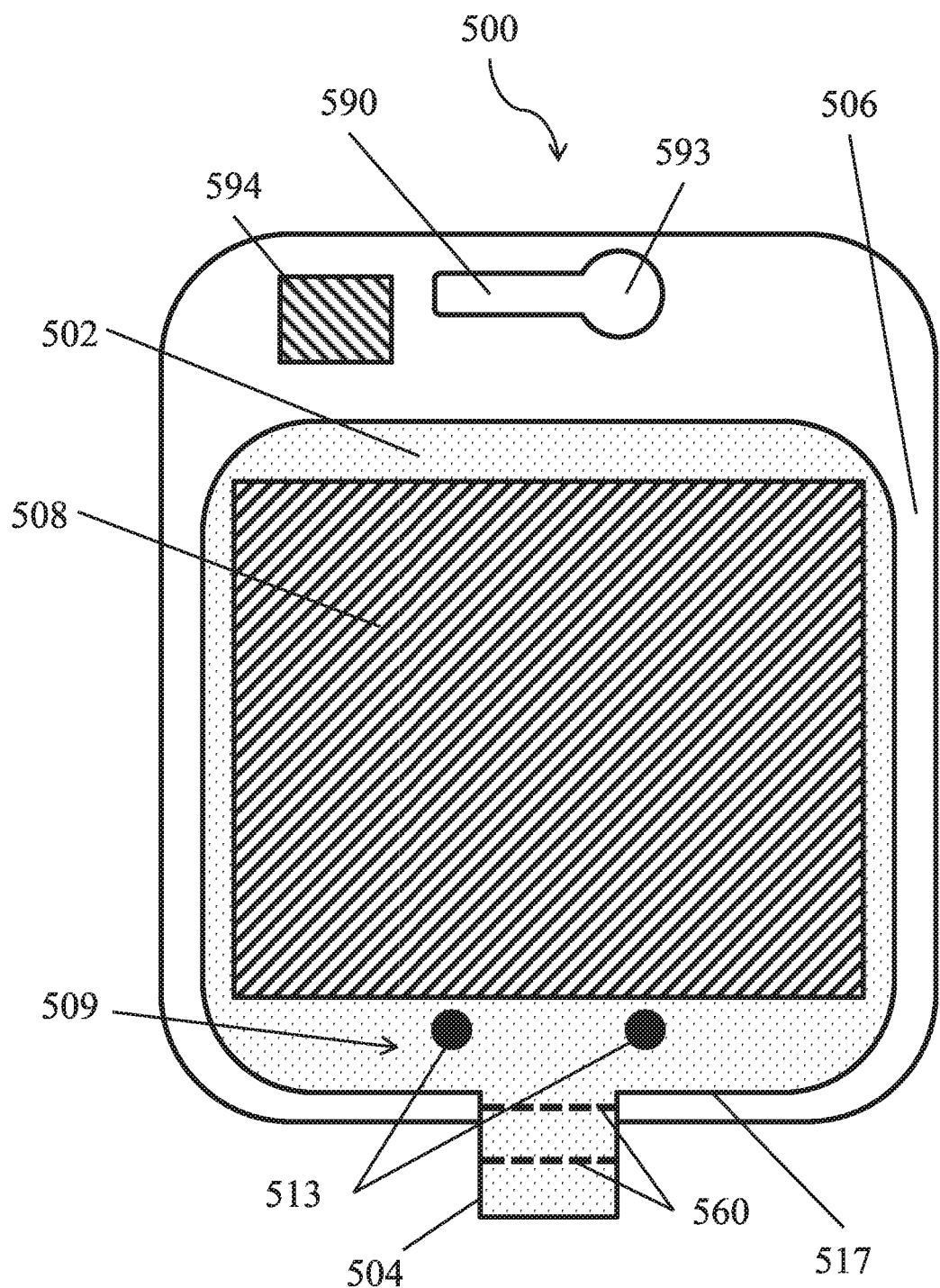
FIG. 28 is a schematic representation of another embodiment of a juicer cartridge.

Another illustrative embodiment of a juicer cartridge 500 is shown in FIG. 28. Similar to the embodiment described above, the juicer cartridge includes a liquid impermeable compartment 502, and outlet 504 in fluid communication with the liquid impermeable compartment, and a welded region 506 around at least a portion of the periphery of the liquid impermeable compartment. However, in this embodiment, a liquid permeable compartment 508 is disposed completely within the liquid impermeable compartment 502, and is not bonded together with the liquid impermeable material; instead, the liquid permeable compartment 508 is supported within the liquid impermeable compartment with one or more support welds 513 that are located between the liquid permeable compartment and the outlet. Further, the support welds are spaced from the bottom internal edge of the liquid impermeable compartment associated with the outlet. As depicted, the support welds maintain the liquid permeable compartment spaced from the outlet and the associated bottom internal edge of the liquid impermeable compartment.

Figure 29:
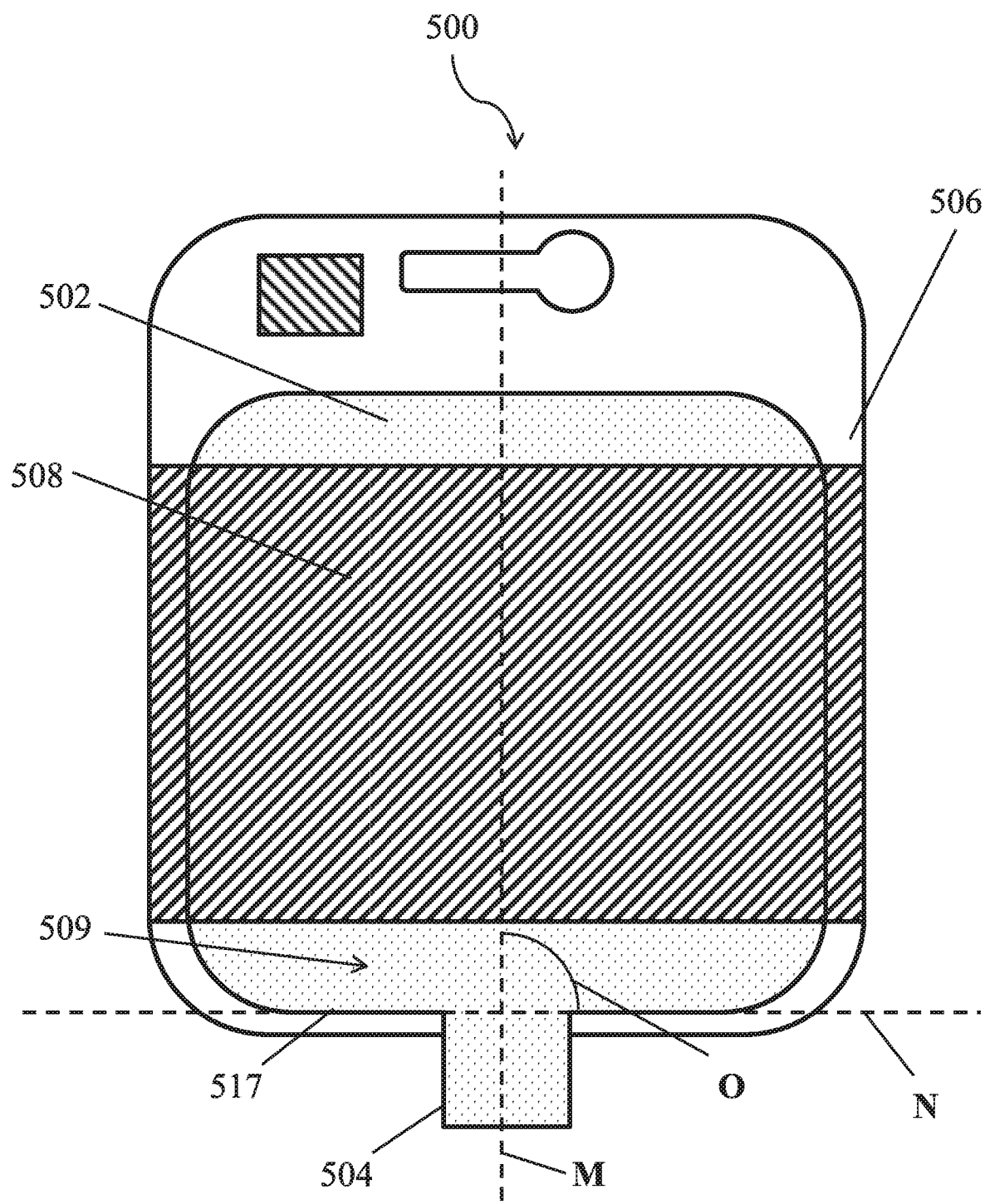
FIG. 29 is a schematic representation of yet another embodiment of a juicer cartridge.

Yet another embodiment of a juicer cartridge 500 is depicted in FIG. 29. Similar to the embodiments described above, the juicer cartridge includes a liquid impermeable compartment 502, an associated outlet 504, a welded portion around the exterior of the liquid impermeable compartment 506, and a liquid permeable compartment 508 disposed within the liquid impermeable compartment. Further, similar to the prior embodiment depicted in FIG. 27, a portion of the liquid permeable compartment 508 is bonded together with the liquid impermeable material to secure the liquid permeable compartment in a desired position and orientation within the liquid impermeable compartment. However, in this embodiment, the liquid permeable compartment does not extend to an upper edge of the liquid impermeable compartment opposite the outlet 504. Again, similar to the above embodiments, in some instances, the liquid permeable compartment may be located such that an edge of the liquid permeable compartment oriented towards the outlet is spaced from both the outlet and an associated internal edge of the liquid permeable compartment.

In view of the above, it should be understood that the current disclosure is not limited to any particular configuration of a liquid impermeable compartment or liquid permeable compartment in a juicer cartridge.

According to another aspect of the current disclosure, the inventors have recognized benefits associated with juicer cartridges that include stress relief features. For example, one or more stress relief features may be located on a single side, or two opposing sides, of a juicer cartridge and between a side including an outlet from the cartridge and a side of the cartridge opposite the outlet. The stress relief features may be constructed and arranged to limit the transfer of forces exerted on the juicer cartridge during pressing to the outlet portion of the cartridge. Accordingly, the stress relief features may decouple, or at least limit, the movement of different portions of the juicer cartridge, thereby allowing the cartridge outlet to remain in one location and/or orientation as other portions of the juicer cartridge are moved during pressing. In this manner, the stress relief features may aid in ensuring that the extracted juice is directed from the juicer cartridge outlet and into a beverage container, while reduce splashing and/or spillage.

In some embodiments, the profile of a juicer cartridge may include indentations in the sides of the juicer cartridge, and the indentations may act as the above described stress relief features. For example, the stress relief features may include notches or cut out areas on the side of the juicer cartridge. The notches or cut outs may have any suitable shape, including, but not limited to a round shape (e.g., a circular or elliptical shape), a "v" shape, a square shape, a rectangular shape, or any other suitable shape as the current disclosure is not so limited. Alternatively, the stress relief features may not include indentations, but instead may include a weakened area such as a scored or perforated area or an area of more flexible material that permits the juicer cartridge to flex in the associated region to help decouple movements of the pouch from the outlet. Depending on the particular embodiment, the indentations or other stress relief features may be formed in one or both of the liquid impermeable compartment and the liquid permeable compartment of a juicer cartridge.

As discussed above, the stress relief features may be constructed and arranged to decouple the outlet area of a juicer cartridge from the other portions of the juicer cartridge. Accordingly, the stress relief features may be located near the juicer cartridge outlet. For example, in some embodiments the stress relief features may be located within a certain percentage of a side length of a side of the juicer cartridge extending between the outlet and a side of the juicer cartridge opposite the outlet. Appropriate percentages of the side length that the stress relief feature may be located within include, but are not limited to, 25% of the side length from the outlet of a juicer cartridge, 20% of the side length from the outlet, 10% of the side length from the outlet, 5% of the side length from the outlet, or any other appropriate percentage. Of course, it should be understood that a stress relief feature located outside the noted ranges of the side length are also contemplated, as the current disclosure is not so limited.

Figure 30:
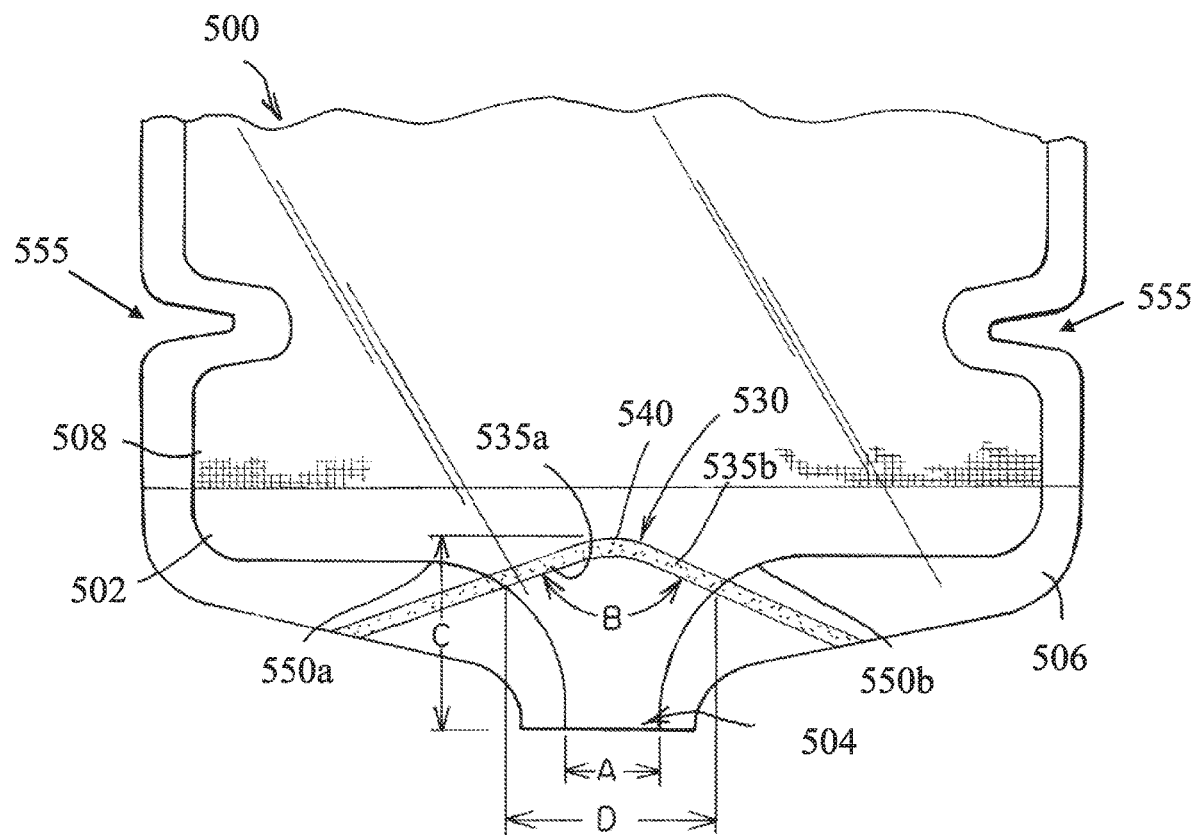
FIG. 30 is a front view of a portion of the juicer cartridge of FIG. 27.

Referring again to FIG. 27, juicer cartridge 500 includes two stress relief features 555 in accordance with the current disclosure. In this embodiment, the stress relief features are formed on opposing sides of the juicer cartridge. As best illustrated in FIG. 30, which depicts a partial front view of the juicer cartridge 500 of FIG. 27, the stress relief features are formed as "v" shaped indentations formed in both the liquid permeable compartment 502 and the liquid permeable compartment 508.

Although a juicer cartridge having two stress relief features is described above, it should be understood that a juicer cartridge may have only one stress relief feature, or more have any number of a plurality of stress relief features. Further, although the stress relief features are depicted as being directly opposite one another on the two opposing sides of the juicer cartridge (i.e., the stress relief features are located at the same distance from the juicer cartridge outlet), the stress relief features may be offset from one another, and/or the opposing edges of a juicer cartridge may have a different number of stress relief features. Accordingly, it should be understood that the current disclosure is not limited to any particular configuration of stress relief features on a juicer cartridge.

According to another aspect of the current disclosure, the inventors have recognized and appreciated that a juicer cartridge that includes a burstable seal that opens in a controlled fashion when a pressure is applied to the juicer cartridge by an associated juicer may offer multiple benefits. For example, a burstable seal may allow for a juicer cartridge to open automatically and allow juice to be dispensed from the juicer cartridge while not requiring any additional action from the user such as cutting a portion of a juicer cartridge outlet or removing a seal before loading the cartridge into the juicer, or requiring any additional mechanisms in the juicer to open the cartridge. Instead, a burstable seal may open as a part of the normal pressing process when the pressure inside a juicer cartridge exceeds a rupture strength of the seal. However, conventional burstable seal designs may not have a predictable rupture strength, and therefore may not open in a controlled manner. This may result in pressure buildups within the juicer cartridge, which may lead to splashing, foaming, or other undesired effects during dispensing of the extracted juice from the juicer cartridge.

In view of the above, the inventors have recognized the benefits associated with a juicer cartridge that includes a burstable seal that opens in a controlled and predictable manner when pressure is applied to the cartridge by a juicer. For example, a seal that opens when a predetermined pressure is applied to the juicer cartridge, or when a predetermined peel force is applied to the seal, may allow a smooth stream of juice to be dispensed from the juicer cartridge without splashing or foaming. Accordingly, a burstable seal as described herein may be included in a juicer cartridge to provide consistent and predictable dispensing of juice from the juicer cartridge.

It should be understood that the term burstable seal, as used herein, refers to a portion of a juicer cartridge that is constructed and arranged, or otherwise suitably configured, to open when a pressure or other suitable force above a threshold force or pressure is applied to the juicer cartridge. It does not necessarily refer to a seal that opens or ruptures violently in an uncontrolled manner. Further, opening of a burstable seal does not refer to bursting open an integral sheet or layer of material that forms another portion of the juicer cartridge, or a structural feature such as a bond around the perimeter of a juicer cartridge that is not intended to open during normal use. As discussed in more detail below, in some instances, opening of a burstable seal may refer to peeling apart two layers of material that are bonded together.

In view of the above, in some embodiments, a juicer cartridge includes one or more liquid impermeable compartments that at least partially surround, or otherwise contain, food matter, such as fruits, vegetables, or other types of edible products, that may be suitably ground or shredded if necessary such that it can be pressed in a juicer to extract juice. An outlet provides fluid communication between the one or more compartments and an exterior of the juicer cartridge to allow juice extracted from the food matter upon pressing of the juicer cartridge to be dispensed from the cartridge. The juicer cartridge further includes a burstable seal disposed between the one or more compartments and the outlet and/or an exterior opening of the outlet. Further, the seal is constructed and arranged to open in a controlled manner at a desired threshold pressure. For example, the seal may include a portion that is configured to initiate opening of the seal when a pressure is applied to the juicer cartridge by a juicer. Once that portion of the seal is opened, subsequent flow of juice and/or air through the opening may drive further opening of the seal until the seal is fully or otherwise suitably opened. In this manner, the seal may open smoothly and predictably such that the extracted juice flows from the outlet in a controlled stream without exiting the juicer cartridge in an uncontrolled fashion.

In one embodiment, a burstable seal having a portion configured to initiate opening may be provided by forming a seal with a first portion of the seal positioned such that it is exposed to higher stresses during pressing of the juicer cartridge compared to the other portions of the seal. In some instances, this opening initiation portion of the seal may either exhibit a similar strength to the other portions of the seal (i.e. the seal has a uniform strength along its length). In this manner, the stresses exerted on the seal by the juicer cartridge will first exceed the strength of the seal only at the first portion where opening initiation is intended to occur. Therefore opening of the seal will predictably commence in that location while the remainder of the seal remains intact. Alternatively, in other embodiments, a burstable seal may not have a uniform strength, and may instead be constructed to have a weak portion with a lower strength such that the weak portion is the first part of the seal to open when a pressure is applied to the juicer cartridge. In further embodiments, a seal including a weak portion may be configured such that the weak portion is exposed to higher stresses than the stronger portions of the seal. Such a configuration may further ensure that the weak portion of the seal is always the first portion to open during pressing.

In certain embodiments, a juicer cartridge may include a liquid impermeable compartment formed from two liquid impermeable outer layers bonded around their perimeters, and a burstable seal may be formed by bonding the two layers together. For example, the two layers may be bonded together with a suitable adhesive, or by a suitable bonding method such as thermal bonding, ultrasonic welding, and so on. Further, the strength of the seal, and/or the specific manner in which the seal opens during pressing, may be controlled by varying the parameters of the seal, including, but not limited to, the shape of the seal, the position of the seal relative to the juicer cartridge outlet, the type and/or formulation of adhesive, and processing parameters used to form the seal. For example, in one embodiment, a burstable seal includes first and second portions that extend inwardly from opposing sides of the juicer cartridge outlet, and/or internal edges of the liquid impermeable compartment associated with the outlet, towards a central portion of the liquid impermeable compartment. In some instances, the first and second portions of the seal may extend toward a central axis extending through the outlet, as described in more detail below. Further, in some embodiments, at least a portion of the burstable seal is spaced inwardly within the liquid impermeable compartment relative to the outlet.

In some embodiments, the pressure formed within a juicer cartridge during pressing may be transmitted to a burstable seal as a peeling force. For example, an increased pressure within a juicer cartridge during pressing may apply a force at a seal that tends to separate, or peel apart the bonded layers that form the seal. Therefore, the strength of a burstable seal may be defined by its peel strength, which is the force required to peel apart the two layers that are bonded together and open the seal.

Depending on the particular embodiment, a juicer cartridge may include a burstable seal having any suitable geometry. In one specific embodiment, a burstable seal may be shaped as a chevron with two linear portions extending away from the edges of the juicer cartridge near the outlet and meeting at a point in a generally central portion of the juicer cartridge. The inventors have recognized and appreciated that forming a seal with such a geometry may promote consistent opening of the seal during pressing with an initial opening forming at the point to the chevron. For example, stresses during pressing may be higher near the point of the chevron such that the forces applied to the seal by the surrounding material of the juicer cartridge first exceed the strength of the seal at the point of the chevron. Accordingly, the seal may begin opening (e.g., by peeling open) at the point of the chevron. As pressing continues, the flow of juice and/or air through the initial opening may drive further opening of the seal opening outwards from the point of the chevron until the seal is fully opened.

Although chevron shapes having linear portions are described above and below, it should be understood that arced or curved portions, or combinations of linear and curved portions may also be suitable, as the current disclosure is not limited. For example, a chevron or zigzag shape may be formed from connected curved portions that have any suitable curvature and meet at a point where opening of the seal is initiated. Additionally other seal geometries such as arcs, squares, rectangles, pentagons, or any other desirable shape for a seal may be used as the disclosure is not so limited, Further, it should be understood that the portions of a chevron or other design may meet at a sharp point, or alternatively the portions may meet at a point having any suitable radius of curvature, provided that that location imparts a suitable stress to initiate opening of the seal.

Without wishing to be bound by any particular theory, increased stresses near the point of a chevron extending inwards towards a central portion of a juicer cartridge may, in some embodiments, result from the material (e.g., the liquid impermeable layers) in the central portion of the juicer cartridge being able to deform to a greater extent than the material located in regions near the edges or the outlet of the cartridge. Specifically, a bond around the perimeter of a juicer cartridge (defining the outer edge of the cartridge) may limit the ability of the material near the bond to deform. Similarly, deformation of the material near the cartridge outlet may be limited by the smaller dimensions of the outlet compared to the main body of the cartridge. Therefore, the stresses during pressing may be constrained in these regions by the construction of the juicer cartridge. In contrast, the material in the central portions of the cartridge is relatively unconstrained and may undergo larger deformation during pressing. Accordingly, the stresses near the central portion of the juicer cartridge, where the point of the chevron, or other seal geometry, is located, are higher relative to portions closer to the edges or outlet of the cartridge. Alternatively, or in addition to the above, the point of a chevron, or other suitable geometry, may act as a stress raiser, and therefore the local stresses near the point may be higher relative to regions of the seal located away from the point. Consequently, these effects may cause the seal to begin opening, such as by peeling open as noted above, at the point of the chevron or at any other suitably shaped or configured portion of the seal geometry.

In some embodiments a seal may be formed from multiple connected chevron portions arranged to form a zigzag pattern. During pressing, the points of each individual chevron may provide multiple independent initial opening portions. In this manner, each chevron may define a smaller sub-portion of the seal that only opens a relatively small distance, and therefore a complete opening of the seal occurs when the openings from adjacent chevrons join together as pressing continues.

In other embodiments, a juicer cartridge may include multiple burstable seals that are arranged to open sequentially with sequentially reduced bursting pressure thresholds. For example, in one embodiment, a juicer cartridge may include two separate chevron-shaped, or other appropriately shaped, seals including a stronger primary seal positioned further from the cartridge outlet than a weaker secondary seal positioned downstream from the primary seal. Without wishing to be bound by theory, such a configuration may reduce the pressure associated with a stream of juice exiting the juicer cartridge through the outlet during initial opening of the juicer cartridge to be reduced in discrete stages during opening of the juicer cartridge which, may therefore further help to reduce splashing, foaming, or other undesirable effects associated with conventional burstable seal designs in which the pressure release is more violent and/or unpredictable. Specifically, when the primary seal opens, the pressure within the cartridge may be reduced by some amount due to the relatively incompressible nature of liquids, and since the secondary seal is weaker than the primary seal, the secondary seal may open without requiring additional pressure and/or compression be applied to the juicer cartridge. Consequently, juice may be dispensed from the cartridge at a lower initial pressure compared to what may be possible with a single seal, which may provide better control of the opening of the seal and dispensing of the juice.

Suitable materials to form a burstable seal in a juicer cartridge include, but are not limited to, thermally activated adhesives. Such adhesives form an adhesive bond only in areas that are appropriately treated with heat and pressure after the adhesive is applied. In this manner, thermally activated adhesives may allow for simple control of the seal geometry during manufacturing of juicer cartridges. For example, a heated stamp, which may be shaped in accordance with a desired geometry of the burstable seal, may press together layers of liquid impermeable material that have been coated with a thermally activated adhesive to form the seal. Further, a thermally activated adhesive may be beneficial as it may allow for careful control of the bond strength via control of the temperature of the stamp, or press, used to activate the adhesive. Accordingly, in some embodiments the bonding temperature used to bond a thermally activated adhesive to form a burstable seal may be carefully controlled to provide a consistent seal strength.

In some embodiments, the specific geometry and/or strength of a burstable seal may be chosen based on the size of the juicer cartridge and/or the amount of food matter contained therein. For example, for a large juicer cartridge that may be appropriate for retail or commercial applications, the seal geometry and strength may be chosen to provide a more robust seal compared to a smaller juicer cartridge intended for home juicing applications. In other embodiments, the parameters of the burstable seal may be tuned to the specific type of food matter contained within the juicer cartridge, or any other factors relating to the extraction and/or dispensing of juice, as the disclosure is not limited in this regard.

It should be understood that the strength or other characteristics of a burstable seal as described herein may be configured such that the seal does not open until a juicer cartridge is pressed by a juicer. For example, the seal may be configured such that the strength is sufficient to withstand pressures and other forces that may be applied to the juicer cartridge during filling of the juicer cartridge with food matter, and packaging, shipping, handling and storage of the juicer cartridge prior to use. Pressures that might be applied to a juicer cartridge during manufacture, shipping, handling, and storage might range from about 1 to 30 psi. In addition to wanting sufficient strength to avoid unintended opening of a juicer cartridge, in some embodiments, a strength of a burstable seal may be limited such that the seal is not so strong as to allow an undesired buildup of pressure within the juicer cartridge, which may in turn lead to uncontrolled or unpredictable dispensing of juice from the juicer cartridge. In view of the above, the inventors have found that burstable seals with a peel strength between about 400 grams per inch and about 2000 grams per inch may be suitable for use in a juicing application.

Referring again to FIG. 27, a burstable seal 530 is disposed between the outlet 504 and the liquid impermeable compartment 502. As depicted, the seal includes two portions 535a and 535b that extend inwardly toward a central portion of the juicer cartridge from respective interior edges 550a and 550b of the liquid impermeable compartment associated with the outlet. In this manner, the seal 530 is generally shaped as a chevron extending away from the outlet 504 and towards an interior of the liquid impermeable compartment 502, with the point 540 of the chevron located where the two portions 535a and 535b meet. As discussed above, such a design may result in greater stresses near the point 540 compared to the other portions of the seal, which may cause opening of the seal to initiate at the point when the cartridge 500 is pressed in a juicer.

FIG. 30 shows a detailed view of the juicer cartridge 500 of FIG. 27, and highlights many of the parameters related to the design of the burstable seal 530 that can be adjusted to tune the performance of the seal, such that the seal exhibits a desired strength and opens in a controlled and predictable manner during pressing. Specifically, the seal has width D, and the portions 535a and 535b of the chevron shape extend from the edges 550a and 550b, respectively, to form an angle B. The point 540 of the seal is positioned a distance C from the tip of the juicer cartridge outlet 504, which has a width A.

Depending on the particular embodiment, the width of the seal D may be between 10 mm and 40 mm, and the angle B may be between 30 degrees and 150 degrees. The distance C may between 0 and 50 mm; accordingly, it should be understood that although the point 540 is depicted as being positioned away from the outlet 504, in some embodiments, the point may instead be positioned in the outlet area, or at the tip of the outlet, as the disclosure is not so limited. In such an embodiment, the various portions of the seal may extend inwards from opposing side edges of the outlet. The outlet may have a width A between 5 mm and 30 mm. As discussed above, the point 540 of the seal may be sharp point, or alternatively, the point may have a suitable radius of curvature. For example, the radius of curvature may be between 0.5 and 3 mm. Further, the portions 535a and 535b of the chevron may have a width between 1 mm and 5 mm.

As discussed above, in some embodiments, the strength of a burstable seal may be defined by its peel strength. In one embodiment, a seal having a width D of 15 mm has a peel strength between 500 grams/inch and 2000 grams/inch. A peel strength in this range may be large enough to reduce the chance of the seal opening unintentionally before pressing, while also being small enough to allow the seal to open before the pressure within the cartridge becomes too high during pressing.

Figure 31:
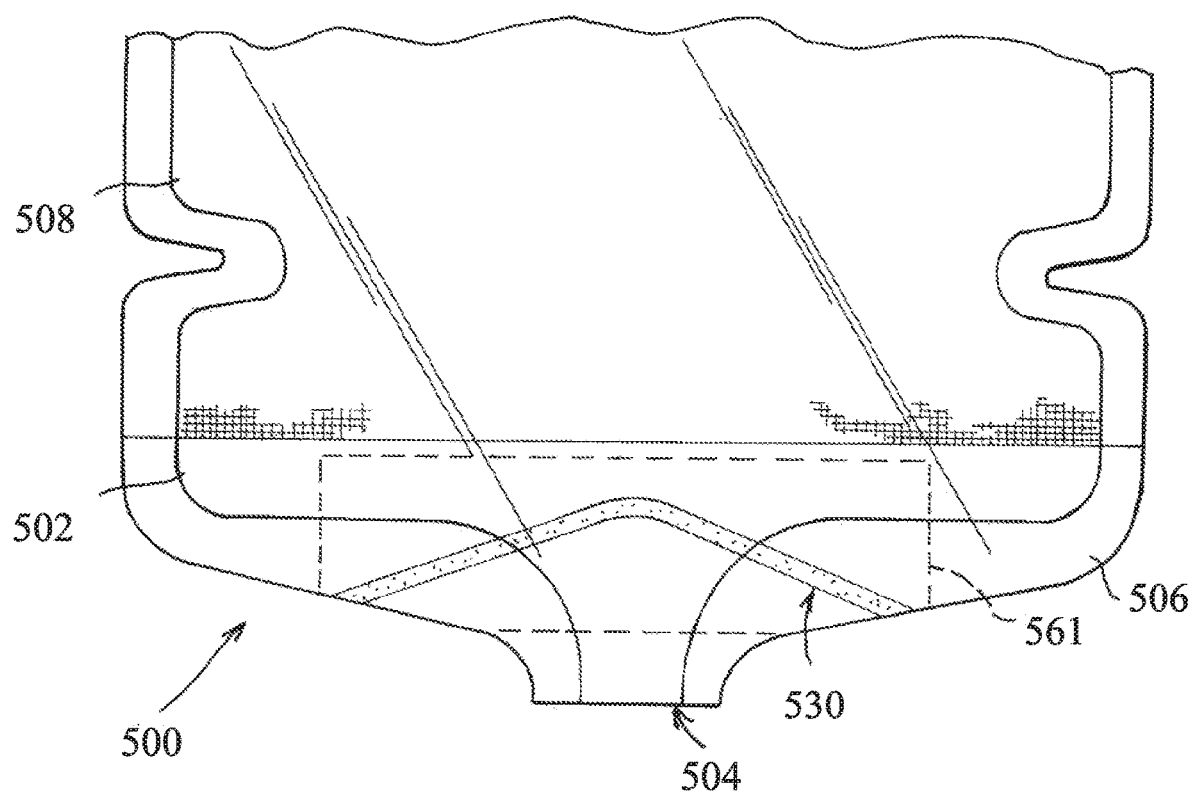
FIG. 31 is a schematic representation of a portion of the juicer cartridge of FIG. 27 that depicts a region where a burstable seal may be formed.

FIG. 31 depicts additional aspects related to one method of forming the burstable seal 530 in a juicer cartridge 500 similar to the embodiments shown in FIGS. 27 and 30. In the depicted embodiment, a thermally activated adhesive is applied to an area 561 in which the seal will be formed. In the figure, the area 561 is generally rectangular in shape, and extends partially into an area of the perimeter bond 506. However, it should be understood that the area may have any suitable shape and/or size as the disclosure is not so limited. The adhesive may be applied as a coating or a film on the liquid impermeable layers that form the liquid impermeable compartment 502. In some embodiments, the adhesive film has a thickness between 0.001 mm and 0.5 mm. The adhesive may be applied by printing, silk screening, film casting methods, or with any other suitable technique, as the current disclosure is not so limited. To form the seal 530, the adhesive is activated by applying heat and pressure within the area 561. For example, a heated stamp shaped in accordance with a desired seal geometry may be used to press the layers of the cartridge together to activate the adhesive and form the seal. Depending on the particular embodiment, the temperature and pressure applied to activate the adhesive may be between 250° F. and 400° F., and between 30 psi and 250 psi, respectively, and the thermal treatment may be applied for between 0.1 seconds and 4 seconds. However, it should be understood that seals formed with different formation parameters are also contemplated.

In some embodiments, the thermal treatment to activate a thermally activated adhesive is uniform across the entirety of the area in which the seal is to be formed. In this manner, the adhesive is activated to the same extent such that the seal has a uniform strength. In other embodiments, the thermal treatment may not be uniform, and instead may be varied in different portions of seal. For example, in embodiments in which a portion of the seal is weaker (i.e., has a lower peel strength) than the remainder of the seal, the temperature and/or pressure applied when forming the weaker portion of the seal may be lower compared to what is applied to the other portions of the seal such that the adhesive is not fully activated in the weaker portion resulting in a weaker bond in that location.

Figure 32:
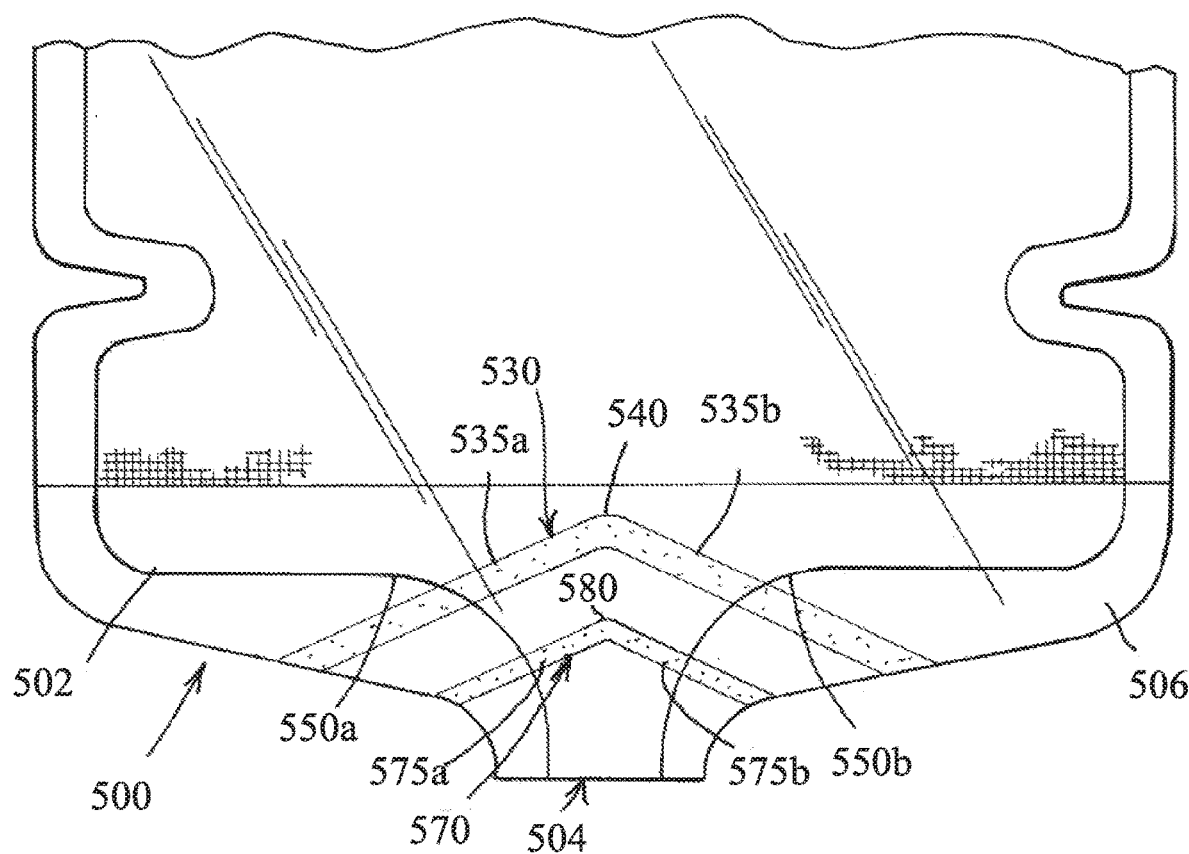
FIG. 32 is a front view of a portion of one embodiment of a juicer cartridge including two burstable seals.

FIG. 32 depicts an embodiment of a juicer cartridge 500 that includes two burstable seals 530 and 570 disposed between the liquid impermeable compartment 502 and the outlet 504. Similar to the embodiments described above, the liquid impermeable compartment 502 is formed from two liquid impermeable layers bonded around their perimeters with a perimeter seal 506. The first burstable seal 530 includes first and second portions 535a and 535b that extend inwardly from respective edges 550a and 550b of the juicer cartridge and meet at a point 540. Similarly, the second burstable seal includes first and second portions 575a and 575b that extend inwardly from the edges 550a and 550b such that the second seal is 570 is disposed between the first seal 530 and the outlet 504. In such a configuration, the second seal may be considered to be downstream from the first seal and upstream from the outlet. Each of the first burstable seal 530 and second burstable seal 570 have a point 540 and 580, respectively. Similar to the embodiments discussed above, the seals 530 and 570 independently initiate opening at these points. In some embodiments, the first seal may be stronger than the second seal (i.e., the first seal may have a higher peel strength). As discussed above, this two-seal configuration may allow the pressure within the cartridge to be stepped down in discrete stages during pressing, which in turn may further aid in dispensing a smooth stream of juice from the juicer.

Figure 33:
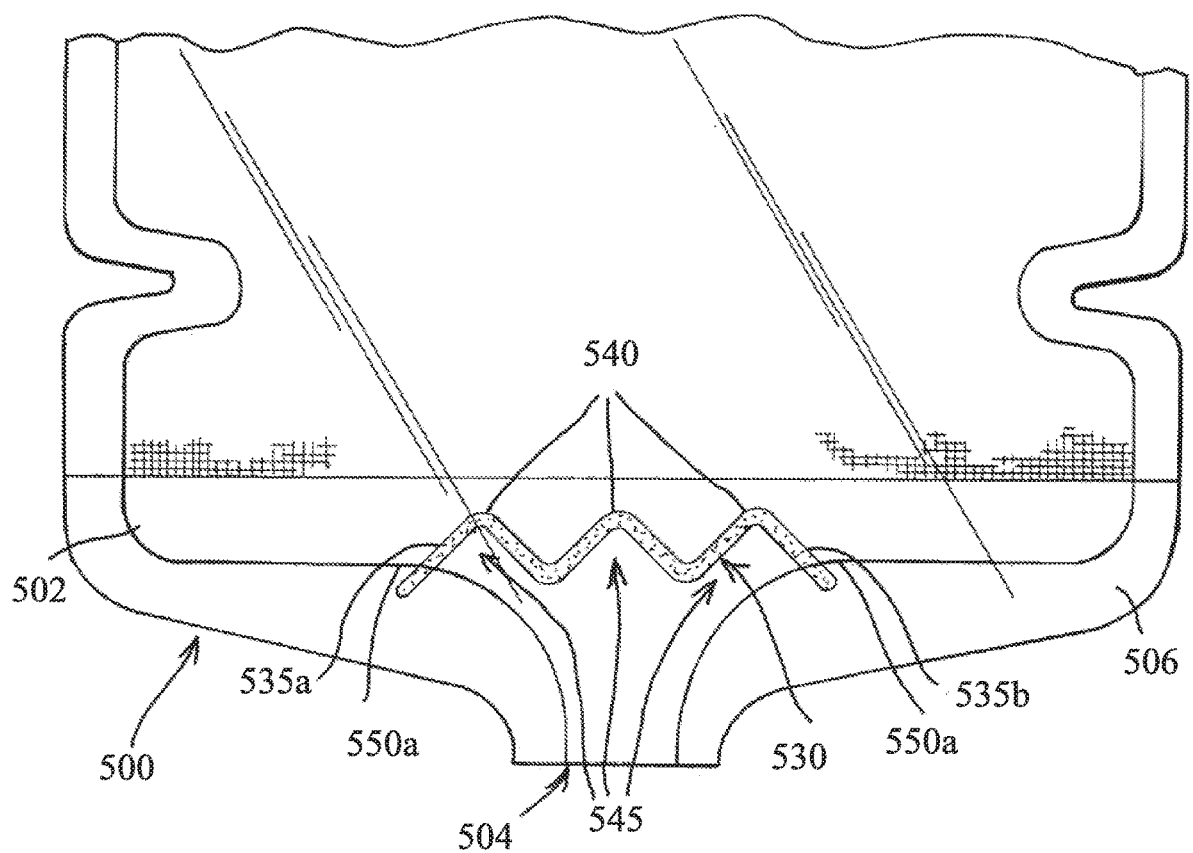
FIG. 33 is a front view of a portion of another embodiment of a juicer cartridge.

In another embodiment, as shown in FIG. 33, a juicer cartridge 500 includes a liquid impermeable compartment 502 formed from two liquid impermeable layers bonded around their perimeters with a perimeter bond 506, and an outlet 504. A burstable seal 530 has a zigzag shape formed from three connected chevron portions 545, each having a point 540 that extends inwards towards an interior of the liquid impermeable compartment relative to the outlet. The zigzag shape has end portions 535a and 535b that extend inwardly from edges 550a and 550b of the juicer cartridge which are associated with a lower interior edge of the juicer cartridge from which the outlet extends similar to the other embodiments described herein. Although a three-chevron configuration is depicted, it should be understood that zigzag shapes having only two chevron portions, or more than three chevron portions also may be suitable, as the disclosure is not so limited. As described above, each of the chevron portions 545 may act independently during pressing such that the seal forms initial openings at each of the points 540, and the initial openings coalesce into a single larger opening as pressing continues.

Figure 34:
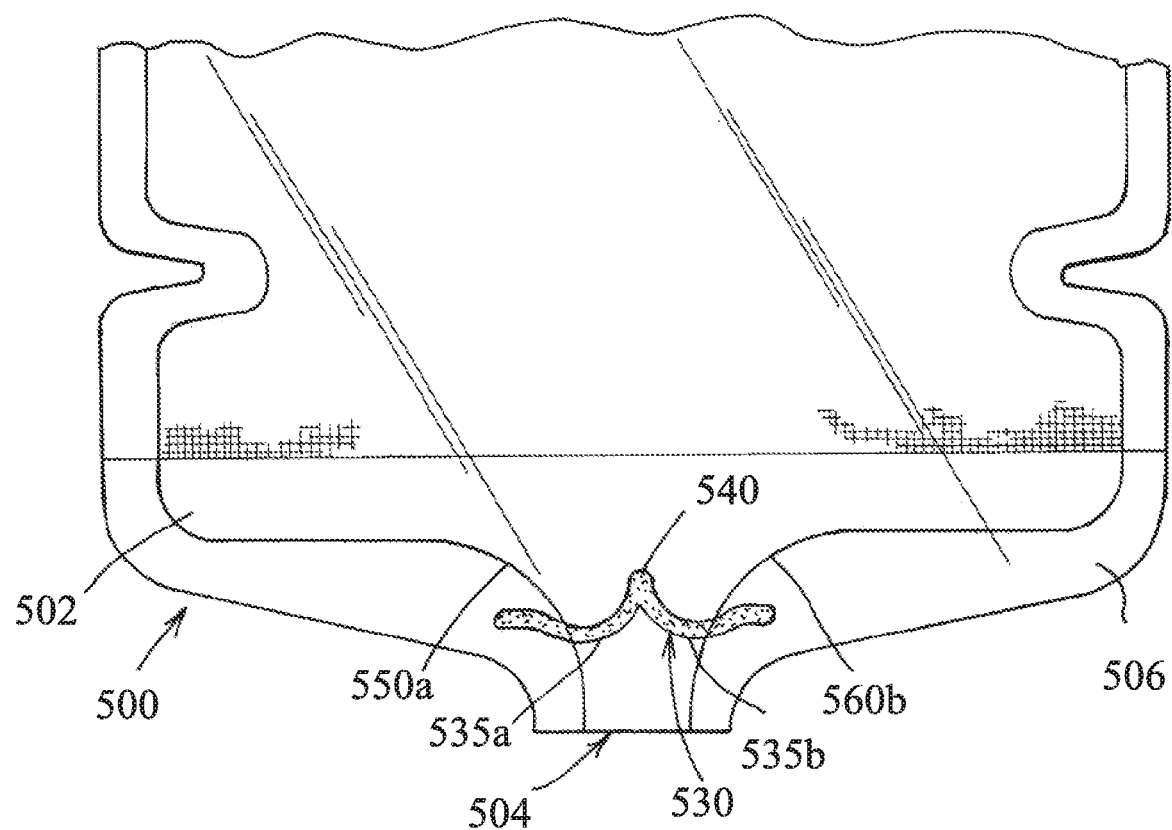
FIG. 34 is a front view of a portion of yet another embodiment of a juicer cartridge.

FIG. 34 depicts yet another embodiment of a juicer cartridge 500. Similar to the embodiments described above, the juicer cartridge include a liquid impermeable compartment 502 formed from two liquid impermeable layers bonded around their perimeters with a perimeter bond 506, and an outlet 504. In this embodiment, a burstable seal 530 is formed from two connected curved portions 535a and 535b that extend inwardly from opposing edges 550a and 550b of the outlet of the juicer cartridge and meet at a point 540. The curved portions may have any suitable radius of curvature and may have zero, one, or more inflection points. Further, the point 540 may be sharp, or may have any suitable radius of curvature.

Figure 35:
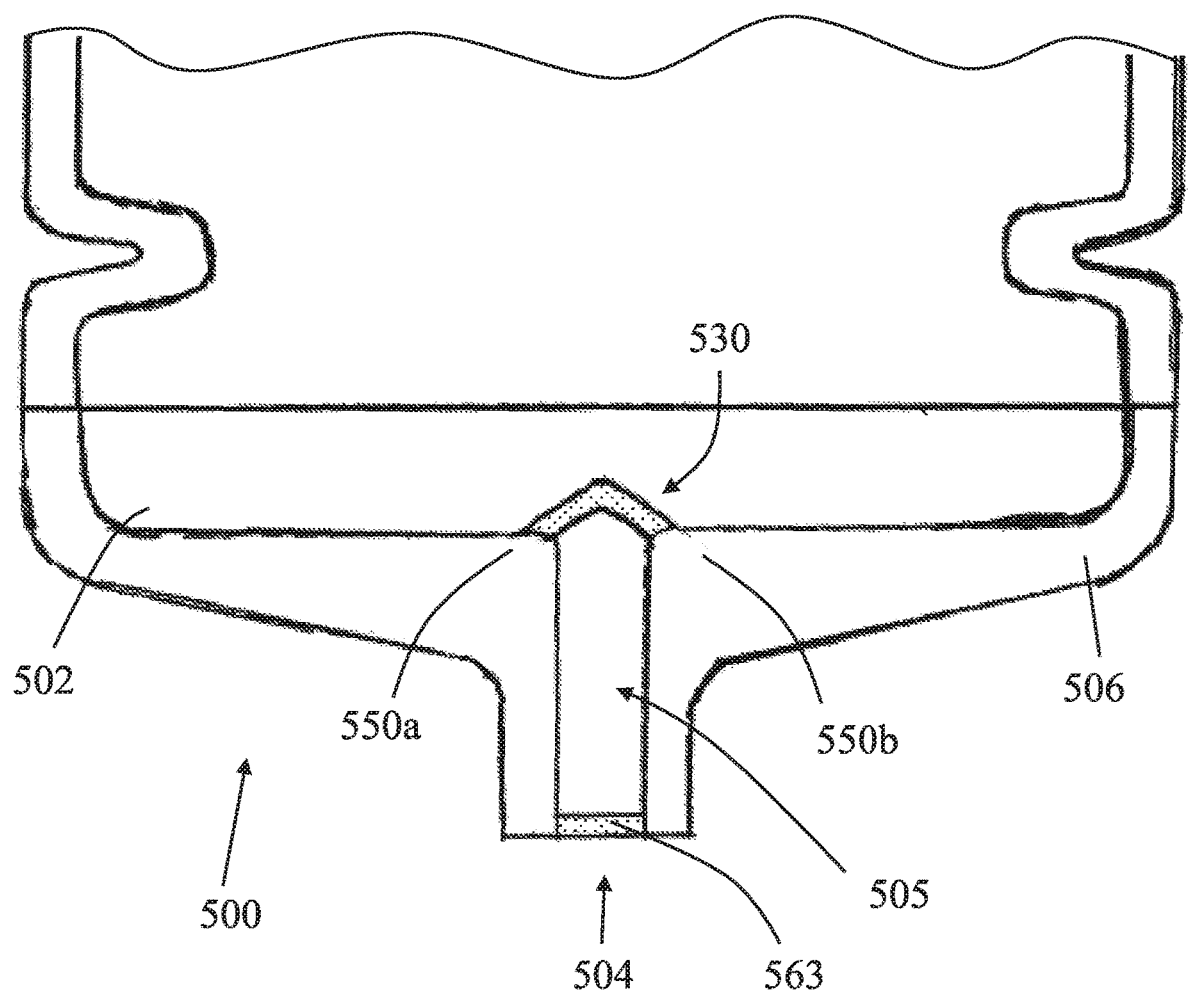
FIG. 35 is a front view of a portion of a further embodiment of a juicer cartridge.

FIG. 35 depicts yet another embodiment of a juicer cartridge 500 in accordance with some aspects of the current disclosure. Similar to the embodiments described above, the juicer cartridge includes a liquid impermeable compartment 502 from two liquid impermeable layers bonded around their perimeter with a perimeter bond 506, an outlet 504, and a burstable seal 530. In this embodiment, however, the edges of the juicer cartridge 550a and 550b from which the burstable seal 530 extends include smaller radius corners compared to the embodiments described above. For example the corners may have a radius between about 1 mm and about 15 mm. Further, the juicer cartridge 500 includes an elongated spout area 505 between the liquid impermeable compartment 502 and the outlet 504, and the spout is generally narrower than the outlets of the juicer cartridges described above. In the depicted embodiment, the edges of the outlet area are substantially parallel, though other configurations also may be suitable. Without wishing to be bound by any particular theory, a juicer cartridge with narrow radius corners and a narrow outlet area or spout may result in more complete opening of the burstable seal 530 during pressing compared to a cartridge with a wider opening and/or larger radius corners. However, it should be understood that the current disclosure is not limited to any particular configuration and/or dimensions of the outlet area of a juicer cartridge.

Figure 36:
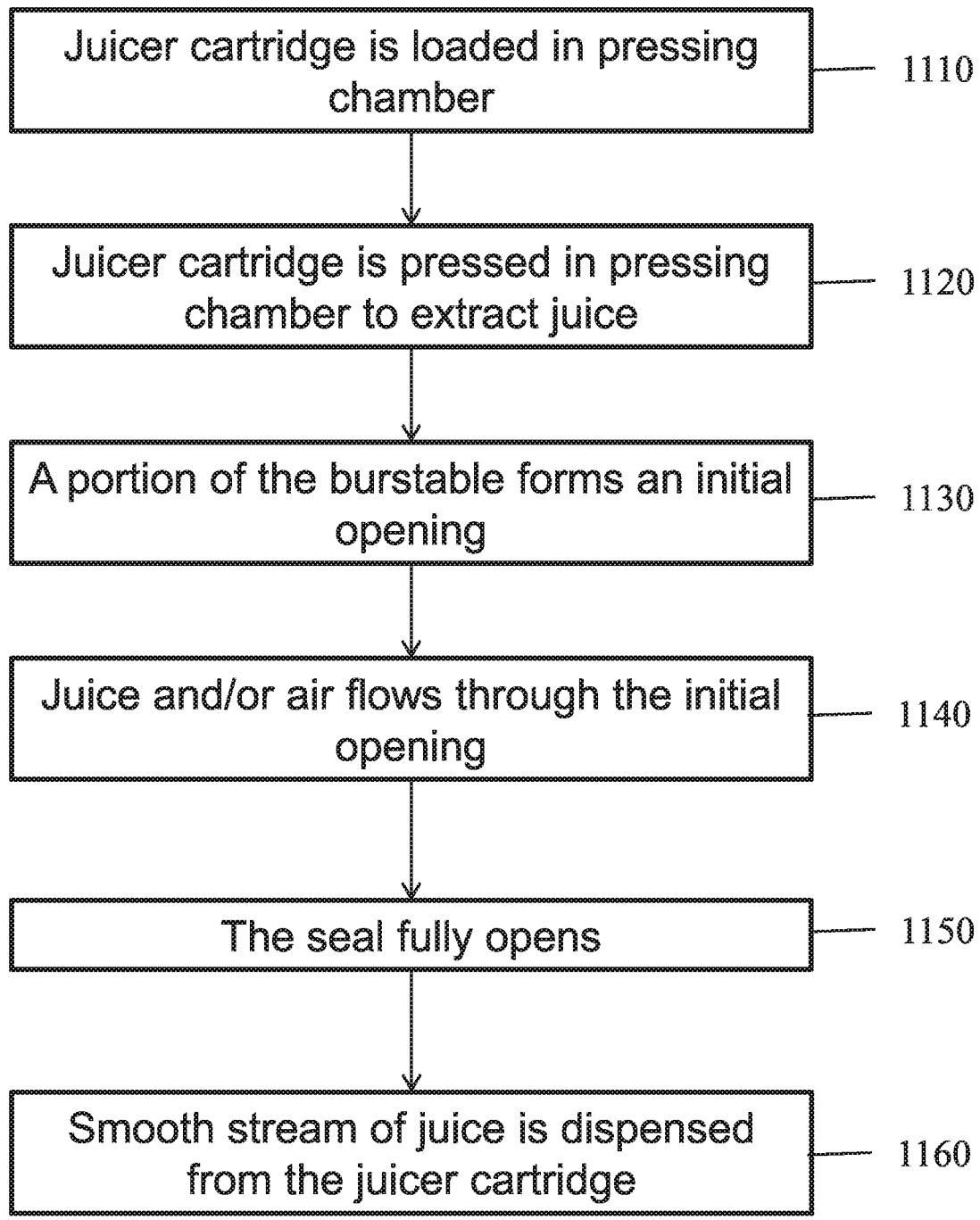
FIG. 36 is a flow chart depicting one embodiment of a method for dispensing juice from a juicer cartridge having a burstable seal.

Having described various features of juicer cartridges having burstable seals, their method of use is described in more detail with reference to FIG. 36. At block 1110, a juicer cartridge containing food matter in a liquid impermeable compartment is loaded into a pressing chamber of a juicer. At block 1120, the juicer cartridge is pressed by the juicer to extract juice from the food matter, and the pressing causes the pressure within the cartridge to increase. An initial opening forms in at least one portion of the burstable seal at block 1130 when the forces applied to the seal, which result from the increased pressure within the cartridge, exceed a threshold force or pressure defined by the strength of the seal in that portion. As discussed above, the portion that opens initially may be positioned in a region of the juicer cartridge that is exposed to higher forces during pressing, or the portion may be configured to have a lower strength than the other portions of the seal. At block 1140, juice and/or air flows through the initial opening of the seal, which causes further opening of the seal, until the seal is fully opened at block 1150. As a result of the controlled opening of the burstable seal, a smooth stream of juice is dispensed from the juicer cartridge at block 1160 without splashing, splattering, foaming, or otherwise exiting the juicer cartridge in an uncontrolled fashion as the pressing operation is completed.

Although burstable seals formed with thermally activated adhesives are described above, other methods of forming burstable seals are also contemplated. For example, burstable seals may be formed from other adhesives which are not thermally activated, such as pressure sensitive adhesives. Alternatively, a burstable seal may be formed by joining two layers of liquid impermeable material with a weld, such as an ultrasonic weld. Accordingly, it should be understood that the present disclosure is not limited to any particular method for forming a burstable seal.

The inventors have recognized and appreciated that the geometry of a juicer cartridge may influence one or more aspects of juice extraction and dispensing. For example, in some embodiments the geometry of a juicer cartridge may be adjusted to control one or more characteristics of the flow of extracted juice out of a juicer cartridge during pressing. In other embodiments, the geometry of the juicer cartridge may be adjusted to be in accordance with a geometry of one or more features on a corresponding juicer. For example, the size and/or shape of a liquid permeable compartment containing food matter may substantially match the size, shape, and/or location of a pressing surface of the juicer when the juicer cartridge is appropriately positioned and oriented within a corresponding pressing chamber of the juicer, which in some instances may enhance extraction of juice from the food matter during a pressing operation. In further embodiments, a bonded region of a juicer cartridge may be more mechanically robust than other portions of the juicer cartridge, and thus may provide a region from which the juicer cartridge may be supported in a juicer. Accordingly, it should be understood that the geometry of a juicer cartridge may be adjusted in any suitable manner to control any suitable aspect of the operation of a juicing system. Specific embodiments incorporating these features are described further below.

As noted above, a juicer cartridge may be configured to control one or more characteristics of the flow of extracted juice out of an outlet of the juicer cartridge. For example, it may be beneficial to provide consistent and/or predictable flow out of the outlet in order to reduce the chance of spraying, splashing, and/or splattering during juicing, which in turn may help to ensure that the extracted juice is directed into a beverage container without creating a mess. In one embodiment, a juicer cartridge may be configured such that the one or more liquid permeable compartments contained within the one or more liquid impermeable compartments are spaced from an interior edge of the liquid impermeable compartment associated with the outlet of the juicer cartridge. Such a configuration may provide a juice collection region in a bottom portion of the juicer cartridge in which juice extracted from the food matter contained in the one or more liquid permeable compartments may collect before exiting the juicer cartridge through the outlet.

Depending on the particular embodiment, a juicer cartridge including a juice collection region may be constructed in any suitable manner. For example in some instances a liquid permeable compartment may be supported within a liquid impermeable compartment in order to maintain a spacing between the liquid permeable compartment and an outlet of the juicer cartridge. In some embodiments a juicer cartridge may include an attachment area in the liquid impermeable compartment that may support the liquid permeable compartment and maintain the spacing from the outlet that defined the juice collection region. In some embodiments, the juice collection region may have a volume that is between or equal to 1% and 12%, 3% and 10%, 5% and 8%, or any other appropriate percentage of a volume of the liquid impermeable compartment. Further, it should be understood that the juice collection region may be capable of supporting pressures sufficient to extract juice from food matter contained in the liquid.

Figure 37:
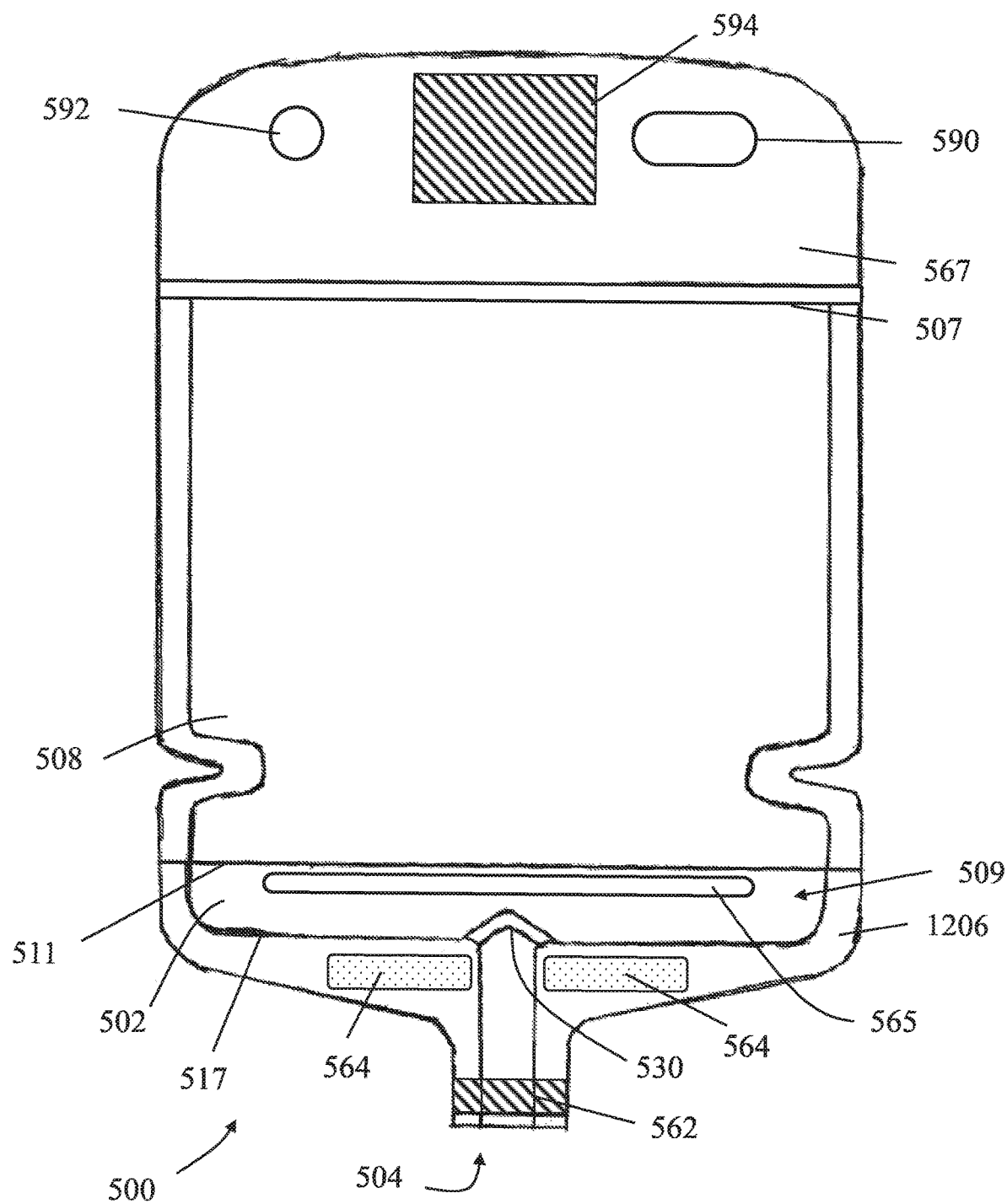
FIG. 37 is a schematic representation of one embodiment of a juicer cartridge.

FIG. 37 depicts one embodiment of a juicer cartridge 500. Similar to the embodiments of juicer cartridges described above, the juicer cartridge includes a liquid impermeable compartment 502, an outlet 504, a liquid permeable compartment 508 disposed within the liquid impermeable compartment, and perimeter seal 506 around a portion of the juicer cartridge. In the depicted embodiment, the juicer cartridge includes a juice collection region 509 between the liquid permeable compartment 508 and the interior edge of the liquid impermeable compartment associated with the outlet 504. The juice collection region is defined by a bottom edge 511 of the liquid permeable compartment 508 oriented towards the outlet, which may be defined by a fold in a layer of liquid permeable material, and a portion of the perimeter seal 506 along a bottom edge 517 of the liquid impermeable compartment. Further, the liquid permeable layers that form the liquid permeable compartment may be bonded together with the liquid impermeable layers of the liquid impermeable compartment to maintain the bottom edge 1209 of the liquid permeable compartment spaced from the outlet 1204.

Referring again to FIG. 28, the juicer cartridge 500 includes a liquid collection region 509. However, in this embodiment, the liquid permeable layers of the liquid permeable compartment 508 are not bonded together with the liquid impermeable layers of the liquid impermeable compartment 502. Instead, the spacing between the liquid permeable compartment and the outlet 504 as well as the corresponding interior edge of the liquid impermeable compartment, is maintained by attachments such as the one or more weld regions which may be configured as dots 513. The one or more weld dots may connect two opposing surfaces of the liquid impermeable compartment 502 such that the liquid impermeable compartment is pinched off at the one or more weld dots. In this manner, the liquid permeable compartment floats freely within the liquid impermeable compartment but is restrained from moving towards the outlet by the attachments. Depending on the particular embodiment, the weld regions 513 may have any suitable size and/or shape such that they substantially limit translation of the liquid permeable compartment 508 towards the outlet and associated interior edge of the liquid impermeable compartment.

FIG. 29 depicts yet another embodiment of a juicer cartridge 500 having a juice collection region 509. Similar to the embodiment depicted in FIG. 37, a portion on the periphery of the liquid permeable compartment 508 is bonded or welded with a portion on the periphery of the liquid impermeable compartment 502 such that the liquid permeable compartment is suspended within the liquid impermeable compartment and spaced from the outlet 504 and associated interior edge of the liquid impermeable compartment, thereby forming the juice collection region 509. While the bonded portion of the liquid permeable compartment 508 is depicted on the sides adjacent to the side from which the outlet of the juicer cartridge extends, it should be understood that such a bonded portion may be formed on any suitable side of the juicer cartridge. For example, in some embodiments, the liquid permeable compartment may be bonded with the liquid impermeable compartment along the top side of the liquid impermeable compartment opposite the outlet, along only a portion of the sides and/or top of the liquid impermeable compartment, or any suitable combination of locations on a juicer cartridge.

In another embodiment, a juicer cartridge may be configured such that a bottom interior edge of the one or more liquid impermeable compartments is substantially perpendicular to a central axis of an outlet from the juicer cartridge (i.e. the bottom interior edge of the liquid impermeable compartment may be flat). For example, FIG. 29 depicts a juicer cartridge 500 in which a bottom interior edge 517 of the liquid impermeable compartment 502 is perpendicular to a central axis M extending through the outlet 504, and which in some embodiments also is a central axis of the juicer cartridge passing through the liquid impermeable compartment. In particular, a line N, which is parallel to the bottom interior edge 517, is oriented at an angle O with respect to axis M. The angle O is about 90 degrees in the depicted embodiment. Without wishing to be bound by any particular theory, such a configuration may provide improved flow characteristics compared to a configuration in which the bottom interior edge of the liquid impermeable compartment is angled to form a funnel-like geometry. However it should be understood that in some embodiments, the bottom wall may not be parallel to the transverse axis of the juicer cartridge, as the disclosure is not so limited. For example, the bottom interior edge of the one or more liquid impermeable compartments may be oriented at an angle relative to the central axis of the outlet between or equal to about 70 to 110 degrees, 70 to 90 degrees, 80 to 90 degrees, or any other appropriate angle. It should be understood that any other suitable angle, including angles both larger and smaller than those noted above may also be used.

In some embodiments, a juicer cartridge may be constructed and arranged such that a liquid permeable compartment containing food matter is maintained within a pressing area of a displaceable pressing surface of a juicer. For example, the various welds, bonds, folds, etc. that define the size, shape, and/or location of the liquid permeable compartment within the juicer cartridge may be configured such that the liquid permeable compartment is maintained in the pressing area when the juicer cartridge is loaded in a pressing chamber of the juicer as well as during a pressing operation. One such embodiment is shown in FIG. 37 where an area of the liquid permeable compartment 508 containing the food matter is defined by portions of the perimeter seal 506 along opposing sides of the juicer cartridge, the fold 511 along the bottom of the liquid impermeable compartment, and a seal 507 at the top of the liquid permeable compartment. Due to the liquid permeable compartment limiting the location of food matter within the juicer cartridge, it is possible to align the food matter location with the pressing surfaces of a juicer (e.g., surface 20 shown in FIG. 8) when the juicer cartridge is appropriately oriented and positioned within a pressing chamber. Further, this positioning of the juicer cartridge, and associated food matter, may be maintained during a pressing operation due to the interactions of the cartridge supports and couplings detailed previously. Consequently, the liquid permeable compartments and the associated food matter are maintained in alignment with the associated pressing surfaces during a pressing operation which may aid in fully extracting juice from the food matter.

Depending on the embodiment, an area of a liquid permeable compartment may be substantially the same as a pressing area of a displaceable pressing surface. Alternatively, the pressing area may be larger than the area of the liquid permeable compartment; for example the pressing area may be 5% larger, 10% larger, or 15% or more larger than the area of the liquid permeable compartment. Accordingly, it should be understood that the current disclosure is not limited to any particular relationship between the size and/or shape of the liquid impermeable compartment and the size/and or shape of the one or more pressing surfaces of a juicer.

In addition to defining one or more liquid impermeable or liquid permeable compartments, a bonded or welded region also may be included in some embodiments to provide a suitable structural support for various features of the juicer cartridge. Without wishing to be bound by any particular theory, in some instances bonding together one or more layers of material (e.g., liquid impermeable layers) may increase the strength and/or stiffness of the layers to provide a more robust region in a juicer cartridge, which may be beneficial for handling the juicer cartridge or supporting the juicer cartridge in a juicer. For example, as discussed in more detail below, one or more cartridge couplings that interact with the corresponding cartridge supports of a juice may be formed in the stiffer bonded region.

In some instances, a bonded region in a juicer cartridge also may allow for easier manufacturing of some features of the juicer cartridge. For example, the juicer cartridge 500 depicted in FIG. 37 includes a bonded region 567 on a side of the juicer cartridge opposite the outlet 1204. As discussed below, two cartridge coupling features 590 and 592 are formed as cutouts in the bonded region. In this embodiment, the increased stiffness of the bonded region 567 compared to the non-bonded portions of the juicer cartridge may allow for easier cutting or punching of the liquid impermeable material when forming the cartridge couplings 590 and 592.

While specific embodiments and features have been described above with regards to a juicer cartridge, it should be understood that the current disclosure is not limited to any particular configuration of bonded or welded regions that define one or more features of the juicer cartridge.

As discussed above, in some embodiments, a juicer cartridge may include one or more couplings that couple with cartridge supports on an associated juicer to support the juicer cartridge within a pressing chamber of the juicer. Depending on the embodiment, the one or more couplings may allow the juicer cartridge to be suspended within the pressing chamber such that an outlet of the juicer cartridge is oriented downwardly towards an outlet from the pressing chamber. In this manner, a juicer cartridge may be maintained in a substantially upright or vertical orientation in a juicer. For example, a coupling on the juicer cartridge may be associated with a liquid impermeable compartment, and as noted above, may be disposed in a bonded region of the juicer cartridge that has a higher strength and/or stiffness than other portions of the juicer cartridge to provide a more robust coupling between the juicer cartridge and the associated cartridge supports of the juicer. Depending on the particular embodiment, the couplings may include one or more cutouts in the juicer cartridge that can receive protrusions on the juicer, or alternatively, the couplings may comprise a hook, a clasp, a magnetic material, a hook-and-loop material, a frictional engagement region as discussed above, or any other suitable structure capable of supporting the juicer cartridge in the pressing chamber when coupled to the cartridge supports, as the current disclosure is not limited to any particular coupling structure.

In certain embodiments, the couplings on a juicer cartridge may further include a cartridge orientation feature that interacts with an associated orientation feature of a juicer. For example, as discussed above the orientation features may include an asymmetric configuration of cartridge supports and couplings such that the couplings of the juicer cartridge may couple with the cartridge supports only in one, correct orientation for the juicer cartridge. In some embodiments, the asymmetric configuration may be due to multiple cartridge couplings and corresponding supports with different sizes and/or shapes, or it may be due to the use of multiple couplings and corresponding supports having the same size and/or shape but with an asymmetric distribution or positioning. Accordingly, it should be understood that the current disclosure is not limited to any particular configuration for orientation features to define a correct orientation of a juicer cartridge.

In one exemplary embodiment, as shown in FIG. 37, the cartridge couplings of a juicer cartridge include cutouts 590 and 592 located in an upper portion of the juicer cartridge 500. Further, the cutouts have different shapes to define a correct orientation for the juicer cartridge. The couplings may couple to corresponding cartridge supports, such as first and second cartridge supports 64 and 66, respectively, depicted in FIG. 8. In these embodiments, the first coupling 590 which has a generally oval shape, may engage and couple to the first support 64 having a similar oval shape. Similarly, the second coupling 592, which has a generally circular shape, may engage and couple to the second support 66 which also has a circular shape. Importantly, the second coupling 592 may be sized and/or shaped such that it is not capable of engaging and coupling to the first support 64. In this manner, the juicer cartridge 500 may only be properly supported in the pressing chamber 18 of the juicer in a single correct orientation.

As discussed above, in some instances, a correct orientation for a juicer cartridge within a pressing chamber of a juicer may be chosen such that an information region on the juicer cartridge, discussed in more detail below, faces towards a reader on the juicer when the juicer cartridge is loaded in the pressing chamber in the correct orientation. For example, in the embodiment shown in FIG. 37, the juicer cartridge includes an information region 594 located between the cartridge couplings 590 and 592. When the juicer cartridge is correctly loaded in the pressing chamber 18 of a juicer as shown in FIG. 8, the information region faces the reader 70 of the juicer such the reader may read the information contained within the information region. The information included within the information region may correspond to any of the various types of information described previously herein and may be used by the juicer accordingly.

As another example, in the embodiment depicted in FIG. 28, a juicer cartridge 500 may include a cartridge coupling 590 and an orientation feature 593. In this embodiment, the coupling and orientation feature are formed as a single asymmetrical cutout in the juicer cartridge, such as a key shape. The coupling and orientation feature of the juicer cartridge may engage a similarly shaped cartridge support and orientation feature on a juicer, such as the support 64 and orientation feature 67 depicted in FIG. 5. In this embodiment, an information region 594 is disposed on one side of the cartridge coupling 590 and orientation feature 593. Similarly, when the juicer cartridge is loaded in the correct orientation in the pressing chamber 18 of the juicer 10, the information region 594 is aligned with the reader 70 (see FIG. 5).

Although certain shapes and/or configurations for the cartridge couplings and orientation features are depicted and described above, it should be understood that any asymmetric shape and/or distribution of features may be suitable for the cartridge orienting feature, as the disclosure is not so limited. Furthermore, as described above, in some embodiments the cartridge orienting feature may be provided separately from the cartridge couplings. For example, the cartridge orienting feature may comprise an asymmetric overall shape of the juicer cartridge which may fit in an asymmetrically shaped pressing chamber. Alternatively, a juicer cartridge may feature multiple cutouts which may be spaced or sized such that they may fit on corresponding protrusions on a juicing system in only one orientation. It should be appreciated that a cutout need not extend completely through the cartridge. Accordingly, a cutout can be formed as a through opening or merely as a recess. In view of the above, a juicer cartridge and a juicer may have any suitable combination of features to define a correct orientation for a juicer cartridge when loaded in a pressing chamber of the juicer.

As noted above, in some embodiments, a juicer cartridge may include an information region readable by an associated reader on a juicer, as described above. The information region may include printed or digital indicator technologies such as bar codes, quick response codes, RFID devices, magnetic strips, a color bar or other similar graphics, a time temperature indicator, and any other suitable readable medium. The information provided in the information region might include information such as expiration of contents, instructions for a juicer related to pressing parameters for a particular cartridge, cold chain information, ingredients, allergy information, nutrition information, consumption and calorie contents, authorization information, counterfeiting information, security information or any other pertinent information as described previously. Such information may be utilized as detailed in the above embodiments and in the above-incorporated PCT application. In some embodiments, the information region may be positioned adjacent to the reader of a juicer when the juicer cartridge is loaded into the pressing chamber in a correct orientation. In such embodiments, the orientation features of the juicer and juicer cartridge may help to ensure that the identification region is read by the reader.

One possible embodiment of a juicer cartridge including an information region and a juicer including a corresponding reader is depicted in FIG. 3. In the depicted embodiment, the information region 594 is positioned between the cartridge supports 590 and 592 and on a side of the juicer cartridge 500 that faces a reader (not depicted) when the juicer cartridge is loaded in the pressing chamber in the correct orientation. In the figure, the information region 594 is indicated by a dashed line to indicate that it is provided on the opposite side of the juicer cartridge 500. However, as noted above, it should be understood that in some embodiments a reader on a juicing system may not require line of sight to an identification region on a juicer cartridge to suitably read the information in the identification region. Therefore, in some embodiments, the identification region may not face the reader when a juicer cartridge is loaded in the correct orientation in a pressing chamber. For example, in some embodiments including devices such as an RFID tag in the identification region, the RFID tag may be read once it is in sufficiently close proximity to an associated reader, including through a juicer cartridge.

Depending on the particular embodiment, the information included in an information region of a juicer cartridge may be determined by any suitable method. As described above, in some instances an information region may include instructions for controlling one or more aspects of the pressing behavior of a juicer, which may depend, for example, on the type of food matter, the specific combination of food matter in the cartridge, the moisture content of the food matter, or other suitable qualities. For example the information region may include information related to a particular lot of produce contained in a juicer cartridge for which an optimal set of pressing parameters has been determined, and the juicer may adjust the pressing behavior of a juicer according to the pre-determined optimal pressing parameters.

In other embodiments, a juicing system including a juicer and associated juicer cartridges may use the information read from an information region of a juicer cartridge to track the usage of juicer cartridges. For example, in some instances a juicer may record when a particular juicer cartridge is pressed and may prevent subsequent pressing of that particular cartridge. In other embodiments the juicer may track the particular types of juicer cartridges (e.g., recipes) used by a particular user. After being read by the juicer, the information may be stored (e.g., on a local or remote memory) to track the preferences of the user and/or the nutritional information of the juice consumed by the user. In some instances, a juicing system may recommend other flavors or recipes in different juicer cartridges based on the preference and/or nutrition information. For example, the juicer may track the types of nutrients provided by the juices consumed by an individual and may recommend particular juices to provide a particular nutrient that an individual may be lacking based on the nutritional information recorded for that individual and recommended consumption guidelines.

In view of the above, it should be understood that a juicer cartridge may include any suitable combination of information in an information region, and a juicer may use that information in any suitable manner.

As discussed above, the inventors have recognized that it may be desirable to restrict the motion of one or more portions of a juicer cartridge within a pressing chamber with the use of one or more cartridge restraints that are pressed against, or otherwise associated with, portions of the juicer cartridge positioned within the pressing chamber. Accordingly, in some embodiments a juicer cartridge may include one or more landings that are constructed and arranged to be engaged with the cartridge restraints. For example, a landing may be made from a material with a higher coefficient of friction than other portions of the juicer cartridge to provide a robust frictional engagement between the regions and the cartridge restraints. In some instances, a landing may be textured to enhance engagement between the landing and a cartridge restraint. However, it should be understood that a liquid impermeable material forming a portion of a liquid impermeable compartment may provide a suitable frictional engagement between the landings and the restraints, and thus the landings may simply be a portion of a juicer cartridge that are aligned with the restraints when the juicer cartridge is loaded in the pressing chamber.

Referring again to FIG. 37, the juicer cartridge 500 includes two landings 564 formed on opposing sides of the outlet 504. In the depicted embodiment, the landings are generally rectangular, though it should be understood that the landings may have any suitable shape and/or size. For example, the landings may be about 5 mm wide and located within about 20 mm of the outlet 504. As described previously in regards to the juicer, in one embodiment, the landings 564 may be arranged such that they align with corresponding regions on a front portion of a pressing chamber, such as regions 74 shown in FIG. 8, which are aligned with the restraints 72 extending from a door of the juicer as shown in FIG. 6. Accordingly, the landings may be pressed, or otherwise engaged, between the restraints 72 and the regions 74 when the juicer cartridge is loaded in the pressing chamber and the door is in the closed position. In this manner, the engagement between the restraints and the landings may restrain movement of at least a portion of the juicer cartridge (e.g., an area adjacent the outlet) during a pressing operation.

Depending on the particular embodiment, the landings of a juicer cartridge and the corresponding cartridge restraints on a juicer may form an interface with a coefficient of friction greater than 0.5, greater than 0.7, greater than 0.8, greater than 0.9, greater than 1.0, or any other appropriate value. The coefficient of friction may also be less than 1.5. The above ranges of coefficients of friction may be combined. For example, a coefficient of friction may be between 0.5 and 1.5. While particular coefficients of friction have been described above, it should be understood that other values for the coefficient of friction also may be suitable as the current disclosure is not limited in this regard.

In addition to the use of one or more burstable seals to seal a liquid permeable compartment of a juicer cartridge prior to pressing, the inventors have recognized that it may be advantageous to include one or more seals downstream from the burstable seal(s) within or at the end of an outlet of the juicer cartridge for sanitary purposes. For example, such an additional seal may function as a sanitary seal to limit or prevent the ingress of contaminants into the outlet of the juicer cartridge prior to juicing. In some instances, a sanitary seal may be a burstable seal that opens automatically during pressing of a juicer cartridge, similar to the embodiments of burstable seals described above. Depending on the embodiment, the sanitary seal may have a bursting pressure that is less than that of the burstable seals described above such that the sanitary seal opens easily during pressing and does not substantially affect the flow of extracted juice from the juicer cartridge. However, it should be understood that the sanitary seal may not be weaker than other burstable seals in a juicer cartridge in some embodiments. Further, a sanitary seal may not be a pressure-burstable seal in some embodiments. For example, the sanitary seal may include a peel away seal that is manually removed prior to usage, or a seal capable of being pieced or cut either manually or by a separate mechanism, or by a mechanism incorporated into a juicer. Accordingly, it should be understood that any suitable type of seal may be used for the sanitary seal, and the sanitary seal may be formed by any suitable method, including, but not limited to thermal bonding, ultrasonic welding, and bonding with a suitable adhesive such as a thermally activated adhesive.

In one exemplary embodiment, as depicted in FIG. 28, a juicer cartridge may include two seals 560 associated with the outlet 504 of the juicer cartridge 500. In another example, the juicer cartridge 500 of FIG. 35 includes a sanitary seal 563 at the end of the outlet 504. Accordingly, it should be understood that the sanitary seal may be located at any suitable location, such as at an external edge of the outlet, or spaced from the external edge of the outlet (e.g., between about 3 mm and about 5 mm from the external edge). The sanitary seal may be formed with via thermal bonding, ultrasonic welding, or with an adhesive such as a thermally activated adhesive. Although seals with a substantially straight or rectangular geometry are depicted, it should be understood that the current disclosure is not limited to any particular shape and/or size for a sanitary seal.

According to another aspect of the current disclosure, the inventors have recognized that in some arrangements an outlet of a juicer cartridge formed using opposing layers of material may intermittently close during pressing due to capillary forces applied to the opposing layers of liquid impermeable material that form the outlet. In some instances, such intermittent closing may lead to unsteady flow of juice out of the juicer cartridge, splashing, splattering, or other undesirable effects during pressing. Accordingly the inventors have recognized that it may be beneficial to include a structure in the outlet of a juicer cartridge to calm or steady the flow of extracted juice, thereby minimizing, or substantially eliminating, the above-noted effects.

In some embodiments, a juicer cartridge may include a separator in the outlet of the juicer cartridge that is constructed and arranged to maintain a separation between the opposing sides of the layers of liquid impermeable material in the outlet. In some such embodiments, the separator may include a layer of liquid permeable material, or other suitable filter-like or permeable material, located in the outlet that may prevent the layers of liquid impermeable material from sticking together due to capillary or other forces during pressing, while also allowing liquid (e.g., extracted juice) to flow through the outlet. Accordingly, a steady and/or calm stream of juice may be maintained during pressing.

Figure 38:
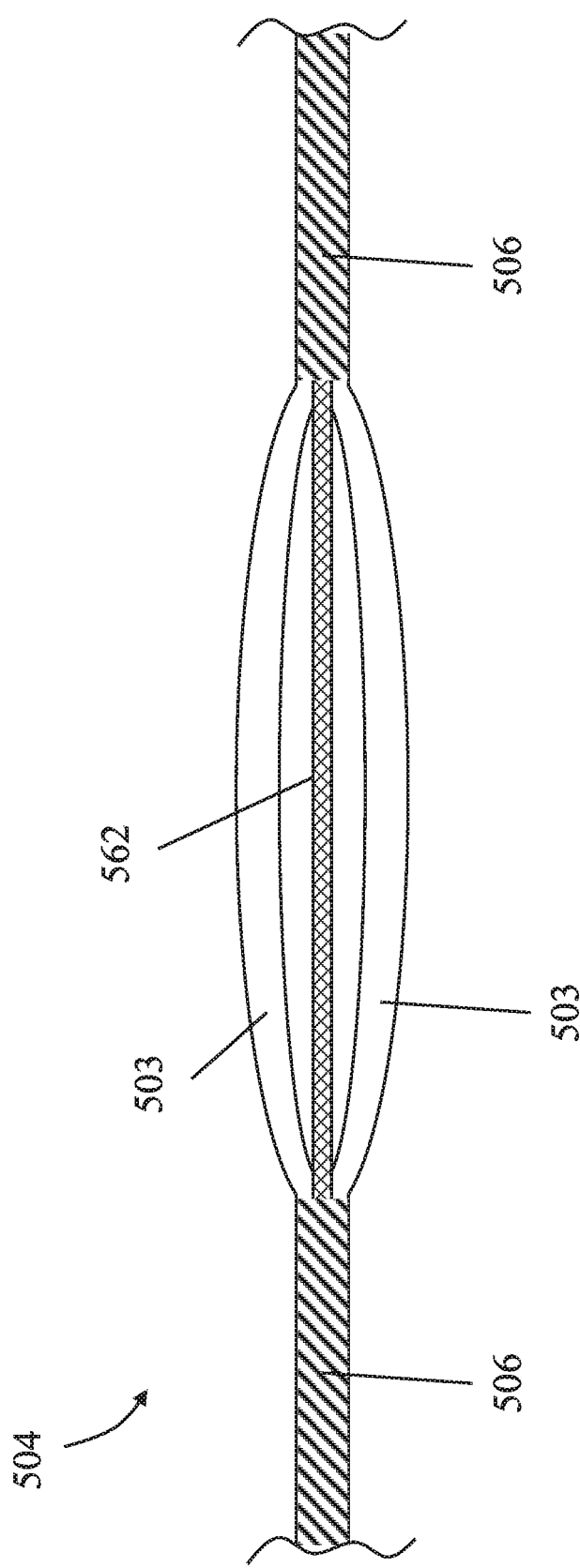
FIG. 38 is a schematic bottom view of the outlet of juicer cartridge of FIG. 37.

FIGS. 37-38 depict one embodiment of a juicer cartridge 500 including a separator 562 in the outlet 504. In particular, FIG. 37 shows a front view of the juicer cartridge, and FIG. 38 shows a bottom view of the outlet 504. As best illustrated in FIG. 38, the separator is disposed between opposing layers of material 503 that form the outlet 504. For example, the layers 503 may be a portion of one or more liquid impermeable layers that form the liquid impermeable compartment 502. As shown in the figure, the layers 503 are bonded at their edges along a portion of the perimeter seal 506, and a portion of the separator 562 is bonded together with the layers 503. In this manner, the separator is supported at its edges within the outlet 504 but otherwise free-floating within the outlet between the layers 503. Additionally, the separator may extend along an entire length of an outlet and/or associated spout, or it may only extend along a portion of the length depending on the embodiment. The separator may also be made from a liquid permeable material, and during a pressing operation, extracted juice may flow around and/or through the separator as the juice flows through the outlet.

Although a configuration in which the separator is only attached at its edges is depicted and described above, it should be understood that other configurations are also possible. For example, in one embodiment the separator may be bonded along its entire length to one layer of material within an outlet. Accordingly, it should be understood that any suitable configuration may be used for a separator that maintains a separation between layers in an outlet of a juicer cartridge. Moreover, in addition to maintaining a separation between the opposing sides of the outlet, in certain embodiments the separator also may function to promote aeration of the extracted juice as the juice flows through the outlet. Such aeration may be desirable with certain types of beverages that may be produced with a juicing system as described herein to control a texture of the beverage. However, in some embodiments, a separator may not aerate the extracted juice and may just be included to aid in calming the flow out of the juicer cartridge.

Further, in some instances an outlet separator used to avoid the above noted opening and closing behavior of an outlet during a juicing procedure, may not include a liquid permeable material. For example, the outlet separator may be formed as a hollow tube positioned within an outlet of a juicer cartridge. The tube may have any suitable cross-sectional shape, such as a circle, an ellipse, a rectangle, an irregular curved shape, an irregular polygon, and so on. The tube may be attached at least at one point to the juicer cartridge such that it is retained within the outlet during a juicing procedure. For example, in one embodiment, the tube may be attached along a portion of its length to at least one layer of a liquid impermeable material located within the outlet. In either case, due to its presence within the outlet, the tube may maintain a separation between the layers of the outlet while allowing a flow of liquid to pass through and/or around the hollow tube and out through the outlet to an exterior of the juicer cartridge.

As discussed above, the inventors have recognized advantages associated with controlling the flow of extracted juice through a juicer cartridge during a pressing operation. According to a further aspect of the current disclosure, in some embodiments a juicer cartridge may include a flow disrupting structure disposed between an outlet and food matter contained within the juicer cartridge to prevent the direct flow of juice extracted from the food matter to the outlet. Without wishing to be bound by any particular theory, preventing a direct flow path of extracted juice may reduce the velocity, pressure, and/or force at which juice is dispensed from the outlet during a pressing operation, which may reduce splashing, splattering, etc. to reduce mess.

In one embodiment a flow disrupting structure includes a sealed or welded region of a liquid impermeable compartment containing the food matter in a location between the food matter and an outlet from the liquid impermeable compartment. For example, a flow disrupting bar may be disposed in a liquid collection region between a liquid permeable compartment that contains the food matter and the outlet. Accordingly, juice extracted from the food matter during pressing may be forced to flow around the flow disrupting bar, reducing the velocity of the extracted juice in a direction of the outlet. In this manner, the juice may collect in the liquid collection region and subsequently be dispensed in a controlled manner.

FIG. 37 depicts on possible embodiment of a juicer cartridge 500 that includes a flow disrupting bar 565 disposed within the liquid collecting region 509. Although the flow disrupting bar is depicted as generally rectangular in shape, it should understood that other shapes also may be suitable, including convex or concave curved shapes or wavy shapes. Further, the flow disrupting structure may be formed with any suitable method. For example, in one embodiment a flow disrupting structure may be formed by bonding together opposing layers of material within the liquid collection region 509 with a suitable bonding technique such as thermal bonding, ultrasonic welding, adhesive bonding, and so on. Although the flow disrupting structure may reduce a pressure of the extracted juice in the liquid collection region, it should be understood that the pressure may still be large enough to open one or more seals such as a burstable seal 530 associated with an outlet from the juicer cartridge.

In addition to diverting the flow of extracted juice during pressing, a flow disrupting structure may also provide additional advantages. For example, a flow disrupting structure may increase the stiffness of a portion of a juicer cartridge near the outlet, which may aid in reducing kinking or other undesirable movement of a juicer cartridge during pressing. Additionally, in some instances the forces applied to food matter within a liquid permeable compartment during pressing may cause the liquid permeable compartment to stretch, or otherwise displace, towards the outlet of the cartridge, and a flow disrupting structure may act as a barrier to limit such stretching and/or other displacement of the liquid permeable compartment. In this manner, the flow disrupting bar may aid in maintaining the liquid permeable compartment within a pressing area of a displaceable pressing surface and/or maintain the separate juice collection area during a pressing operation.

In addition to an outlet at a bottom of a juicer cartridge for dispensing extracted juice as discussed above, the inventors have recognized that a juicer cartridge that includes one or more secondary outlet paths may be advantageous. For example, in some instances a mass of produce within a juicer cartridge may impede the flow of extracted juice from an upper portion of the juicer cartridge to the outlet. Accordingly, the secondary channels may have an inlet in an upper portion of a juicer cartridge that is removed from the outlet to provide a flow path around the produce mass to the outlet. In this manner, extracted juice that may otherwise be trapped in the upper portion of the juicer cartridge may freely flow upward and through the secondary outlet paths to an exterior of the juicer cartridge.

In some embodiments, a portion of a liquid impermeable compartment defines an internal chamber within a juicer cartridge that contains food matter. As discussed above, the juicer cartridge may have an outlet that provides fluid communication between the liquid impermeable compartment and an exterior of the juicer cartridge. An inlet to a secondary channel, if included in a juicer cartridge, may define an outlet from the chamber that is separate from the juicer cartridge outlet. Depending on the particular embodiment, the secondary channel may fluidly connect the inlet to the juicer cartridge outlet, or alternatively, the secondary channel may be in direct fluid communication with the exterior of the juicer through a separate secondary outlet as detailed further below.

Figure 39:
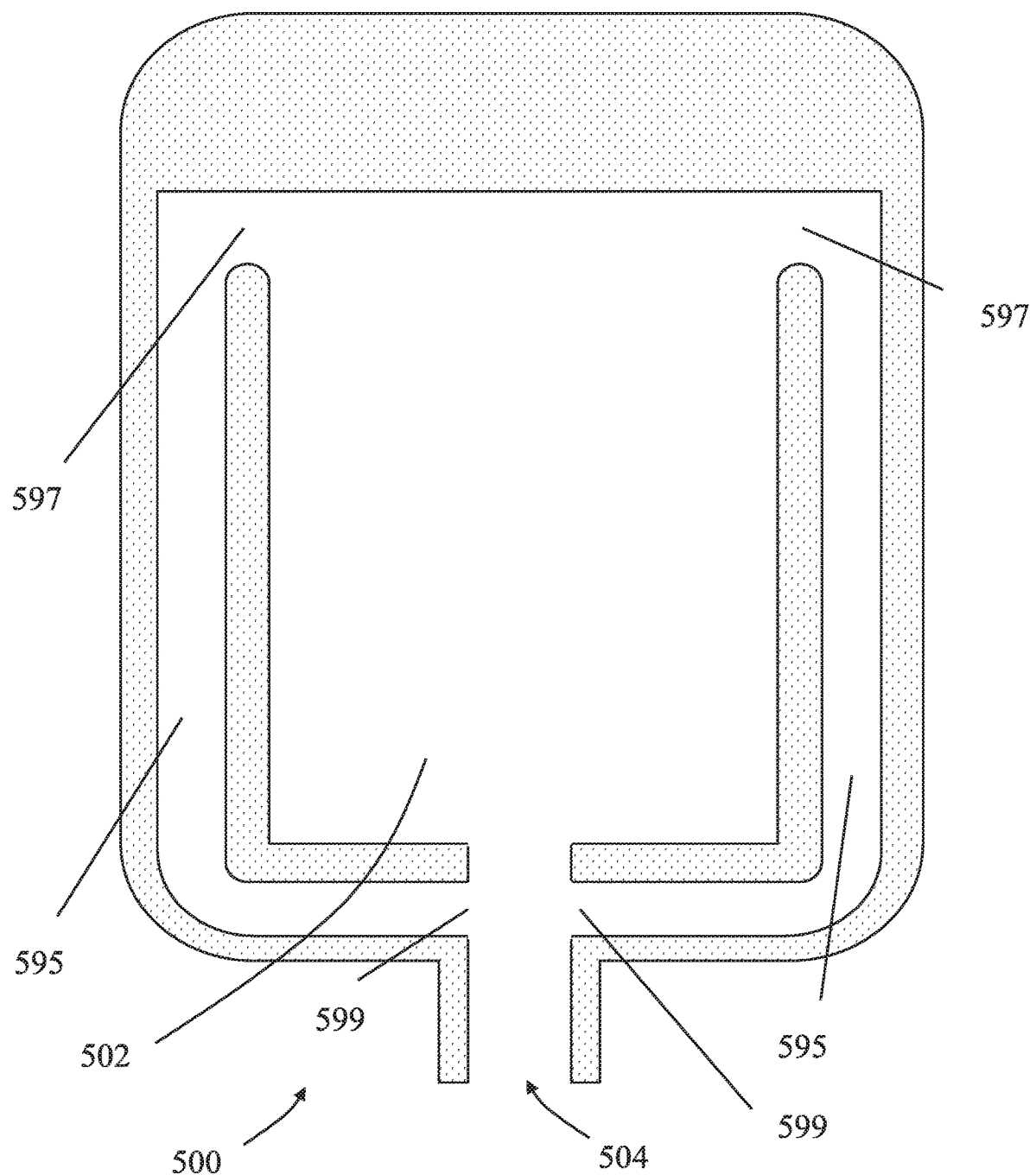
FIG. 39 is a schematic representation of another embodiment of a juicer cartridge.
Figure 40:
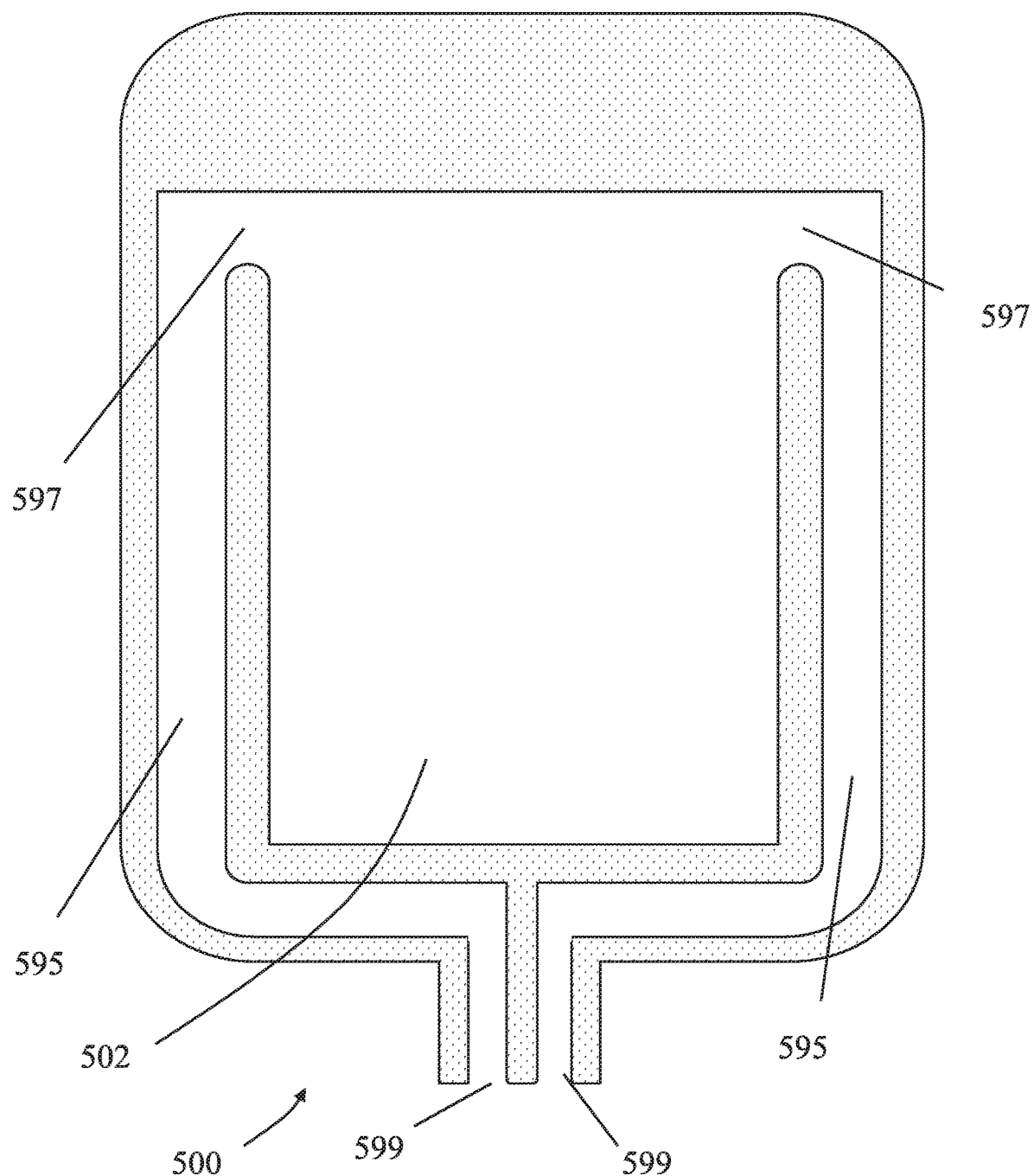
FIG. 40 is a schematic representation of a further embodiment of a juicer cartridge.

For example, FIGS. 39-40 depict schematic representations of two embodiments of juicer cartridges that include secondary outlet paths. In particular, FIG. 39 depicts a juicer cartridge 500 including two secondary outlet paths 595 located on opposing sides of the juicer cartridge that are in fluid communication with the liquid impermeable compartment 502 via inlets 597 located in an upper portion of the liquid impermeable compartment 502 that is opposite, or at least removed from, the outlet. The secondary outlet paths 595 have outlets 599 that merge with, or are otherwise fluidly connected with, the primary juicer cartridge outlet 504. FIG. 40 depicts a juicer cartridge 500 with secondary outlet paths 595 having inlets 597. Unlike the embodiment depicted in FIG. 39, the outlets 599 of the juicier cartridge do not join a primary outlet of the juicer, but instead provide direct fluid communication to an exterior of the juicer cartridge. For the sake of clarity, a liquid permeable compartment is not depicted in FIGS. 39-40. However, it should be understood that the juicer cartridges may include a liquid permeable compartment as well as any other of the juicer cartridge features described herein.

In some instances, a juicer cartridge including one or more secondary outlet paths may allow for juice to flow in a direction away from a primary outlet during pressing. For example, as noted above a secondary outlet path may have an inlet in an upper portion of a juicer cartridge that is removed from the primary outlet. Accordingly, a portion of the juice extracted from food matter during a pressing operation may initially flow away from the primary outlet of the juicer cartridge and into the secondary outlet path, prior to flowing through the secondary outlet path to an exterior of the juicer cartridge.

While particular arrangements of secondary channels and outlet paths are described above, other configurations of primary outlet and one or more secondary outlet paths are also possible as the current disclosure is not limited to any particular configuration. For example, although juicer cartridges having two aligned secondary outlet paths on opposing sides of the juicer cartridge are depicted and described above, a juicer cartridge may have only a single secondary outlet path on one side of the juicer cartridge. In one such embodiment, a primary outlet of the juicer cartridge may be disposed on a first side of the juicer cartridge, and a secondary outlet path may be disposed on an side opposite the outlet of the juicer cartridge or on a side of the juicer cartridge extending between the side associated with the outlet of the juicer cartridge and a side opposite the outlet. Additionally, while inlets to the secondary channels from the liquid impermeable compartment have been shown as being aligned on opposing sides of the compartment, instances in which the inlets are not aligned are also contemplated.

In some embodiments, a juicer cartridge may include both wet and dry ingredients that are combined during pressing by a juicer. In one such embodiment, a dry ingredient may be disposed within a secondary compartment of the juicer cartridge and a liquid, or liquid containing food matter, may be disposed within a primary compartment of the juicer cartridge (e.g., a liquid permeable or liquid impermeable compartment). The secondary compartment of the juicer cartridge may be associated with the primary compartment such that during juice extraction in a corresponding juicer, liquid may flow from the primary compartment to the secondary compartment where the liquid is combined with the dry ingredient. The dry ingredient may either be suspended within the liquid, or it may be dissolved within the liquid, depending on the particular embodiment. After combining the ingredients, the combined mixture may then flow from the secondary compartment through an outlet of the juicer cartridge.

Any number of arrangements of a primary and secondary compartment as noted above may be used in a juicer cartridge. For example, the primary and secondary compartments may either be separate, or one may be contained within the other as the current disclosure is not so limited. Additionally, the secondary compartment may be a burstable pouch or tablet containing a gel, powder, dissolvable substance, or other desired material located within the first compartment. In such an embodiment, the secondary compartment may burst to permit mixing of juice extracted from the food matter with the dry ingredient. Alternatively, a crushable material or tablet may be located within a compartment such that it is crushed and mixed with the extracted juice during pressing. Other possible arrangements for combining a dry ingredient with a liquid within the juicer cartridge are also contemplated. For example, while a compartment containing a burstable pouch has been described, in some embodiments a reservoir containing the burstable pouch, tablet, and/or dissolvable material is located along a flow path of the juicer cartridge from an internal area containing the food matter through an outlet of the juicer cartridge. In one embodiment, the secondary compartment and/or burstable pouch may be located within the outlet or spout of a juicer cartridge. For example, the secondary compartment may be defined between first and second burstable seals associated with the outlet where the second burstable seal is located downstream from the first burstable seal. Various embodiments of the two burstable seals are described in more detail above.

Possible ingredients that may be delivered in the ways described above include, but are not limited to, flavorings, additives, and dietary supplements such as protein supplements, vitamins, extracts, minerals, dried fruits, dried vegetables, nuts, herbs, freeze dried oils, spices, alcohol, and any other desired consumable substance. Additional aspects of secondary compartments that may be included in a juicer cartridge are also described in the above-incorporated PCT application.

In some embodiments, the one or more liquid impermeable and liquid permeable compartments may made from one or more layers of liquid impermeable and liquid permeable materials, respectively. The outer liquid impermeable layer may be made from any appropriate material. For example, the outer liquid impermeable layer may be made from an appropriate polymer (e.g. blended polyester-polyethylene, polypropylene, and others), metal foil, or any other appropriate material. Additionally, in some embodiments, it may be desirable to provide an outer layer made from a biodegradable material including, but not limited to, biodegradable plant-based polymers such as cellulose, cellophane, or polylactic acid.

Appropriate materials for the inner liquid permeable layers include, but are not limited to, a filtration membrane, a nonwoven filtration material, woven mesh, fabric filters, plates with appropriately sized holes or openings, combinations of the above, and other appropriate types of filters. Additionally, these liquid permeable layers may be made from any appropriate material including, for example, metals such as aluminum, polylactic acid, polypropylene fibers, and blended polyester-polyethylene to name a few. In one exemplary embodiment, a liquid permeable layer may be made from a food-grade porous membrane comprising a plurality of pores of a desired size. Other possible embodiments for the one or more liquid permeable layers include aluminum or plastic meshes, cheesecloth, and paper filters. In view of the above, it should be understood that the one or more liquid permeable layers may correspond to any porous material including pores, or other openings, of a suitable size capable of at least partially filtering the juice extracted from food matter contained within a juicer cartridge.

The one or more liquid permeable layers may have an appropriate filtration size selected according to the food matter contained in the juicer cartridge such that liquid can pass through the liquid permeable layers while trapping pulp, seeds, pith, peel, and any other undesirable matter. By way of example, ginger may typically generate large, fibrous pulp matter that can be trapped by larger pores while still permitting the juice extracted from the ginger to pass through the membrane. In contrast, strawberries may be pressed into a pulp matter having small fibers and seeds, which requires a mesh filter with smaller pores to trap the seeds. While in some embodiments, a filtration size may be selected to remove substantially all of the solid material such as pulp from a juice, in some embodiments, a filtration size of the liquid permeable layers may be selected to permit a certain portion of the solid materials (e.g. pulp) to pass through. In instances where a juicer cartridge includes multiple types of food matter in separate pouches requiring different levels of filtration, a juicer cartridge may include multiple liquid impermeable layers with different filtration sizes associated with the different types of food matter.

In one embodiment, a juicer cartridge may include an outer liquid impermeable layer made from a polyethylene/polyethylene terephthalate (PE/PET) blend. The inner liquid permeable material may include a mesh made comprising fibers with a high density polyethylene (HDPE) shell and a PET core. As discussed above, the liquid permeable layer may be bonded together with the outer liquid impermeable layer. Accordingly, in some instances an adhesive material may be provided on an interior surface of the PE/PET liquid impermeable layer to promote compatibility with the HDPE/PET mesh material when they are bonded together with a suitable bonding technique, such as thermal or ultrasonic welding. For example, a suitable adhesive material may include a low density polyethylene sealant layer, though, any appropriate adhesive material may be used. In other embodiments, a juicer cartridge may be compostable, and the PE/PET outer layer and HDPE/PET inner mesh may be replaced with suitable compostable materials. In view of the above, it should be understood that the liquid permeable compartment and/or liquid impermeable compartment may be made from a lamination of materials. For example, a liquid impermeable compartment may be made from a polymer film laminated to an outer paper layer. Of course other constructions and materials are also contemplated.

As noted previously, a juicer cartridge may be constructed and arranged such that it is capable of supporting pressures and forces applied to it during a pressing operation without bursting open, or otherwise failing, in an uncontrolled fashion. For example, pressing on a juicer cartridge may open an associated outlet in a controlled fashion while the remaining portions of the juicer cartridge remained substantially intact. This may be accomplished using any number of different types of constructions and arrangements. However, in one embodiment, a liquid permeable compartment or pouch and/or a liquid permeable compartment or pouch disposed therein may include seal that extend at least partially, and/or entirely, around their outer peripheries or other appropriate portions of the compartments or pouches to create a sealed interior region. In one such embodiment, a first seal extends around the outer periphery of an external liquid impermeable compartment and a second seal extends around an outer periphery of a liquid permeable compartment disposed therein. In some instances, the first and second seals may be at least partially combined. In other words, in such an embodiment, at least a portion of the liquid permeable compartment and liquid permeable compartment are sealed at the same location. Further, in some embodiments, the seal around a liquid impermeable compartment may include a weakened section associated with a predetermined outlet from the juicer cartridge that opens in a controlled fashion during a pressing operation as previously discussed. Parameters used to control the strengths of these seals to withstand the pressures experienced during a pressing operation are discussed further below.

A seal extending at least partially around a compartment or pouch in a juicer cartridge may be designed to withstand the applied juicing pressures in a variety of ways. For instance, a strength of the material a compartment is made of, a thickness of the material layers forming the compartment, and/or a width of the seal may be selected to withstand the applied pressures. Therefore, any appropriate combination of these parameters, or other appropriate design parameters, may be used to provide a seal with a desired strength extending at least partially around a periphery, or other portion, of a compartment or pouch to defining an interior region within. Of course, these seals may be formed in any number of ways, and may correspond to any number of different structures. For example, a seal may correspond to an ultrasonic weld, a thermal weld, layers of material bonded together with adhesives, stitches, mechanically interlocking features, or any other appropriate method of forming a compartment or pouch.

Depending on the particular embodiment, a juicer cartridge, and the associated seals described above used to form the various compartments and/or pouches, may be constructed to support any appropriate combination of forces and/or pressures that are sufficient to extract juice from the food matter contained therein. For example, in one embodiment, a juicer cartridge may be constructed to support forces that are between or equal to about 6,700 N to 35,600 N (1500 pounds of force to about 8000 pounds of force), 17,800 N to about 44,500 N (4000 pounds to about 10,000 pounds), 8900 N to 53,400 N (2000 pounds to 12,000 pounds), or any other appropriate range of forces as the disclosure is not so limited. Correspondingly, depending on the particular size of an active pressing region of a juicer cartridge, the juicer cartridge may correspondingly be constructed to support pressures for extracting juice from the food matter contained therein that are greater than or equal to about 0.14 MPa (20 lb/in$^2$), 0.34 MPa (50 lb/in$^2$), 0.7 MPa (100 lb/in$^2$), 1.4 MPa (200 lb/in$^2$), or any other appropriate pressure. Correspondingly, the juicer cartridge may support pressures for extracting juice from the food matter contained therein that are less than or equal to about 2.4 MPa (350 lb/in$^2$), 2.1 MPa (300 lb/in$^2$), 1.7 MPa (250 lb/in$^2$), 1.4 MPa (200 lb/in$^2$), 0.7 MPa (100 lb/in$^2$), or any other appropriate pressure. Combinations of the above pressure ranges are contemplated including, but not limited to, between or equal to about 0.14 MPa (20 psi) to 2.4 MPa (350 psi), 0.7 MPa (100 psi) to 2.4 MPa (350 psi), 0.7 MPa (100 psi) to 2.1 MPa (300 psi), or any other desirable combinations of pressures. Of course pressure and force ranges both larger and smaller than those noted above are contemplated as the disclosure is not so limited.

In certain embodiments, a material for an inner liquid permeable compartment, such as the mesh materials discussed above, may be chosen based on a frictional engagement that the mesh has with food matter that is contained within the liquid permeable compartment. Without wishing to be bound by any particular material, the frictional engagement between the mesh and the food matter may aid in retaining the food matter in place within the liquid permeable compartment during pressing, thereby promoting more even pressing and extraction of juice from the food matter.

Other arrangements, configurations, orientations, and/or suitable materials for liquid impermeable layers and liquid permeable layers which may be used to make a juicer cartridge are also described in the above-incorporated U.S. and PCT applications.

Having described several possible embodiments of juicers as well as associated juicer cartridges, their method of use and operation are described in more detail below. For example, one illustrative method 1500 is described with reference to FIG. 41. A juicer cartridge containing food matter is provided at block 1510, and the juicer cartridge is loaded into the pressing chamber of a juicer at block 1530. At block 1550, the juicer cartridge is pressed by a pressing mechanism of the juicer to compress the food matter within the juice cartridge and extract juice therefrom. The extracted juice is dispensed from the juicer cartridge and into a user's beverage container at block 1570, and subsequently, after pressing, the pressed juicer cartridge is removed from the juicer at block 1590.

Figure 41:
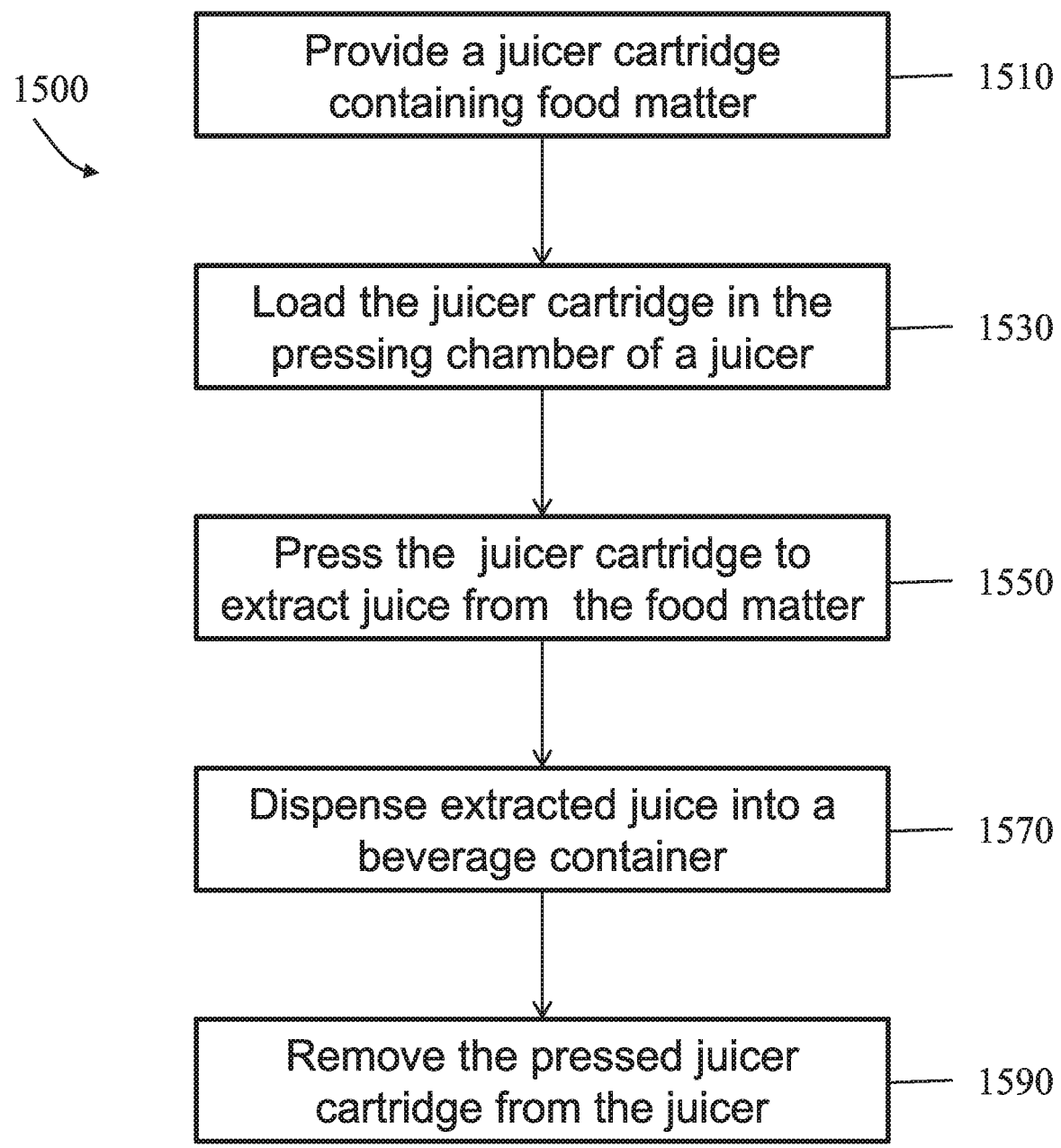
FIG. 41 is a flow chart depicting one embodiment of a method for using a juicing system.
Figure 42:
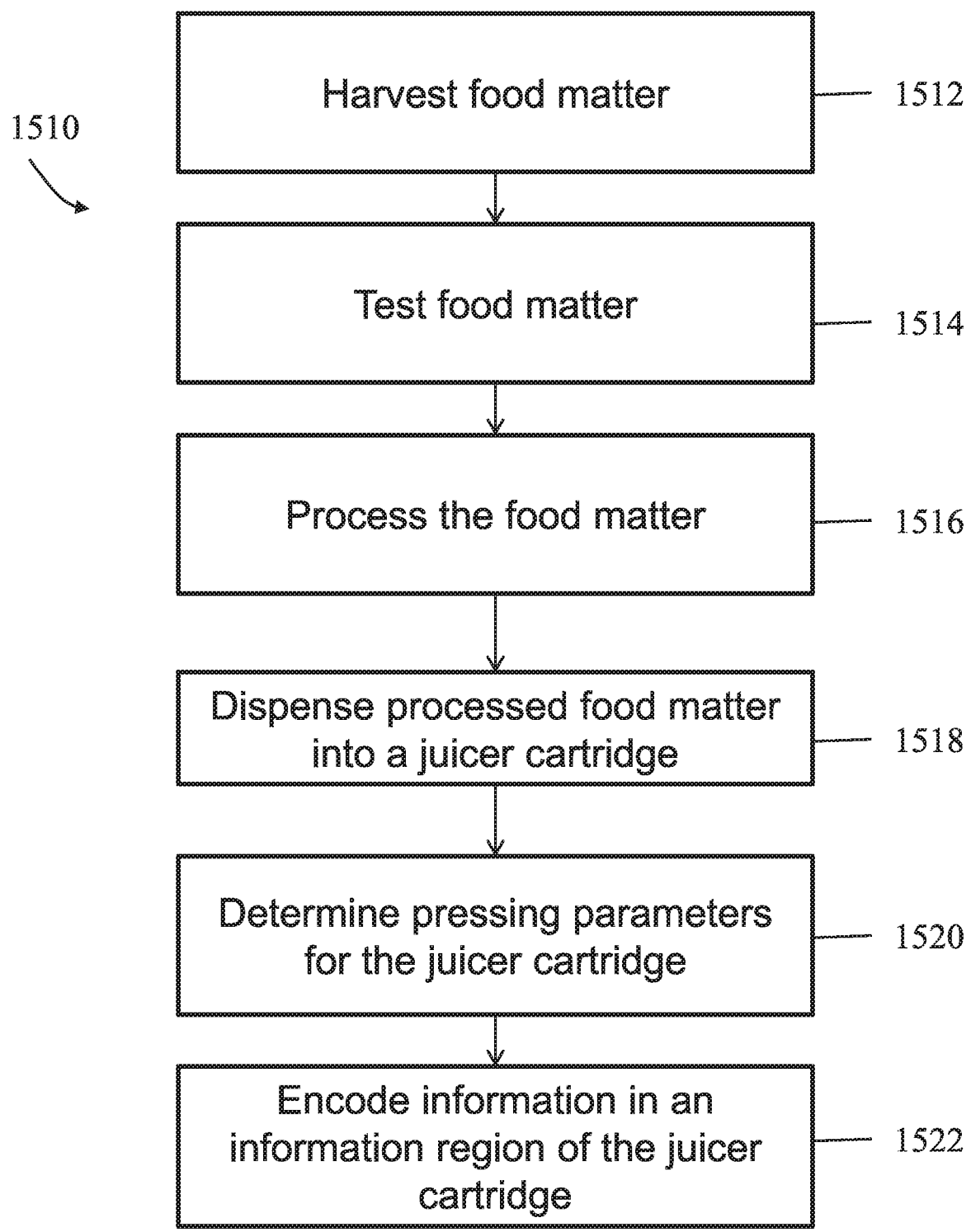
FIG. 42 is a flow chart depicting one embodiment of a method for providing a juicer cartridge for use in a juicing system.

Referring now to FIG. 42 aspects related to providing a juicer cartridge containing food matter (e.g., block 1510 in FIG. 41) according to some methods are described in more detail. Food matter, such as fresh fruits, vegetables, or other suitable types of food matter are harvested at block 1512. The food matter may be tested at block 1514. For example, testing the food matter may include determining a liquid or juice content of the food matter, hardness of the food matter, and/or pressures and compression ratios needed to extract a desired amount of liquid from the food matter. However, other types of testing and parameters may also be used, as the current disclosure is not so limited. The food matter is processed at block 1516, which may include peeling, cutting, chopping, grinding, shredding, and/or other suitable processing methods. Processing the food matter may include reducing a size of the food matter to enhance juice extraction, and in some instances, one or more processing parameters, such as a final processed size of the food matter, may be determined based on the testing performed at block 1514. After the food matter is suitably processed, the food mater is dispensed into a juicer cartridge at block 1518. For example, a juicer cartridge may be filled with a single type of food matter, or alternatively, different types of food matter may be combined within a single juicer cartridge. In some instances, suitable pressing parameters for the juicer cartridge may be determined at block 1520. As discussed above, the pressing parameters may depend on the juice content of the food matter (e.g., as determined in block 1514), the type(s) of food matter, the degree of freshness of the food matter, and so on. Appropriate testing such as moisture content testing, juice extraction versus compression testing, and other appropriate testing may be conducted to determine a desired combination of pressing parameters. At block 1522, information about the juicer cartridge, such as the type of food matter and/or desired pressing parameters determined at block 1520 may be encoded in an information region of the juicer cartridge that may be read by a reader on a juicer as discussed in more detail above.

Figure 43:
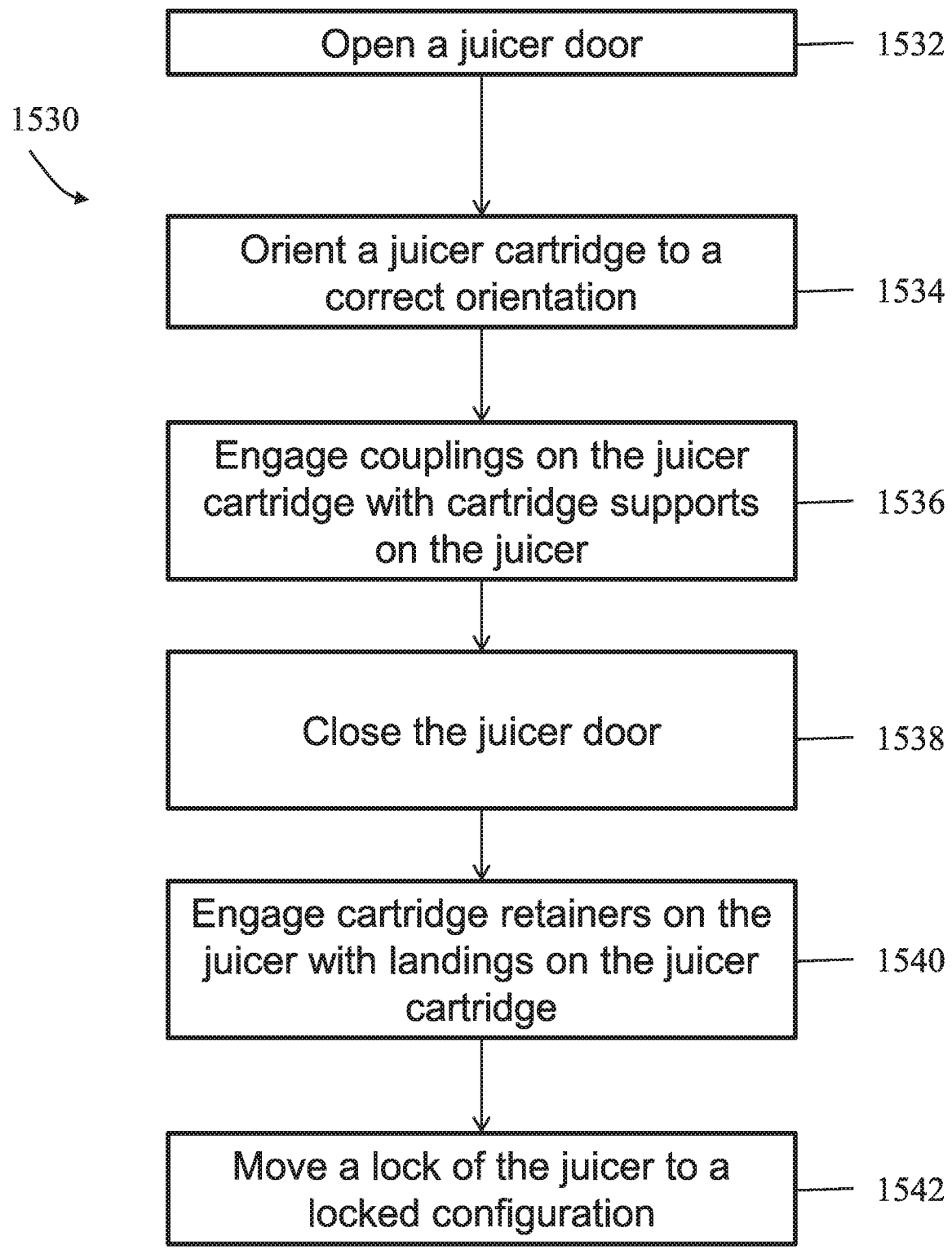
FIG. 43 is a flow chart depicting one embodiment of a method for loading a juicer cartridge into the pressing chamber of a juicer.

FIG. 43 illustrates aspects related to loading a juicer cartridge into a pressing chamber (e.g., block 1530 in FIG. 41). A user may open a door of a juicer at block 1532 to expose, or otherwise open, a pressing chamber of the juicer to receive a juicer cartridge. A user may orient the juicer cartridge at block 1534 such that the cartridge is oriented in a correct orientation in the pressing chamber. For example, as discussed above, a cartridge orienting feature on the juicer cartridge may interact with a corresponding orientation feature on the juicer cartridge to define the correct orientation. In some instances, an information region on the juicer cartridge is aligned with a reader on the juicer when the juicer cartridge is in the correct orientation. At block 1536, one or more couplings on the juicer cartridge may be engaged with one or more corresponding cartridge supports on the juicer such that the juicer cartridge is suspended in the pressing chamber in the correct orientation. The door, if the system includes a door, of the juicing system may subsequently be moved to a closed position at block 1538 to close off the pressing chamber. As discussed above, in some embodiments a juicer may include one or more cartridge retainers that engage corresponding landings on the juicer cartridge to limit movement of at least a portion of the juicer cartridge such as an outlet of the juicer cartridge. Accordingly, closing the door of the juicer may bring the cartridge retainers into engagement with the landings on the juicer cartridge, as illustrated at block 1540. Further, a juicer may include a lock that is moved to a locked configuration at block 1542 to secure the door in the closed position.

As discussed above, in some embodiments a juicer may include a displaceable pressing surface that is separate from a displaceable platen associated with a drive mechanism. For example, the displaceable pressing surface may have an initial neutral position in which the displaceable pressing surface is spaced from the displaceable platen, which may be in an initial retracted position. In such an embodiment, closing the door of the juicer after the cartridge is suspended in the pressing chamber, as described above in regards to block 1538, may cause a fixed pressing surface on the door to press the juicer cartridge against the displaceable pressing surface. As the juicer cartridge is moved inwards into the pressing chamber, displaceable pressing surface is moved from the initial neutral position to a compressed position to accommodate the presence of the juicer cartridge within the pressing chamber. Depending on the embodiment, in the compressed position, the displaceable pressing surface may, or may not, be in contact with the displaceable platen in the retracted position.

Figure 44:
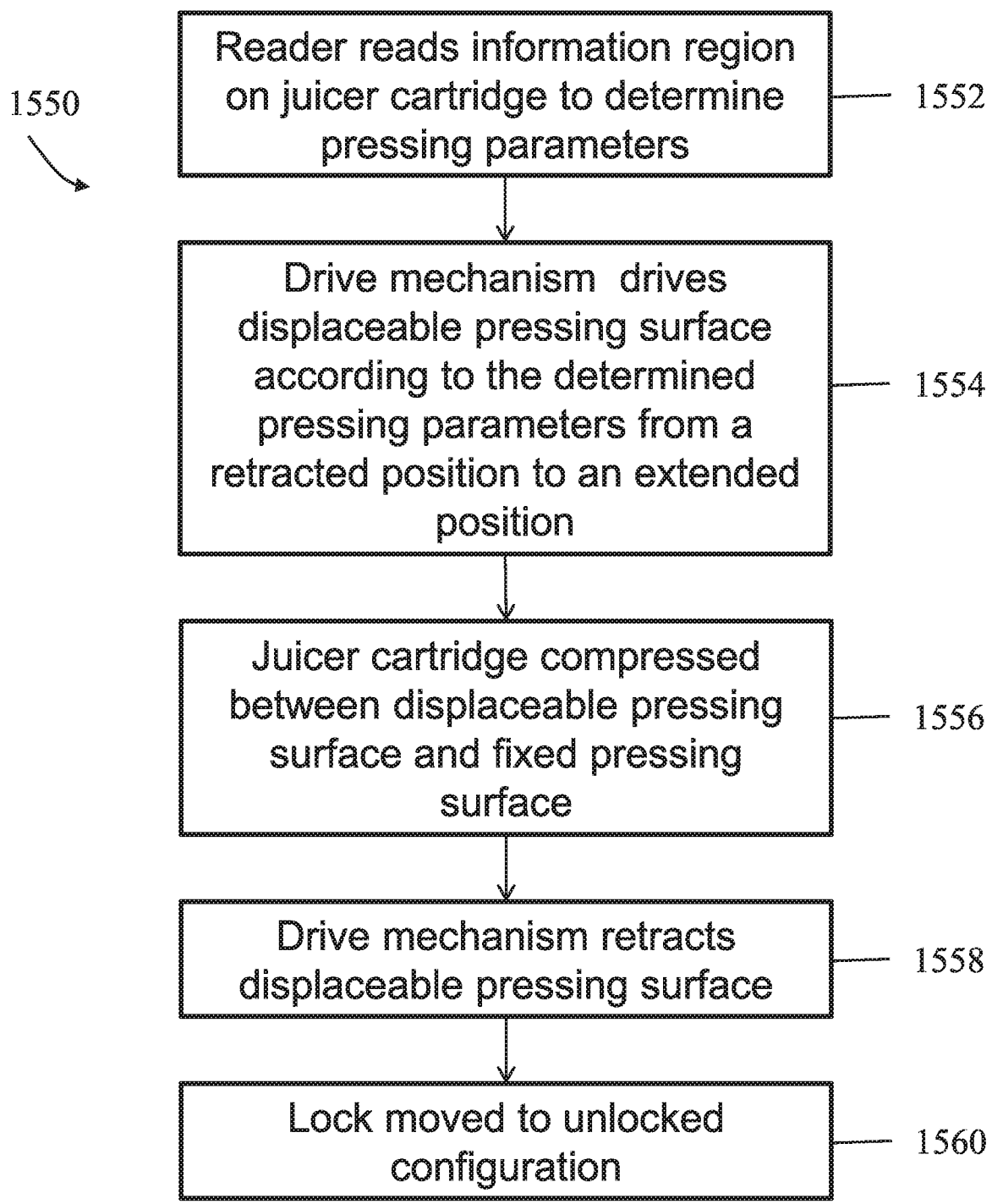
FIG. 44 is a flow chart depicting one embodiment of a method for pressing a juicer cartridge in the pressing chamber of a juicer.

Once a juicer cartridge is loaded in the pressing chamber, it may be subsequently pressed by a pressing mechanism of the juicer to extract juice from the food matter contained therein (e.g., block 1550 of FIG. 41). As illustrated in FIG. 44, pressing the juicer cartridge may include steps such as reading information on an information region of the juicer cartridge with a reader on the juicer (block 1552). As discussed above, the information region may include pressing parameters such as a total pressing stroke, pressing force or pressure, pressing speed, and so on for one or multiple portions of a pressing profile. In some instances, a juicer may determine that a particular juicer cartridge should not be pressed based on the information read by the reader. For example, if a juicer cartridge includes expired contents, if the cartridge has already been pressed, or a thermal indicator on the juicer cartridge indicates it has been stored improperly breaking the cold chain, the juicer may not press the juicer cartridge. Once a juicer determines that it is permissible to press a juicer cartridge and has determined the proper pressing parameters, a drive mechanism of the juicer may move a displaceable pressing surface from an initial retracted position towards an extended position, thereby driving the displaceable pressing surface towards the fixed pressing surface on the door according to the determined pressing parameters, see block 1554. At block 1556, the juicer cartridge is compressed between the displaceable pressing surface and the fixed pressing surface, thereby applying pressure to the food matter to extract juice therefrom. After the pressing operation is completed, the drive mechanism may then retract the displaceable pressing surface at block 1558, and the lock of the juicer may move to the unlocked configuration at block 1560 so that the door can be opened and the juicer cartridge removed.

In some embodiments, a juicer may track the usage of a juicer cartridge after a pressing operation is completed. As discussed above, the information read by a juicer from an information region of a juicer cartridge may include an identification information about that particular juicer cartridge, the type of food matter and/or a particular flavor or recipe of juice contained in the juicer cartridge, and/or nutritional information. The juicer may use this information to either make suggestions to a user and/or further control operation of the juicer as detailed previously.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A press comprising:
a housing including:
an upper portion having a dispensing outlet; and
a pair of opposing platens disposed within the upper portion of the housing, the upper portion of the housing and the pair of opposing platens defining a pressing chamber that is constructed and arranged to receive a cartridge, with one of the pair of opposing platens being a stationary platen that is stationary relative to the housing when the cartridge is pressed and with the other of the opposing platens being a movable platen that is moveable relative to the stationary platen and the housing when the movable platen is pressing the cartridge, wherein the dispensing outlet is constructed and arranged to receive a portion of the cartridge so that the portion of the cartridge is extendable through and beyond the dispensing outlet;
a drive system operatively coupled to the movable platen to move the movable platen toward the stationary platen; and
a lining;
wherein the upper portion of the housing defines an opening, the movable platen being configured to interface with the stationary platen through the opening, the drive system being located within an interior of the upper portion of the housing; and
wherein the lining has a perimeter secured to the housing around the opening and extending over the opening, the lining being positioned between the movable platen and the stationary platen, the lining sealing the pressing chamber from the interior of the upper portion of the housing.

2. The press according to claim 1, wherein the lining is formed of a silicone rubber.

3. The press according to claim 1, wherein the lining is formed of an elastomer.

4. The press according to claim 1, wherein the lining is removably attached to a pressing surface of one of the pair of opposing platens.

5. The press according to claim 1, wherein the lining includes an engagement structure constructed and arranged to attach the lining to a pressing surface of one of the pair of opposing platens.

6. The press according to claim 5, wherein the engagement structure includes one of a clip, a magnetic coupling and a threaded fastener.

7. The press according to claim 5, wherein the lining includes a folded portion surrounding the movable platen and spanning a gap between the movable platen and the opening, the folded portion defining a channel surrounding the movable platen and having a concave surface facing the stationary platen.

8. The press according to claim 2, wherein the lining includes deformable channels constructed and arranged to be deformed over and past corresponding structures formed on the press to engage the lining with pressing surfaces of the platens.

9. The press according to claim 3, wherein the lining includes deformable channels constructed and arranged to be deformed over and past corresponding structures formed on the press to engage the lining with pressing surfaces of the platens.

10. The press according to claim 1, wherein the drive comprises a scissor jack press.

11. The press according to claim 10, further comprising a frame disposed within the housing, wherein the frame supports the scissor jack press and the movable platen.

12. The press of claim 1, further comprising:
a front cover hingedly secured to the upper portion, the stationary platen being mounted to the front cover; and
a seal secured to the front cover around a top and sides of the stationary platen, the seal engaging the housing around the opening when the front cover is closed.

13. The press of claim 12, wherein the upper portion defines a face defining the opening, the lining securing around the opening on a first side of the face, the seal engaging a second side of the face opposite the first side.

14. A press comprising:
a housing including:
an upper portion having a dispensing outlet; and
a pair of opposing platens disposed within the upper portion of the housing, the upper portion of the housing and the pair of opposing platens defining a pressing chamber that is constructed and arranged to receive a cartridge, with one of the pair of opposing platens being a stationary platen that is stationary relative to the housing when the cartridge is pressed and with the other of the opposing platens being a movable platen that is moveable relative to the stationary platen and the housing when the movable platen is pressing the cartridge, wherein the dispensing outlet is constructed and arranged to receive a portion of the cartridge so that the portion of the cartridge is extendable through and beyond the dispensing outlet;
a drive system operatively coupled to the movable platen to move the movable platen toward the stationary platen; and
a seal;
wherein the upper portion of the housing defines an opening, the movable platen being configured to interface with the stationary platen through the opening, the drive system being located within an interior of the upper portion of the housing; and
wherein the seal has a perimeter secured to the housing around the opening, the seal spanning over the opening such that the seal is positioned between the movable platen and the stationary platen.

15. The press according to claim 14, wherein the seal is formed of a silicone rubber.

16. The press according to claim 14, wherein the seal is formed of an elastomer.

17. The press according to claim 14, wherein the seal includes a folded portion surrounding the movable platen and spanning a gap between the movable platen and the opening, the folded portion defining a channel surrounding the movable platen and having a concave surface facing the stationary platen.

18. The press according to claim 14, wherein seal is attached to a platen with one of an adhesive, thermal welding, ultrasonic welding, over-molding and co-molding.

19. The press according to claim 14, wherein the drive system comprises a scissor jack press.

20. The press according to claim 19, further comprising a frame disposed within the housing, wherein the frame supports the scissor jack press and the movable platen.

* * * * *